(12) United States Patent
Smolenaers

(10) Patent No.: US 12,283,905 B2
(45) Date of Patent: Apr. 22, 2025

(54) INTERLEAVED SWITCHING METHOD OF CONTROL FOR A POLYPHASE INDUCTIVE LOAD

(71) Applicant: InvertedPower Pty Ltd, Heidelberg West (AU)

(72) Inventor: Stefan Smolenaers, Heidelberg West (AU)

(73) Assignee: InvertedPower Pty Ltd, Heidelberg West (AU)

( * ) Notice: Subject to any disclaimer, the term of this patent is extended or adjusted under 35 U.S.C. 154(b) by 128 days.

(21) Appl. No.: 18/265,524

(22) PCT Filed: Dec. 10, 2021

(86) PCT No.: PCT/AU2021/051479
§ 371 (c)(1),
(2) Date: Jun. 6, 2023

(87) PCT Pub. No.: WO2022/120436
PCT Pub. Date: Jun. 16, 2022

(65) Prior Publication Data
US 2024/0030856 A1     Jan. 25, 2024

(30) Foreign Application Priority Data

Dec. 10, 2020 (AU) ................. 2020904587

(51) Int. Cl.
*H02P 27/08* (2006.01)
(52) U.S. Cl.
CPC .................. *H02P 27/08* (2013.01)
(58) Field of Classification Search
CPC ............. H02P 2201/00; H02P 2201/03; H02P 2201/13; H02P 2207/05; H02P 2207/055; H02P 2207/07; H02P 2207/076; H02P 27/06; H02P 27/08; H02P 23/0004; H02P 27/085; H02P 6/10; H02P 2201/07; H02P 2201/09; H02P 2201/11; H02P 6/00; H02P 2209/13; H02M 3/1584; H02M 3/158; H02M 1/08; H02M 7/5387; B60L 50/51; B60L 15/007; B60L 2210/40; B60L 2210/10; B60L 2210/30; B60L 2220/54; B60L 53/18; B60L 2210/42; B60L 2220/12; B60L 2220/58; B60L 2210/14; B60L 2210/12; B60L 2240/527; B60L 2240/547;
(Continued)

(56) References Cited

U.S. PATENT DOCUMENTS 7,230,405 B2 * 6/2007 Jang .................... H02M 3/1584
                                                    323/284
2012/0274293 A1    11/2012    Ren et al.
(Continued)

OTHER PUBLICATIONS

International Search Report and Written Opinion dated Mar. 25, 2022, issued in corresponding International Patent Application No. PCT/AU2021/051479.

*Primary Examiner* — Antony M Paul
(74) *Attorney, Agent, or Firm* — Morgan, Lewis & Bockius LLP

(57) ABSTRACT

A controller and an interleaved switching method for a converter for a polyphase connected inductive load including a method for operating: at least a first drive circuit and a second drive circuit in parallel, each connected to one or more phases of the polyphase connected inductive load.

14 Claims, 22 Drawing Sheets

(58) Field of Classification Search
CPC .......... B60L 3/003; B60L 53/20; B60L 53/53; B60L 53/11
See application file for complete search history.

(56) References Cited

U.S. PATENT DOCUMENTS

| | | |
|---|---|---|
| 2018/0254732 A1 | 9/2018 | Smolenaers |
| 2018/0262111 A1 | 9/2018 | Taniguchi |
| 2019/0058411 A1 | 2/2019 | Kitamoto |
| 2020/0298722 A1 | 9/2020 | Smolenaers |

* cited by examiner

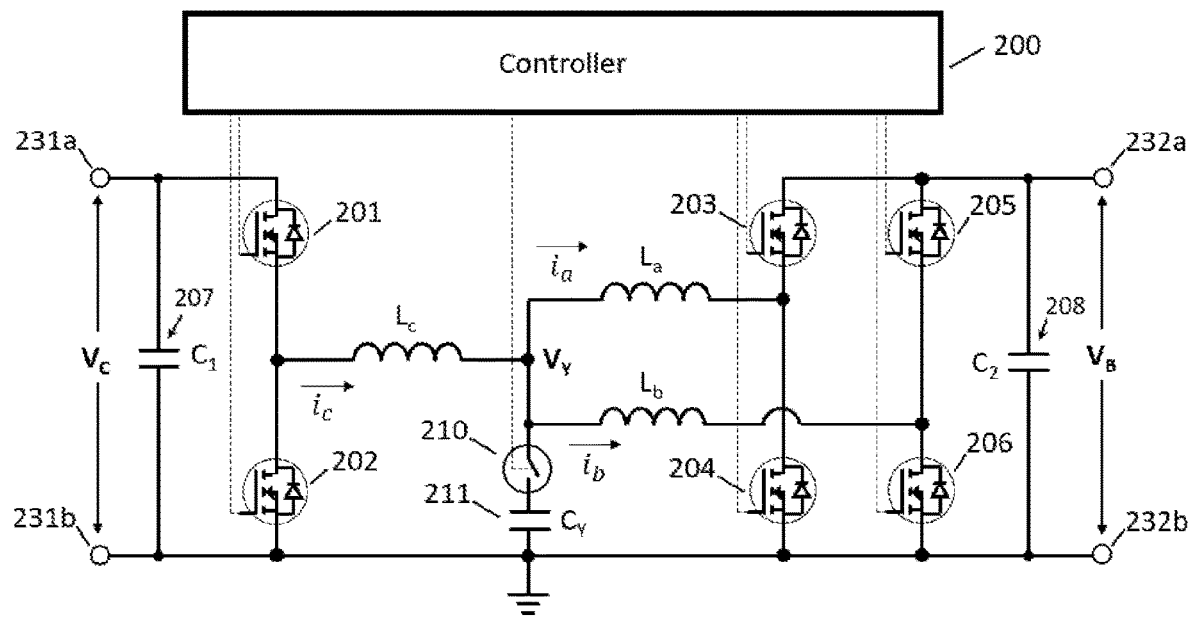
FIGURE 2
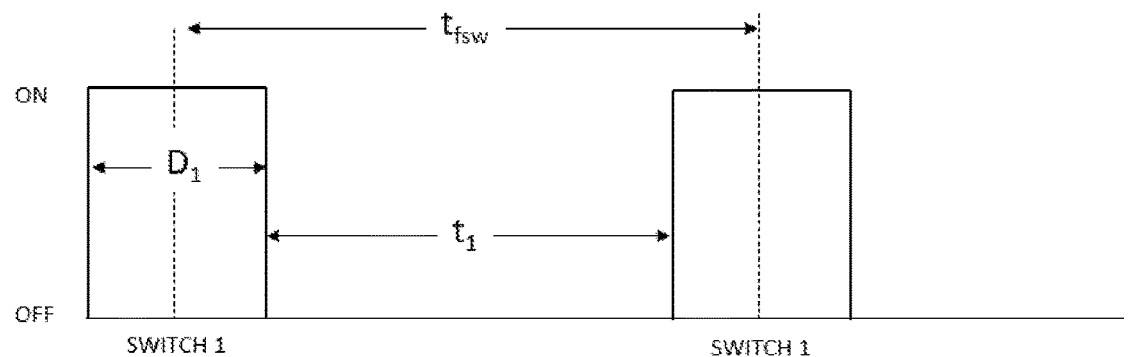
FIGURE 3 – PRIOR ART

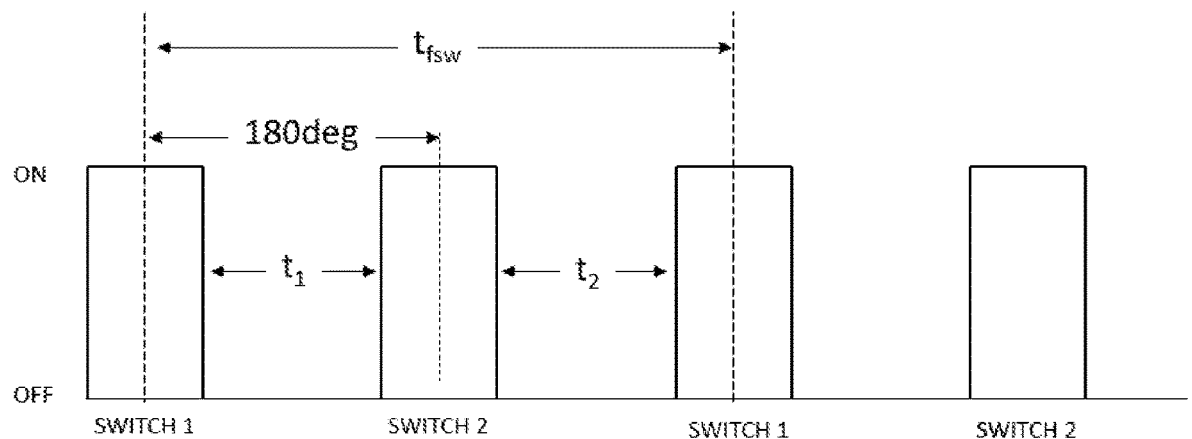
FIGURE 4 – PRIOR ART
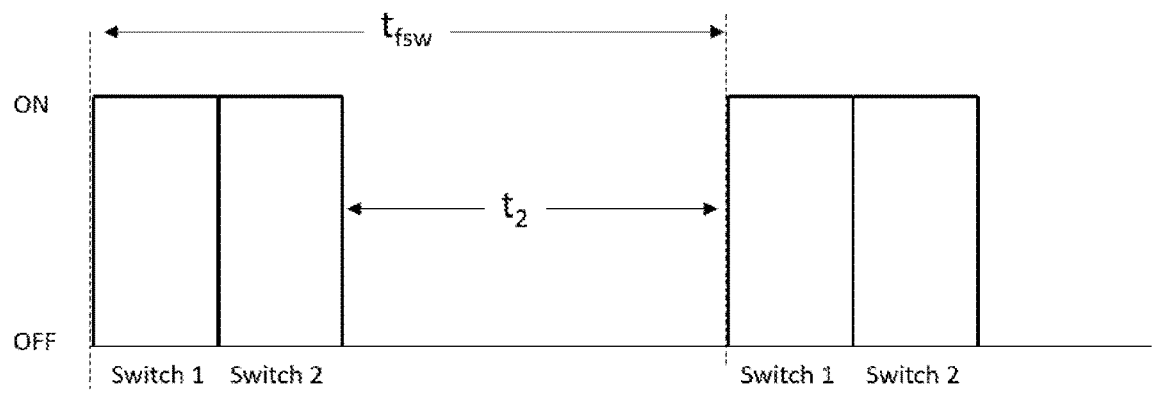
FIGURE 5

INTERLEAVED SWITCHING METHOD OF CONTROL FOR A POLYPHASE INDUCTIVE LOAD

FIELD OF THE INVENTION

The present invention relates to a control method for a converter of a polyphase connected inductive load.

The invention has been developed primarily for use in novel multimodal converters able to act in ACDC or DCDC conversion operational modes using the same polyphase inductive load, and the invention will be described hereinafter with reference to that application. However, it will be appreciated that the invention is not limited to these particular fields of use and is also applicable to other uses with other polyphase interconnected inductive loads with asymmetric loading. For example, the invention can be applied in applications where the inductive load is an electric motor, such as in a plug-in electric vehicle, electric power tool, electric water pump, or the like, or charging of any electrical battery apparatus, whether for private, commercial, or other use.

BACKGROUND

Any discussion of the background art throughout the specification should in no way be considered as an admission that such art is widely known or forms part of common general knowledge in the field.

The benefits of interleaved switching for electric converters is well known, and widely used for the reduction of switching ripple. However, these interleaved switching patterns are also deployed to standard interleaved hardware configurations of converter structures with symmetric independent load paths. However, the recent invention of non-conventional multimodal converters for polyphase interconnected loads provide non-traditional load configurations, and therefore a non-traditional switching control method is required to be developed.

Furthermore, in some instances, two-level conversion topologies do not provide an ideal characteristic due to large switching voltages across few components. Therefore, further inventive steps may be needed to define converters structures and switching patterns to manipulate voltage levels of the conversion whilst maintaining multi-modal functionalities.

In some applications or modes, applying prior-art switching methods to such novel converter structures yield non-optimal characteristics, where it was non-obvious in the prior-art that improvements could or should be made through innovations to the structure of the converter and/or applied control method.

An example application of a non-traditional multimodal converter may be a three-phase traction drive for an electric vehicle with integrated DCDC charging functionality.

Furthermore, multimodal converters may be applied to applications with two or more DC sources or loads, and one or more polyphase AC source or load, or other applications with interconnected poly phase loads.

Multimodal converter apparatuses have been disclosed by the inventor in prior applications, for example as described in a family of prior specifications including US2020298722A1. In those family of patent specifications, the inventor has described examples of those inventions, however, a novel and inventive control method as described herein for the present converter has not yet been described or explored in the prior-art. Furthermore, the deficiencies of traditional switching control methods as applied to non-symmetrical interconnected loads, such as for the novel structures proposed previously by the inventor, have not been previously highlighted or explored in the prior-art.

Therefore, the proposed novel converter topologies require the development of one or more novel switching control methods to optimise performance of one or more characteristics, under one or more load conditions.

Accordingly, there is a need in the art for an improved multimodal converter structure and/or interleaving switching control method for a polyphase connected inductive load.

SUMMARY OF THE INVENTION

It is an object of the present invention to overcome or ameliorate at least one of the disadvantages of the prior art, or to provide a useful alternative.

One or more aspects of the invention was found to have a surprising and non-obvious benefit which required many hours of validation in simulation and hardware.

According to a first aspect of the invention there is an interleaved control method for a converter for a polyphase connected inductive load such as a three-phase winding of star or delta configuration.

In one aspect of the invention, there exists a DC to DC buck or boost controller for a polyphase inductive load wherein at least two phases may be interleaved in series with at least one other phase, and wherein the phase shift between the first interleaved phase and the second interleaved phase is adjustable based on the duty cycle of the first phase.

In one aspect of the invention, there exists a DC to DC buck or boost controller for a polyphase inductive load wherein at least two phases may be interleaved in series with at least one common phase, and wherein the switch timing and/or duty cycle of the second interleaved phase is adjustable based on the duty cycle of the first interleaved phase.

In one aspect of the invention exists a DC to DC buck or boost controller for a polyphase inductive load wherein at least two phases may be interleaved in series with at least one other phase, and wherein, a time defined as the value between the end of the duty cycle of the first interleaved phase and the start of the duty cycle of the second interleaved phase is defined as t1, and wherein the end of the duty cycle of the last interleaved phase and the end of the switching period is defined as t2, and wherein, the values of t1 and t2 are independently controlled.

In one aspect of the invention, exists a controller for a poly-phase buck or boost converter wherein the controller selectively controls the phase shift and/or switching pattern of the switches based on at least one of the voltage ratio or conversion current or conversion power requirements.

In one aspect of the invention, exists a controller for a poly-phase buck or boost converter wherein the controller selectively operates a single switch, or in an interleaved pattern, based on at least one of the voltage ratio or conversion current or conversion power requirements.

In one aspect of the invention exists a controller for a poly-phase buck or boost converter of one or more phases consisting of at least a first and a second phase in interleaved operation, wherein the controller controls the phase shift or timing of the second phase proportionally to the duty cycle of the first phase.

In one aspect of the invention, exists a controller for a poly-phase buck or boost converter wherein the controller selectively controls the phase shift and switching pattern of the switches based whether the duty cycle is less than 50% or greater than 50%.

In one aspect of the invention exists a controller for a multi-level poly-phase buck or boost converter of one or more phases consisting of at least a first phase and a second phase in series with a common phase, wherein the controller controls the voltage level of the second phase according to the voltage level or current of the first phase.

In one aspect of the invention exists a multi-modal controller for a polyphase load for at least two DC sources able to operate in at least two modes of DC to DC convert mode of buck or boost from at least one of the DC source to at least one other of the DC sources, and an AC to DC or DC to AC mode between at least one of the DC sources and the poly-phase load.

In another aspect of the invention exists a controller for an asymmetrical polyphase load consisting of at least three drive circuits, wherein at least two of the drive circuits may be operated by the controller in an interleaved operation, where operation of the one of the drive circuits is dependent on the operation of another.

In one aspect of the invention there exists a controller for an asymmetrical polyphase load consisting of at least three phase legs each driven by a corresponding drive circuit, wherein, at least one of the phase legs is configured in series, and at least two of the phase legs are configured in parallel, and wherein the two parallel phase legs are interleaved where the phase timing of the second switched drive circuit is dependent on the duty cycle of the first.

In one aspect of the invention there exists a method of controlling an electrical circuit with two parallel drive circuits, wherein the phase shift of the second switched drive circuit is dependent on the duty cycle of the first switched circuit In one aspect of the invention there exists a method of controlling an electrical circuit with two parallel drive circuits, wherein the duty cycle of the second switched drive circuit is dependent on the duty cycle of the first switched circuit In another aspect of the invention exists a controller for an asymmetrical polyphase load wound in a star-point configuration, and wherein the star-point includes a capacitor in series with a switching mechanism, and wherein in a first mode of operation the controller disconnects the capacitor from the star-point using the switching mechanism, and wherein in a reconfigured second mode of operation, the electrically connects the capacitor using the switching mechanism.

In one aspect of the invention, the polyphase inductive load is an electric motor, and one of the inductive phases is common to both the first switched phase and the second switched phase.

In one aspect of the invention there exists a controller (200) for a converter (150) with a polyphase inductive load (120, 121, 122, 123, La, Lb, Lc, Lu, Lv, Lw, L1, L2, L3) including;
  A first inductive phase connected to a first drive circuit containing a first switching device with a first duty cycle ($D_1$);
  A second inductive phase connected to a second drive circuit containing a second switching device with a second duty cycle ($D_2$);
  A common inductive phase providing an electrical current supply path to both the first inductive phase and the second inductive phase;
  A control circuit for controlling the first switching device and the second switching device wherein the phase shift ($t_1$, $t_{o1}$, $t_{o2}$) of the second duty cycle ($D_2$) of the second switching device is determined by the first duty cycle ($D_1$) of the first switching device.

In one aspect of the invention there exists a method of controlling an electrical circuit, wherein the electrical circuit includes:
  at least a first drive circuit and a second drive circuit in parallel, each connected to one or more phases of the polyphase connected inductive load; and wherein the controller includes:
  a switching period;
  a first duty cycle ($D_1$) of switching the first drive circuit determined as a proportion of the switching period;
  a second duty cycle ($D_2$) of switching the second drive circuit determined as a proportion of the switching period;
  a last duty cycle of switching the last switched drive circuit which may be the same as the second drive circuit determined as a proportion of the switching period; and wherein the controller includes a first period ($t_1$) between the end of the first duty cycle and the beginning of the second duty cycle, and a second period ($t_2$) between the end of the duty cycle of the last switched drive circuit and the end of the switching period; and wherein the first period ($t_1$) is not equal to the second period ($t_2$).

A method of operating a converter for a polyphase connected inductive load, wherein the converter includes;
  at least a first drive circuit and a second drive circuit in parallel, wherein each drive circuit is connected to one or more phases of the polyphase connected inductive load; and wherein the method comprises:
  a first switching duty cycle (D1) period applied to the first drive circuit;
  a second switching duty cycle (D2) period applied to the second drive circuit;
  a switching period determined as the time between the frequency of the first switching duty cycle;
  an offset time ($t_{o2}$) as determined from the centre of the first duty cycle to the centre of the second switching duty cycle;
  and wherein, the offset time ($t_{o2}$) is derived, at least in part, by the length of the first switching duty cycle (D1).

In one aspect of the invention there exists an offset time ($t_{o1}$) as determined from the rising edge of the first duty cycle to the rising edge of the second switching duty cycle; and wherein, the offset time ($t_{o1}$) is independent of the length of the second switching duty cycle (D2).

In one aspect of the invention there exists a phase shift between a first duty cycle (D1) and a second switching duty cycle (D2), and a first time (t1) between the falling edge of the first duty cycle and the rising edge of the second duty cycle; and wherein, the phase shift is dependent of the length of the first time (t1).

In one aspect of the invention there exists a method of operating a converter for a polyphase inductive load, wherein the method comprises:
  In one aspect of the invention there exists a method of operating a converter, wherein the converter includes;
  A 3-phase inductive load connected in wye configuration;
    at least a first drive circuit and a second drive circuit in parallel connected to a first voltage source, wherein each drive circuit is connected to one phase of the polyphase inductive load;

wherein each of the phases connected to the first drive and the second drive circuit are in series connection with the other phase of the inductive load and a second voltage source In one aspect of the invention there exists a controller for a drive circuit with a polyphase inductive load in wye configuration, and a capacitor and switching mechanism connected to the star-point of the wye configuration, and wherein controller operates the drive circuit and the capacitor operate in a first and a second mode, and wherein in the first mode the capacitor is disconnected from the star-point via the switching mechanism, and wherein in the second mode the capacitor is connected to the star-point via the switching mechanism.

In one aspect of the invention there exists a method of operating a converter for a polyphase inductive load, wherein the method comprises:
 a first switching duty cycle ($D_1$) period applied to the first drive circuit;
 a second switching duty cycle ($D_2$) period applied to the second drive circuit;
 a switching period ($t_{fsw}$) measured as the distance between the duty cycles applied to the first drive circuit;
 an offset time ($t_{o1}$) as determined from the start of the switching period to the second switching duty cycle;
 and wherein, the offset time ($t_{o1}$) is determined at least in part by the length of the first switching duty cycle $D_1$.

In one aspect of the invention, there exists a first offset time ($t_{o1}$) between the rising edge of the first switching duty cycle ($D_1$) and the rising edge of the second switching duty cycle ($D_2$), and a first time ($t_1$) between the falling edge of the first switching duty cycle ($D_1$) and the rising edge of the second switching duty cycle ($D_2$), and wherein the first offset time ($t_{o1}$) is determined by the sum of length of time of the first switching duty cycle ($D_1$) and the first time ($t_1$).

In one aspect of the invention, there exists a second offset time ($t_{o2}$) between the centre of the first switching duty cycle ($D_1$) and the centre of the second switching duty cycle ($D_2$), and a first time ($t_1$) between the falling edge of the first switching duty cycle ($D_1$) and the rising edge of the second switching duty cycle ($D_2$), and wherein the second offset time ($t_{o2}$) is determined by the sum of length of time of half the first switching duty cycle ($D_1$), half the first switching duty cycle ($D_1$), and the first time ($t_1$).

In one aspect of the invention, there exists a first offset time ($t_{o1}$) between the rising edge of the first switching duty cycle ($D_1$) and the rising edge of the second switching duty cycle ($D_2$), and wherein the first time offset ($t_{o1}$) is independent of the length of the second switching duty cycle ($D_2$).

In one aspect of the invention, there exists a first offset time ($t_{o1}$) between the rising edge of the first switching duty cycle ($D_1$) and the rising edge of the second switching duty cycle ($D_2$), and a first time ($t_1$) between the falling edge of the first switching duty cycle ($D_1$) and the rising edge of the second switching duty cycle ($D_2$), and wherein the first time offset ($t_{o1}$) is actively determined by at least one of the first switching duty cycle ($D_1$) or the first time ($t_1$).

In one aspect of the invention, there exists a second offset time ($t_{o2}$) between the centre of the first switching duty cycle ($D_1$) and the centre of the second switching duty cycle ($D_2$), and a first time ($t_1$) between the falling edge of the first switching duty cycle ($D_1$) and the rising edge of the second switching duty cycle ($D_2$), and wherein the second time offset ($t_{o2}$) is actively determined by at least one of the first switching duty cycle ($D_1$), the second duty cycle ($D_2$), or the first time ($t_1$).

In one aspect of the invention, there exists controller (200) for a first duty cycle (D1) of a first switching device (SWITCH 1), and a second duty cycle (D2) of a second switching device (SWITCH 2), and wherein a first time ($t_1$) is defined between the falling edge of the first switching duty cycle ($D_1$) and the rising edge of the second switching duty cycle ($D_2$), and wherein the first time ($t_1$) is actively managed by the controller (200).

In one aspect of the invention there exists a first duty cycle (D1) of a first switching device (SWITCH 1) and a second duty cycle (D2) of a second switching device (SWITCH 2), and wherein the phase shift between the first duty cycle (D1) and the second duty cycle (D2) is variably controlled.

In one aspect of the invention wherein a first time ($t_1$) defined between the falling edge of a first switching duty cycle ($D_1$) of a first switch (SWITCH 1) and the rising edge of a second switching duty cycle ($D_2$) of a second switch (SWITCH 2), is actively managed by a controller (200) to be zero In one aspect of the invention there exists a controller (200) and a method of control for a first switching device (SWITCH 1) and a second switching device (SWITCH 2), and wherein the controller (200) uses at least two trigger points of a feedback loop with one or more hysteresis thresholds, to derive at least in part, a first duty cycle (D1) of the first switching device (SWITCH 1), and a second duty cycle (D2) of the second switching device (SWITCH 2).

In one aspect of the invention there exists a controller (200) and a method of control for a first switching device (SWITCH 1) and a second switching device (SWITCH 2), and wherein the controller (200) uses one trigger point to determine when to turn off the first switching device (SWITCH 1), and uses another trigger point to determine when to turn off the second switching device (SWITCH 2).

In one aspect of the invention there exists a controller (200) and a method of control for a first switching device (SWITCH 1) and a second switching device (SWITCH 2), and wherein the controller (200) uses a hysteresis threshold of a first current sampled relating to the first switching device to trigger a first event (pt1) to turn off the first switching device; and wherein the controller (200) uses a hysteresis threshold of a second current sampled relating to the second switching device to trigger a second event (pt3) to turn off the second switching device.

In one aspect of the invention there exists a controller (200) and a method of control for a first switching device (SWITCH 1) and a second switching device (SWITCH 2), and wherein the controller (200) uses a first hysteresis threshold of a common current to trigger a first (pt1) event to turn off the first switching device; and wherein the controller (200) uses a second hysteresis threshold of a common current to trigger a second event (pt3) to turn off the second switching device.

In one aspect of the invention there exists a controller (200) and a method of control for a first switching device (SWITCH 1) and a second switching device (SWITCH 2), and wherein the controller (200) uses a first hysteresis threshold (hyst_1, hyst1_high) of a feedback signal to trigger a first event (pt1) to turn off the first switching device; and wherein the controller (200) uses a second hysteresis threshold (hyst1_low, hyst_2) of a feedback signal to trigger a second event (pt2) to turn on the second switching device; and wherein the controller (200) uses a third hysteresis threshold (hyst2_high, hyst_3) of a feedback signal to trigger a third event (pt3) to turn off the second switching device.

In one aspect of the invention there exists a controller (200) and a method of control for a first switching device (SWITCH 1) and a second switching device (SWITCH 2), and wherein the controller (200) uses a fourth hysteresis threshold (hyst2_low, hyst_4) of a feedback signal to trigger a fourth event (pt4) to turn on the first switching device.

In one aspect of the invention there exists a method of operating a converter for a polyphase connected inductive load, wherein the method comprises:

switching on the first drive circuit for a first period (D1) until a first current flowing through the first drive circuit reaches a first hysteresis threshold (hyst1_high, hyst_1), and then switching off the first drive circuit;

waiting for a delay period (t1) until the first current flowing through the first drive circuit reaches a second hysteresis band (hyst1_low, hyst_2), and then switching on the second drive circuit for a second period (D2) until a second current flowing through the second drive circuit reaches a second hysteresis threshold (hyst2_high, hyst_3), and then switching off the second drive circuit.

The present invention also provides a controller and an interleaved switching method for a converter for a polyphase connected inductive load including and a method for operating: at least a first drive circuit and a second drive circuit in parallel, each connected to one or more phases of the polyphase connected inductive load; wherein the controller includes: a switching period ($t_{fsw}$); a first duty cycle ($D_1$) period of switching the first drive circuit determined as a proportion of the switching period; a second duty cycle ($D_2$) period of switching the second drive circuit determined as a proportion of the switching period; a last duty cycle of switching the last switched drive circuit which may be the same as the second drive circuit determined as a proportion of the switching period; and wherein the controller includes a first period ($t_1$) between the end of the first duty cycle and the beginning of the second duty cycle, and a second period ($t_2$) between the end of the duty cycle of the last switched drive circuit and the end of the switching period; and wherein the first period ($t_1$) is not equal to the second period ($t_2$).

The controller and method wherein the ratio of the first period ($t_1$) to the second period ($t_2$) changes with duty cycle. The controller and method wherein the first period ($t_1$) is equal to zero when the first or second duty cycle is less than 50%. The controller and method wherein the first period is greater than zero when the first or second duty cycle is less than 50%. The controller and method the first period is less than zero when the first or second duty cycle is less than 50%. The controller and method wherein the first duty cycle is not equal to the second duty cycle. The controller and method wherein the first period is less than zero when the first or second duty cycle is greater than 50%. The controller and method wherein the first duty cycle is equal to the second duty cycle.

The controller and method wherein the polyphase connected inductive load includes at least three phases, and wherein the third phase is in series with at least one of the first phase or the second phase when switched by the corresponding drive circuit. The controller and method where a third drive circuit is part of a third phase in series with at least one of the first phase or the second phase, wherein the third drive circuit includes a buck switch.

The controller and method wherein multiple interleaving strategies are employed, and the current interleaving strategy is selectively based on expected power or current of conversion. The controller and method where the controller further comprises a selection method based on parameters, whether to employ a first switching strategy or a second switching strategy. The selective switching strategy depends on whether either or both of the first duty cycle or the second duty cycle is <50% or >50%. The selective interleaving strategy is dependent on output power or ripple current and wherein controller determines whether to switch one switch individually, or two switches in an interleaved pattern.

The present invention also provides a controller and an interleaved switching method for a converter for a polyphase connected inductive load as herein described with respect to the detailed description and the figures.

Further forms of the invention are as set out in the appended claims and as apparent from the description.

BRIEF DESCRIPTION OF THE DRAWINGS

Embodiments of the invention will now be described, by way of example only, with reference to the accompanying drawings in which:

FIG. 2 is an electrical schematic of another controller for a poly-phase inductive load FIG. 3 is an overview of a prior-art single switch switching pattern which may be applied or configured to the controller of FIG. 1 or FIG. 2.

FIG. 4 is an overview of a prior-art interleaving buck or boost switching pattern which may be applied or configured to the controller of FIG. 1 or FIG. 2.

FIG. 5 is an overview of a new sequentially interleaved buck or boost switching pattern which may be applied or configured to a controller of a buck or boost controller, for example FIG. 1 or FIG. 2.

DETAILED DESCRIPTION

Figure 1:
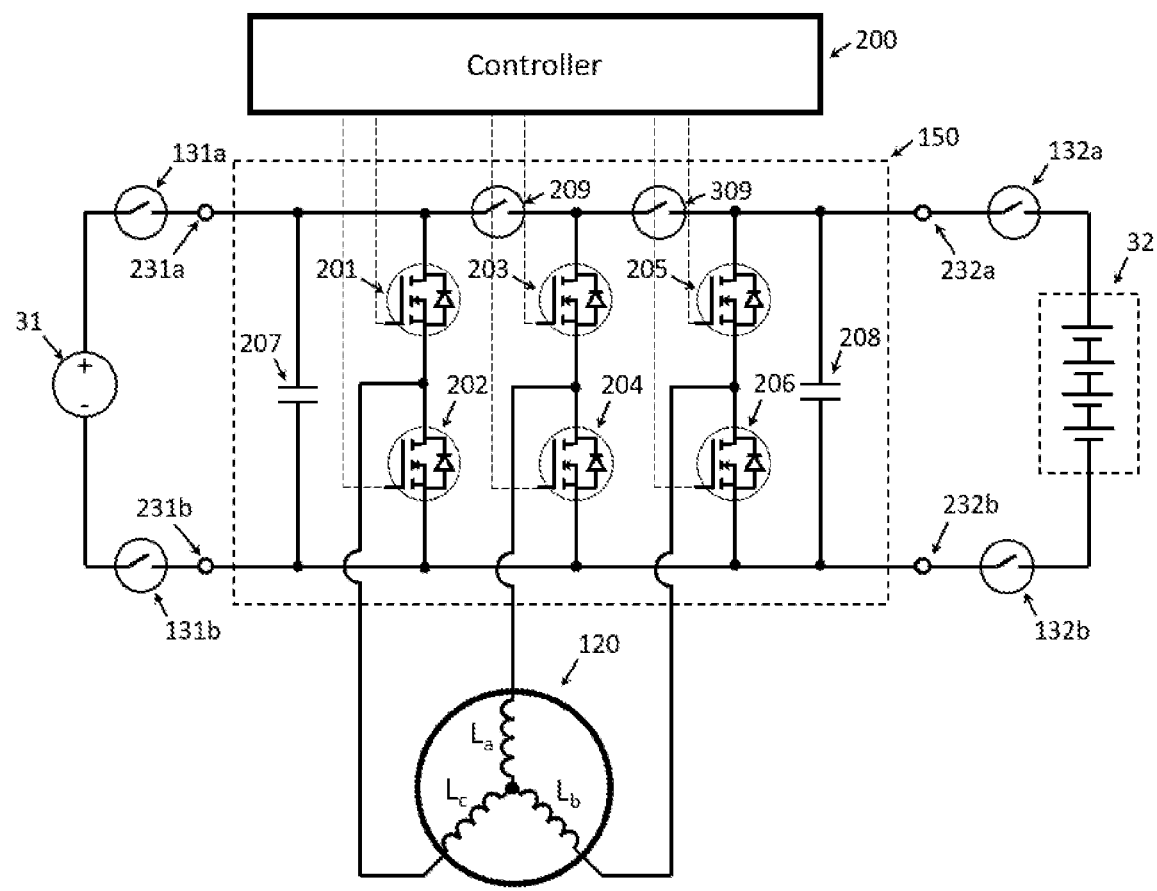
FIG. 1 is an electrical schematic of a controller for a poly-phase inductive load

FIG. 1 is a schematic representation of a multimodal converter structure with a polyphase connected load. This illustrated multimodal converter concept has been presented in previous applications as a new architecture for enabling DC to DC mode conversion from an otherwise 3-phase inverter-rectifier design. The apparatus had been described, however, a novel control method for such a novel converter has not yet been described in the literature.

In the proposed embodiment, controller 200 issues control signals to drive switches 201, 202, 203, 204, 205, 206, 209, 210 (if fitted), and 309 to determine the operation of the drive 150. Drive 150 is supplied by either one or both of a first DC source or sink and a second DC source or sink coupled at DC interface 231 (231a, 231b), and interface 232 (232a, 232b) respectively. In some embodiments, controller 200 also issues switching signals to switching mechanisms 131 and 132 to independently connect or disconnect each of the DC sources 31 and 32 respectively, to determine the power flow and direction of the conversion. In the present embodiment application, the polyphase connected inductive load is a wye connected 3-phase motor 120, for example, as a traction drive applied to an electric vehicle.

In a first state of operation, control 200 issues control signals to close switches 209 and 309 (if optionally fitted), opens 210 (if fitted), and modulates the drive switches 201-206, and either switch set 131 or 132 to draw or supply a DC load current from either or both DC interface(s) 31 and 32 respectively, and apply or receive an inverted or rectified rotating 3-phase AC current phase to or from machine 120's inductive phases La, Lb and Lc. In this mode, controller 200 operates drive 150 as a standard 3-phase inverter-rectifier, for example to create positive or negative torque in machine 120 and therefore provide tractive effort to an associated vehicle.

In this embodiment, controller 200 has current feedback on at least two of the load phases, and at least one voltage sensor(s) on the DC bus associated with capacitor 207 and/or capacitor 208. Controller 200 uses external contactors 132 to enable connection of DC input 232 to a battery pack 32 located onboard the electric vehicle, and uses contactors 131 to disconnect a further DC source 31 from DC input 231. In this mode, controller 200 may operate drive 150 to create tractive effort in machine 120 from the onboard battery pack 32. Controller 200 may further control one or more pre-charge circuit(s) to limit inrush of current to charge capacitor 207 and/or 208 from either DC source.

Due to the asymmetric implementation caused by switch 209 (and/or 309 if fitted) of a traditional 3-phase inverter, in one embodiment, controller 200 estimates the voltage drop of switch 209 (and/or 309 if fitted) as applied to inductive load $L_C$ via switch 201 from voltage source 32. For example, this can be achieved by ohms law V=i*R, or via a lookup table of device 209 (and/or 309 if fitted). This is particularly important for vector control schemes which require accurate phase voltage estimation, for example as used for estimating the flux in machine 120, which may include integration of voltage reference frame over time.

In another embodiment, each of the phases includes a voltage sensor. In such an embodiment, controller 200 may not need to estimate voltage drop of switch 209 (and/or 309 if fitted) as it may, for example, be determined directly via voltage sensor employed at the intermediate node of switch 201 and switch 202.

In another application of the embodiment, the electric machine 120 is employed in an application other than an electric vehicle. For example, machine 120 could be the electric motor of an electric cordless power tool such as a drill, circular saw, angle grinder, or the like.

In another application of the embodiment, polyphase connected inductive load 120 is a polyphase connected load other than an electric motor.

In another application of the embodiment, polyphase connected inductive load 120 is connected in delta configuration.

In this non-limiting embodiment, DC source 31 is an external charging station of voltage $V_C$, and DC source 32 is an onboard traction battery of voltage $V_B$.

In a second state, controller 200 issues control signals to open switch 209 (and/or switch 309 if fitted), optionally close optional switch 210 (if fitted), and uses the switches of drive 150 to draw a DC load current from one of the DC sources (e.g. 31), and supply a DC current to the other DC source (e.g. 32). In this mode, drive converter 150 is able to form a bidirectional buck-boost DC to DC converter using the inductance of machine 120. In this mode of operation, controller 200 may use feedback to determine the applicable mode or characteristics of operation, including; the voltage of the first DC source, the voltage of the second DC source, the intended maximum current of the conversion, the intended maximum and minimum voltages of the conversion, the power of the conversion, the reference voltage or current, actual currents or voltages, zero crossing detection, and the like.

A commonly used buck-boost converter structure is the cascaded four-switch buck-boost structure with a single inductor (or multiple inductors in series or parallel), where associated switching method are known and optimised for the structure. In the illustrated embodiment, with switch 209 or 309 open, drive converter 150 forms a cascaded six-switch buck-boost DC to DC structure with an asymmetric wye connected polyphase inductive load, which calls for a novel switching method of control to optimise one or more conversion factors.

In usual buck, boost, or buck-boost operation there will be discontinuous currents imposed on capacitors 207 and/or 208 depending on the operational mode. As converter 150 in this application example is intended to be an electric vehicle drive; size, weight, space, and cost of the drive is important, and therefore capacitors 207 and 208 are implemented with the least amount of capacitance as possible for desirable and stable operation. When in traction drive mode with switch 209 (and 309 if fitted) closed, capacitors 207 and 208 are in parallel and combined provide the bulk capacitance for drive 150. As the primary purpose of the drive is assumed to be as a traction drive for an electric vehicle with switch 209 (and/or 309 if fitted) closed, the combined capacitance of capacitors 207 and 208 is traditionally sized for this operational mode. However, this therefore leads to smaller capacitance when split into independent capacitance of capacitor 207 and capacitor 208, with reduced current ripple capabilities than the combined capacitance provides during traction modes.

For a known four-switch cascaded buck-boost converter, there is no possibility of interleaving which results in large ripple currents imposed on the input and output capacitors. Therefore, the standard topology is typically expanded to include multiple discrete sets of converters in parallel with common input and output, which can be interleaved to reduce the magnitude of switching ripple imposed on the input and output capacitors.

For some conversions, controller 200 may selectively employ one or more novel interleaving strategies to with consideration for the non-typical six-switch structure of converter 150 with polyphase inductive load as presented, to reduce the RMS current ripple on the capacitors 107 and/or 108, or to improve other measures of conversion as taught later in this specification.

The illustrated six-switch buck-boost converter with switch 209 open and switch 309 (if fitted) closed creates an asymmetric configuration of two half-bridges (consisting of switches 203 and 204, and 205 and 206) in parallel connected to DC input 232, and another single half-bridge (consisting of switches 201 and 202) connected to DC input 231. In this configuration, for example, switches 203 and 204 and inductive phase $L_a$ may be considered the first phase, and switches 205 and 206 and inductive phase $L_b$ may be considered the second phase, and switches 201 and 202 and inductive phase $L_c$ may be considered the third phase. Alternatively, with switch 309 open and switch 209 closed, the half-bridges consisting of switches 201 and 202, and 203 and 204 are connected in parallel to DC input 231, whereas the half bridge of 205 and 206 is connected to DC input 232. In this configuration, for example, switches 203 and 204 and inductive phase $L_a$ may be considered the first phase, and switches 201 and 202 and inductive phase $L_c$ may be considered the second phase, and switches 205 and 206 and inductive phase $L_b$ may be considered the third phase. For the conversion, the upper switches of the drive circuit phase may be used as buck switches (for example 201, 203, and/or 205), and the lower switches (for example, 202, 204 and/or 206) may be used as boost switches, depending on the conversion type, voltage relationship between $V_B$ and $V_C$, and intended direction of current flow. Controller 200 may only have opportunity to interleave two switching phases which may differ by conversion type, so therefore controller 200 may determine the switching states of 209 and 309 accordingly to allow for optimally interleaving a first and a second phase in either buck or boost mode in either direction. In other embodiments, only switch 209 or switch 309 is fitted, and interleaving is only possible for one set of switches or first and second phases (buck or boost switches) in either conversion direction. In other embodiments, different configurations are considered as the first and second phases.

$L_a$, $L_b$, and $L_c$ may equally be denoted as $L_1$, $L_2$ and $L_3$, or 121, 122, 123 respectively. In some embodiments, La, Lb and Lc, are wound in delta and may alternatively be denoted as $L_u$, $L_v$, and $L_w$, and mapped to any of the drive circuit phases in any configuration.

In some applications or instances of the embodiments, the individual phases may not have the same impedance or characteristic as one another. For example, for an electric machine, the impedance or inductance of each phase may be dependent on the instantaneous rotor position. Further different winding configurations of the stator, for example pole count, may deliver different characteristics per phase. In addition, different rotor types, for example, switched reluctance, squirrel cage induction machine, surface mount permanent magnet, or interior permanent magnet rotors may all have different characteristics such as saliency and/or flux patterns, which may impact impedance characteristics of the stator phases. Furthermore, under operating conditions the current flowing through one phase may impact on the voltage or current as applied to another phase since they are all interconnected in wye or delta configuration. Further in embodiments or applications where all of the phases are magnetically coupled, the current or voltage in one phase may directly impact the current or voltage of another phase through magnetic coupling. In some embodiments or applications, the individual characteristic of each phase is dynamic throughout the conversion process or operating period.

In some embodiments, one of the terminals of each power source, for example the negative terminals of power source 31 and power source 32, may be connected together at a common point before interfacing to converter 150. That is, in some embodiments terminal 231*b* and 232*b* may be combined into one terminal input to converter 150. In such cases, switches 131*b* and 132*b*, for example, may also be combined. Further, the converter may employ a filter structure across one or more of the terminals, for example a common mode filter, differential mode filter, EMI filter, Y-capacitance, or the like.

The inventors have proposed like embodiments of the electric structure apparatus illustrated in FIG. 1 in prior specifications as method of providing an electric vehicle traction drive in a first mode of operation, and an onboard DC to DC converter or onboard battery charger in a second mode of operation, using primarily the same power-electronics and thereby reducing cost and weight from the vehicle. It will be appreciated however to those skilled in the art that the resulting structure in the second mode of operation of a polyphase interconnected inductive load where two (or more) possible interleaved parallel phases are placed in series with a third phase, is not a typical apparatus or electrical structure for creating a DC to DC converter apparatus. Furthermore, in some applications such as when applied to an electrical machine traction drive of an electric vehicle, the two parallel phases and the series phase connection of the machine are also magnetically coupled. Therefore, this non-typical apparatus structure presents unique characteristics over traditional DC to DC converter structures, which given the inventions recent history have not been well researched in the prior-art to-date.

Reference is now made to FIG. 2 where a controller apparatus for six-switch buck-boost DC to DC converter for a polyphase connected inductive load is presented, where similar components to FIG. 1 are denoted by similar reference numerals. This embodiment is representative of the controller of FIG. 1 in one configuration with switch 209 held permanently open, and switch 309 held permanently closed. This could equally represent an alternative configuration with switch 309 held open and switch 209 held closed with the DC inputs of 231 and 232 reversed. In this embodiment, switches 209 and 309 are not illustrated for simplicity, however, in some applications they are not required to be fitted and are instead implemented using permanent open or short electrical circuits. In this embodiment, the DC voltage source applied to input 231 (being 231*a* and 231*b*) is assumed to be derived from an external DC source (for example DC charging station source 31 of FIG. 1) with voltage $V_C$. Likewise, the DC voltage source applied to input 232 (being 232*a* and 232*b*) is assumed to be derived from a local DC source (for example, a traction battery 32 for an electric vehicle), with a voltage $V_B$.

This embodiment consists of three half-bridge circuits, in this embodiment exemplified as six MOSFETs with free-wheeling diodes. In this embodiment, the first switching leg is made up of 203 and 204, a second switching leg of 205 and 206, and a third switching leg of 201 and 202. The first switching leg is connected to inductance La, the second switching leg to inductor Lb, and the third switching leg connected to Lc, wherein La, Lb and Lc are interconnected in a star or wye configuration. In this embodiment, the three phases La, Lb, and Lc form part of a three-phase motor of an electric vehicle, and are mutually coupled and wound on a common magnetic core. In other embodiments, the inductive phases are discrete and not magnetically couped, and/or are used for an application other than an electric vehicle.

In this embodiment, controller 200 is able to operate in bidirectional buck, boost, or buck-boost modes. Due to the asymmetric design of the converter and polyphase load connections, interleaving may only be available in certain modes of operation. For example, when performing a boost or buck-boost conversion from DC input 231 to DC input 232, switches 204 and 206 may be interleaved. However, when performing a buck conversion from 231 to 232, only switch 201 may be used. Similarly, when performing a buck or buck-boost conversion from DC input 232 to DC input 231, switches 203 and 205 may be interleaved, whereas only switch 202 may be used for boost conversions in the same direction. The controller is therefore of asymmetric design in interleaving, but maintains operation of buck and boost bidirectionally.

In this and other embodiments, the DC source or sink at DC input 231 and/or 232 may be a current or voltage source or sink, may have dynamic or static inductive, resistive, capacitive or other characteristics, and may be active or passive. Furthermore, the source may represent a voltage source or a current source depending on the application.

Controller 200 may regulate the amount of conversion current and/or voltage by adjusting the interleaving strategy, and/or duty cycles of the switches, and/or the switching frequency, and/or phase shift of the conversion. Controller 200 may determine the intended characteristics of the conversion in communication with external controllers, the loads or sinks, from feedback sensors, or the like.

The three-phase $L_a$, $L_b$, and $L_c$ may create an asymmetric buck or boost inductance depending on how controller 200 operates the three switching legs made up of switches 201 and 202, 203 and 204, and 205 and 206. For example, in some modes of operation $L_a$ may be in series with $L_b$, or $L_b$ in series with $L_c$, or $L_a$ and $L_b$ in parallel in series with $L_c$.

In some applications of the embodiments, one or more of the phase legs (for example $L_a$) may be operating in a different mode to one or more of the other phase legs (for example $L_b$), including at a different average or peak-to-peak current or voltage, or conduction mode. For example, $L_b$ and $L_c$ may be operating in continuous conduction mode, whereas $L_a$ is operating in discontinuous conduction mode. Such conduction modes and parameters of conversion may advantageously be controlled by controller 200 by enacting one or more of the proposed strategies described herein.

In some applications of the embodiment, the inductances or impedance of $L_a$, $L_b$, and $L_c$ may be of different values. For example, in the case that the polyphase load consists of an electric motor, the inductances of each phase may vary depending on rotor position. This means that controller 200 may control variables of the switching patterns of any one or more switches discretely, including the frequency, timing, and/or duty cycle. For example, the difference in switching patterns may be dependent on the inductance relationship of each phase, or the present position of a rotor (if relevant).

In other embodiments the polyphase load is connected in delta.

In other embodiments, the load is other than three-phases, for example, including 6-phases or 9-phases. In other embodiments, the load consists of one or more individual winding sets wound on a common core.

In some embodiments, switches are employed on the DC bus to selectively connect or disconnect DC sources $V_C$ and/or $V_B$, including pre-charge circuits to charge capacitor 207 and capacitor 208 respectively.

In this embodiment, where providing a conversion from left to right (that is from DC source $V_C$ to DC source $V_B$) it can be seen that a standard four-switch buck-boost converter structure can be achieved by using the third half-bridge switching leg, C (consisting of switch 201 and 202), and either of the first half-bridge switching leg, A (consisting of switch 203 and 204) or the second switching leg, B (consisting of switch 205 and 206). However, a new non-typical six-switch operation is also possible by controlling both the first and second switching legs, A and B.

When using six switches for the illustrated wye connected load, a single inductor Lc is placed in series with two inductors La and Lb in parallel. This means, only interleaving of La and Lb are possible, and Lc is subjected to the currents of the other two. In the embodiment, there may also be further consideration of the magnetically coupled nature of the polyphase load inductors La, Lb, Lc.

In a first mode of operation of the second state (DCDC state), controller 200 issues control signals to implement a boost conversion from DC source $V_C$ at DC interface 231 to DC source $V_B$ at interface 232, where the input voltage $V_C$ at interface 231 is lower than the DC voltage $V_B$ at interface 232. In this embodiment, controller 200 can implement four-switch cascaded buck-boost control method using buck switch 201 and/or either boost switches 204 or 206. However, in the novel asymmetrical polyphase load structure enabled by FIGS. 1 and/or 2, multiple switching legs are available to enable interleaving.

Reference is now made to FIG. 3 of a prior-art gate switching pattern applied to the schematic of FIG. 1 and/or FIG. 2 as controller by controller 200. In this embodiment of FIG. 3, only one switch is pulsed to achieve either buck or boost mode, and the duty cycle of the switch is controlled by controller 200 to regulate one or more characteristics of the conversion. That is a prior-art single phase switching strategy. For example, controller 200 may regulate the output current or voltage, or intermediate current or voltage of any of the switching nodes. For example, controller 200 may regulate a lower switch of either half-bridge switching leg A or B being switch 204 or 206 respectively, to regulate a boost charging current from $V_C$ at DC input 231 to $V_B$ at DC input 232. In this embodiment, controller 200 operates at a fixed frequency $f_{sw}$ and switching period $t_{fsw}$, and regulates the duty cycle of SWITCH 1 (either switch 204 or 206 in this example) to regulate the output. Similarly, controller 200 may operate in buck mode and apply the same strategy to control the duty cycle of switch 201 to regulate a buck charge from $V_C$ to $V_B$. Controller 200 may also implement two instances of the control strategy, one for the buck switch 201 and one for the boost switch of either 204 or 206. In this example, controller 200 operates in prior-art four-switch cascaded buck-boost converter mode.

In this prior-art embodiment, the switching period is defined as the centre of the duty cycle (that is, while the switch is ON) of one pulse, to the centre of the duty cycle of the next pulse. This convention is often used, but not limited to, when using a triangular wave form carrier. In such implementations, controller 200 may use a compare a duty cycle value to the triangular wave form to determine whether the output to SWITCH 1 should be ON or OFF.

Controller 200 may also operate bidirectionally in buck mode by either switching switch 203 or 205, or bidirectional boost mode by switching switch 202.

In another embodiment, controller 200 does not operate in fixed frequency mode and the switching time may therefore differ each switching period. For example, controller 200 may operate in bang-bang hysteresis mode.

Reference is now made to FIG. 4 of a prior-art interleaving gate switching pattern applied to the schematic of FIG. 1 and/or FIG. 2 as controlled by controller 200, where, for boost configurations from $V_C$ to $V_B$ for example, SWITCH 1 correlates to switch 204 of FIG. 2 and SWITCH 2 correlates to switch 206 of FIG. 2. Each switch also has a respective diode in the same drive circuit phase leg which continues to conduct the current when the switch is turned OFF. For example, for boost configurations from $V_C$ to $V_B$ for example, DIODE 1 correlates to switch 203 of FIG. 2 and DIODE 2 correlates to switch 205 of FIG. 2. In all new and prior-art embodiments, the ON signal represents a voltage, current, or signal, as required to turn on the relevant switch, for example, a gate driver providing a current or voltage to the gate of a MOSFET or IGBT. The OFF signal represents a low voltage, clamped rail (e.g. miller clamp), negative voltage or current, or other, as required by the specific switch to turn it off in the desired manner. The gate driver may include other components such as gate resistors, capacitors, over current and short circuit hardware detection (e.g. desaturation fault detection), or the like. The switching period $t_{fsw}$ is determined inversely by the switching frequency $f_{sw}$, and the duty cycle of the switching time of SWITCH 1 and SWITCH 2 may be determined by the controller based on a feedback loop or other metric. The switching period is illustrated as the centre of the duty cycle (that is, the switch ON time) of one pulse, to the centre of the duty cycle of the next pulse of SWITCH 1. The switching period between the centres of the ON time of SWITCH 2 is also of the same length, but is phase shifted 180 degrees from the period of SWITCH 1. In this embodiment of the prior-art, there is an equal dead time (that is, while no switch is ON) between switching the first switch OFF and the second switch ON defined as $t_1$, and turning the second switch OFF and the end of the switching period defined as $t_2$. Therefore, in the interleaved embodiment of the prior-are, $t_1$ is always equal to $t_2$, independently of switching frequency or duty cycle.

In one application or mode of the prior-art embodiment, controller 200 controls the duty cycle to regulate a constant current or constant voltage of $V_B$ while adhering to maximum limitations of components such as the current limitation of SWITCH 1 and SWITCH 2, or associated inductive load phases, including any derating. Controller 200 may implement one or more carrier signals which may be phase shifted 180 degrees apart to control the strategy, to make up a 360 degree period. Such prior-art interleaving strategies are often said to be 180 deg out of phase for such a configuration of two switching legs, however other degrees of phase shifting are possible with other number of phases, while maintaining equal dead times (that is, when all switches are OFF) between the any number of phases. For example, in prior art control methods, if the circuit included three interleaved phases, the phase shift between each phase would be 120 degrees. The formula for the phase shift in the prior-art is given by 360 degrees divided by the number of phases. In the present embodiment of two switching legs, controller 200 may include two triangular carriers of the same frequency, one for each SWITCH 1 and SWITCH 2, which are phase shifted the required 180 degrees apart. Alternatively, a singular triangular waveform may be used where one switch is triggered by the upper section or threshold of the triangular waveform, and the other switch triggered by the lower section or an inverse threshold. Therefore, the mid-point of the ON period of each SWITCH 1 and SWITCH 2 of the prior-art switching strategy are always the same distance apart as set by the phase shift correlating to the switching frequency.

The duty cycle represents a percentage of time which a switch is turned on within a switching period $t_{fsw}$. The duty cycles of SWITCH 1 ($D_1$) and SWITCH 2 ($D_2$) in the prior-art embodiment are identical, and may be represented by D, where $D=D_1=D_2$. Likewise, $t_1$ and $t_2$ are identical and may be represented by T, where $T=t_1=t_2$. Therefore the time between the start of the first duty cycle D1 (that is, when SWITCH 1 transitions from OFF to ON), to the start of the second duty cycle D1 (that is, when SWITCH 2 transitions from OFF to ON), is the same as the phase shift as illustrated irrespective of the duty cycle D.

In some embodiments of the prior-art, the phase shift between the first switched phase and the second switched phase may be defined by an offset time $t_{offset}$. The offset time $t_{offset}$ may be defined by the start of the first switching period to the start of the second switching period (e.g. $t_{o1}$ illustrated in FIG. 6), or from the centre of the first switching period to the centre of the second switching period (e.g. $t_{o2}$ illustrated in FIG. 6), depending on convention. For the present embodiments of the prior-art, $t_{o1}$ is dependent on both of the duty cycles and the switching frequency and may be defined as $t_{o1}=\frac{1}{2}*t_{fsw}+\frac{1}{2}*D_1-\frac{1}{2}*D_2$ (where the duty cycles are represented by their respective time rather than percentage of the switching period). For the present embodiments of the prior-art, $t_{o2}$ is only dependent on the switching period $t_{fsw}$. That is, $t_{o2}=\frac{1}{2}*t_{fsw}$, which is equivalent to 180 degrees. Only in cases where the duty cycles are equal are the resulting offsets equal (ie $t_{o1}=t_{o2}$). Considering the embodiment of the prior-art the duty cycles are the same, the offset time $t_{offset}$ or $t_{o1}$ or $t_{o2}$ are all equivalent, and may be used in lieu of the 180 degree phase shift depending on convention or mode of operation.

Although the prior-art control method may present the ideal conditions of interleaving two or more discrete phases; for the non-typical apparatus structure of FIG. 1 or FIG. 2 for example, the switching phases $L_a$ and $L_b$ are not discrete, and are electrically and sometimes magnetically coupled with a further phase $L_c$. Therefore, when the prior-art interleaving switching strategy of SWITCH 1 and SWITCH 2 is applied in the non-typical apparatus it may have undesirable effects. For example, the frequency of the ripple applied to the common interconnected third phase (i.e. $L_C$ in FIG. 2) may be subjected to a fundamental switching frequency which is double that of that applied to the first phase and the second phase discretely, which may cause some adverse effects which are not accounted for or considered in the prior-art. As each switching period of SWITCH 1 and SWITCH 2 are effectively independently controlled without consideration of one another, when the duty cycle D is greater than 50%, then the ON periods begin to overlap equally at both the start and end of each duty cycle which also may a high frequency ripple. A new control method for interleaving two switches for a polyphase interconnected load for a variety of applications and operational modes is therefore proposed.

Reference is now made to FIG. 5 of a new sequential interleaving switching pattern specifically designed for a polyphase load where duty cycle D is less than a threshold (for example, 50%), and applied, for example, to controller 200 of FIG. 1 or FIG. 2 in buck or boost DC to DC configuration. In one mode of operation, for example, when operating in a boost convert mode from DC source 31 of voltage $V_C$ at DC input 231, to DC source 32 of voltage $V_B$ at DC input 232, controller 200 may control switch 204 as SWITCH 1 and switch 206 as SWITCH 2 in the newly proposed sequential interleaving pattern. Likewise, when operating in buck convert mode from $V_B$ to $V_C$, controller 200 may operate switch 203 as SWITCH 1 and switch 205 as SWITCH 2. For the purpose of example, boost configuration is explored from DC source $V_C$ at DC input 231 to DC source $V_B$ at DC input 232. In this example, controller 200 controls the lower switches of two of the phases (in this example, being the switches 204 of phase $L_a$, and switch 206 of phase $L_b$ of FIG. 2) in the unique sequential interleaving pattern illustrated in FIG. 5. In this case, when operating in boost mode, any series buck switches are held ON (for example switch 201 in FIG. 2 when converting from $V_C$ to $V_B$). In the embodiment, a new switching period is exemplified as beginning each time SWITCH 1 transitions from OFF to ON (that is, the rising edge). However, the switching period may equally be defined as the transition of SWITCH 2 from OFF to ON, or the transition of either switch from ON to OFF (that is, the falling edge). In applications of the embodiment, this may be realised by a sawtooth carrier waveform. In this embodiment of FIG. 5, $t_1=0$, and there is no intended time delay between SWITCH 1 turning off and SWITCH 2 turning on. Therefore, the timing of turning ON of SWITCH 2 is tied to the duty cycle D1 of SWITCH 1, and the timing of the two switches are related to one another. In practice, there may be some transition time between SWITCH 1 turning OFF and SWITCH 2 turning ON caused by propagation time delay, and/or the rise and fall of each switch. This transition time may or may not be compensated for by controller 200. The sequential switching of SWITCH 1 and SWITCH 2 is in contrast to prior-art control methods which focus on having equal dead-time ($t_1=t_2$), or 180 degree phase shift, which may increase the frequency of the ripple imposed on a common interconnected phase with negative consequences. The proportion of time which SWITCH 1 is ON during the switching time $t_{fsw}$ is denoted as $D_1$, and the proportion of time which SWITCH 2 is ON during the switching time $t_{fsw}$ is denoted as $D_2$. In this embodiment, $D_1$ is equal to $D_2$ and each SWITCH has equal ON times. In this embodiment, controller 200 is able to dynamically control the phase shift of SWITCH 2 in respect to SWITCH 1 based on the duty cycle length of $D_1$. That is, the phase shift, or time delay, of SWITCH 2 may be directly proportional to the length of the duty cycle $D_1$ such that SWITCH 2 is able to turn ON as soon as SWITCH 1 turns OFF. Controller 200 is said to therefore employ a variable phase shift pattern of SWITCH 2 determined by the duty cycle of SWITCH 1. When using the convention of a switching period being centre-to-centre of the duty cycle of SWITCH 1, the phase shift of SWITCH 2 can be said to be equal to $\frac{1}{2}*D_1+\frac{1}{2}*D_2$, which is the same as D where $D_1=D_2$. As D is a percentage of $t_{fsw}$ which may represent 360 degrees, the phase shift in degrees may be equal to $D_1*360$. Therefore, it is obvious that the phase shift is directly proportional to the first duty cycle $D_1$.

In one application or mode of the embodiment, for example, controller 200 implements a PID error feedback loop on the input, common phase (e.g. $L_C$), or the output current compared with an ampere reference target, to set a duty cycle D between 0-100%. A carrier, timer, or pulse width modulating output at the switching frequency can then be used to set the state of SWITCH 1 and SWITCH 2. In one such example, the duty cycle is determined to be 30% per switch, and therefore the total ON time between SWITCH 1 and SWITCH 2 of equal duty cycles ($D_1$ and D2 respectively) is 60% of the switching time period. For example, if controller 200 sets a carrier sawtooth with a repeating value between 0 and 99 in the switching period, then a comparator may set SWITCH 1 to ON between counts 0 to 29, and SWITCH 2 to ON between 30 to 59. In this way, at the beginning of count 30 SWITCH 1 turns OFF and SWITCH 2 immediately turns ON, thereby providing sequential interleaving with $t_1=0$. Therefore, it is possible to easily implement the control strategy with one carrier signal at the appropriate frequency. In practice, a carrier with a smaller timestep and higher counter value (for example, 16 bit timer) would provide more resolution in the duty cycle calculation, and therefore greater resolute control of the conversion. In another example application of the embodiment, controller 200 issues a timer/capture compare, or interrupt for falling signal of SWITCH 1 ($D_1$), or similar, to begin a timer or period for SWITCH 2 ($D_2$).

In another implementation, application, or mode of the embodiment, controller 200 has a carrier frequency, timer, or PWM output for administering the duty cycle and switching of SWITCH 1. Controller 200 may also employ a capture compare or interrupt on the falling edge of the signal or output for when SWITCH 1 turns OFF, and then initiates a timer or other output to turn SWITCH 2 ON for a corresponding period of time.

In some embodiments, the phase shift between the first switched phase and the second switched phase may be defined by an offset time $t_{offset}$. The offset time $t_{offset}$ may be defined by the start of the first switching period to the start of the second switching period $t_{o1}$, or from the centre of the first switching period to the centre of the second switching period $t_{o2}$, depending by how the triggers or timer is chosen to operate. If $t_{offset}$ is defined by the start to the start of the switching periods, then $t_{o1}$ is equal to the time of the first duty cycle $D_1$ when $t_1=0$, or $t_{o1}=D_1+t_1$ when $t_1$ is not equal to zero as detailed later in the specification. If $t_{offset}$ is defined by the centre to centre of the switching periods, then $t_{o2}=\frac{1}{2}*D_1+\frac{1}{2}*D_2+t_1$, where $t_1$ may be equal to zero. Only in cases where the first duty cycle and the second duty cycle are equal (i.e. $D_1=D_2$), are the offsets equal (i.e. $t_{o1}=t_{o2}$). The offset time $t_{offset}$ or $t_{o1}$ or $t_{o2}$ may be used in lieu of the phase shift depending on convention or mode of operation.

That is, in applications or modes of the embodiments, a first offset period $t_{o1}$ defined by the start of a first switching duty cycle (e.g. $D_1$) of a first switch (e.g. SWITCH 1), to the start of a second switching duty cycle (e.g. $D_2$) of a second switch (e.g. SWITCH 2), is dependent only on the first switching duty cycle ($D_1$), plus a first time ($t_1$) between the duty cycles. That is the first offset time $t_{o1}$ may be represented as $t_{o1}=D_1+t_1$, and the first offset time has no dependence on the second duty cycle.

This is in stark contrast to the prior-art (for example as described in reference to FIG. 4), where $t_{o1}$ is defined by the switching period and the first and second duty cycles (e.g. $t_{o1}=*t_{fsw}+\frac{1}{2}*D_1-\frac{1}{2}*D_2$), and wherein the second offset time $t_{o2}$ is defined purely by half of the switching period $t_{fsw}$ ($t_{o2}=\frac{1}{2}*t_{fsw}$).

Further, in applications or modes of the embodiments, a second offset period $t_{o2}$ defined by the centre of a first switching duty cycle (e.g. $D_1$) of a first switch (e.g. SWITCH 1), to the centre of a second switching duty cycle (e.g. $D_2$) of a second switch (e.g. SWITCH 2), is dependent on half of the first switching duty cycle ($D_1$), plus half of the second switching duty cycle (e.g. $D_2$), plus any dead time ($t_1$) between the duty cycles. That is the second offset time $t_{o2}$ may be represented as $t_{o2}=0.5*D_1+0.5*D_2+t_1$.

Therefore, it will be appreciated that in the proposed embodiments, the first offset period and the second offset period are equal when the first duty cycle is equal to the second duty cycle. However, in cases where the first duty cycle and the second duty cycle are not equal, the first offset time and the second offset time are not equal.

In the illustration of one or more of the embodiments the start of a new switching period is defined as each time SWITCH 1 transitions from OFF to ON (that is, the rising edge). However, the switching period may equally be defined as the transition of SWITCH 2 from OFF to ON, or the transition of either switch from ON to OFF (that is, the falling edge). Furthermore, the switching period may also be defined as the centre of the duty cycle (that is, while the switch is ON) of one pulse, to the centre of the duty cycle of the next pulse as illustrated in reference to prior-art FIG. 4 for example.

In this embodiment, for duty cycles less than 50%, it can be said that SWITCH 2 operates in variable phase-shifted operation to align with the end of the duty cycle $D_1$ of SWITCH 1. Options for duty cycles above 50% are provided later in this specification.

Advantageously in embodiments, although the phase shift between SWITCH 1 and SWITCH 2 is variably controlled (e.g. through $t_1$), the duty cycle period of SWITCH 2 $D_2$ (that is, while SWITCH 2 is ON) and the dead time $t_1$, are controlled by controller 200 using the methods described herein such that there is no overlap between switching periods. For example, for applications or modes where duty cycles exceed 50% are detailed later in the specification.

For polyphase loads in star/wye configuration without a zero-sequence current path from the star/wye point, the sums of the current in all phases must equal zero. In this embodiment, SWITCH 1 causes current to be drawn through inductive load $L_a$ via $L_c$, and SWITCH 2 causes current to be drawn through inductive load $L_b$ via $L_c$. This means the fundamental switching frequency of all switches and current imposed on $L_a$, $L_b$, and $L_c$ are at the fundamental switching frequency of the converter. In this case, switching SWITCH 1 and SWITCH 2 sequentially with $t_1=0$ may be advantageous as the fundamental switching frequency of $L_c$ remains at the switching frequency $f_{sw}$, rather than 2× of the switching frequency with prior-art interleaving strategies of FIG. 4 where $t_1=t_2$. This may be advantageous as the reduction in effective switching frequency of $L_c$ may reduce switching related losses such as those related to skin effect, eddy currents and/or other magnetic, iron, or conductor losses. Such drawbacks of operating a typical polyphase interconnected load in phase shifted operation have not been addressed in the prior-art.

In some embodiments, $L_a$, $L_b$ and $L_c$ constitute an electric motor or transformer, and therefore losses and other effects may include induced currents and other effects in the rotor or other magnetically coupled windings or artifacts. For example, a higher switching frequency of $L_c$ may impose higher losses in one or both of the stator and/or rotor of a 3-phase electric machine.

In this case, current in $L_c$ is common to both $L_a$ and $L_b$, and therefore the current of $L_c$ may be used for feedback loop, and to determine maximum switching stress on the switches or inductive load.

Where diodes are fitted in anti-parallel configuration to a semiconductor switch (or the like), the switch of the anti-parallel diode may be switched synchronously to the diode conduction, or inversely to the corresponding switch. For example, where SWITCH 1 is switch 204, and DIODE 1 is anti-parallel to switch 203, switch 203 may be switching inversely or asynchronously to SWITCH 1.

In some operational modes using star/wye configured inductive loads, when SWITCH 1 is held ON and SWITCH 2 and its corresponding phase leg DIODE 2 (e.g. diode 205 for switch 206 operating as a boost switch) are OFF, the voltage of the wye point (illustrated as $V_Y$ in FIG. 2) may theoretically be equal to half the input voltage (e.g. $V_C/2$ in the example of FIG. 2 converting from $V_C$ to $V_B$). That is, in steady state of SWITCH 1 being ON and SWITCH 2 and DIODE 2 being OFF, half of the input voltage may be disposed across $L_c$ and half of the input voltage may be disposed across $L_a$. As such, the immediate sequential switching of SWITCH 2 may be advantageous in reducing the switching voltage and/or switching losses of SWITCH 2. In various configurations of conduction of the corresponding freewheeling diodes, for example diode of switch 203 DIODE 1 and the diode of switch 205 DIODE 2 when performing a boost convert mode from $V_C$ to $V_B$, the voltages of the star/wye point $V_Y$, and that imposed on SWITCH 1 and/or SWITCH 2 may be other than $V_C$, including being related to $V_C/2$, $V_B/2$, or any other voltage, including accounting for the standard voltage drops of the switches and diodes in question, and other resistive voltage drops. In some modes of operation of the embodiments, it can be said controller 200 may create or impose a multi-level switching voltage of one or more of the switching legs.

In some applications, it may be advantageous to slow the rate of change of the wye/star-point voltage $V_Y$ such that switching voltage or response is improved in one or more switching phases. Therefore, in some embodiments controller 200 may advantageously selectively couple a capacitor 211 $C_Y$ to the star/wye point $V_Y$ of the polyphase connected load, using optional switch 210 as exemplarily illustrated in reference to FIG. 2, but equally applied to any embodiment with a star-point connected load. Such a capacitance may only be beneficial during certain modes of operation and not in others, and therefore Cy 211 is able to be selectively coupled into the circuit by controller 200 using switch 210. For example, if controller 200 is for a converter for an electric vehicle, and the polyphase connected load is an electric vehicle traction motor, controller 200 may use switch 210 to disconnect $C_Y$ during propulsion operation (that is, having switch 210 open circuit), and using switch 210 to connect $C_Y$ during a DC to DC translation mode, for example, as used to charge an onboard battery (for example $V_B$) from another voltage source (for example $V_C$). Furthermore, controller 200 may choose to switch in $C_Y$ using switch 210 only for some conversion operating conditions. In any one of the presented switching control methods of this specification, selectively connecting $C_Y$ through switch 210 may have one or more of the following advantages; change the length of time which the drive circuits conduct current through their diodes, change the current distribution between the interleaved phases, smooth the current waveform of one or more phases, reduce switching ripple imposed on one or more filter capacitors, for example 207 and/or 208, slow down the rate of change of flux, reduce magnitude of leakage current paths, and/or reduce losses such as AC losses, eddy currents, proximity effect, skin effect, etc. Therefore, the star/wye capacitor $C_Y$ may be advantageously applied to any of the embodiments presented throughout this specification, but not illustrated for simplicity. In some applications of the embodiments which do not require multiple modes of operation (e.g. traction propulsion of an electric vehicle), CY may be permanently coupled to the star/wye point and switch 210 is optionally replaced with a permanent electrical connection. In some embodiments, switch 201 is a high-frequency switch such as a MOSFET or other semiconductor, and may be dynamically switched into the circuit based on dynamic conditions.

In one embodiment, inductive polyphase load is also magnetically coupled, and therefore a rapid change in flux may occur when swapping between SWITCH 1 and SWITCH 2. This may affect the inductance, current, and/or switching voltage of the phases.

In some embodiments with magnetically coupled phases, switching one leg (for example with SWITCH 1), may additionally advantageously effect the rate of change current flowing through the other leg (for example, flowing through $L_b$ and DIODE 2), or vice versa, through the magnetic coupling.

In another embodiment, more phases are available to interleave, and therefore more than two buck or boost switches are switched sequentially.

Therefore the novel switching methods of control as presented herein may be used to reduce switching losses of prior-art interleaving switching strategies (e.g. FIG. 4), whilst reducing switching ripple imposed on the input and/or output capacitors (e.g. 207 or 208 in FIG. 2) when compared to prior-art single switch switching control method of FIG. 3.

In another embodiment, more than two phases are able to be interleaved, and more than switches are defined in the switching pattern, up to switch n. In such cases, $t_n$ would represent the time between the end of the nth switch ON period, and the end of the period, wherein the first, second, . . . , to nth switch are sequentially operated.

Figure 6:
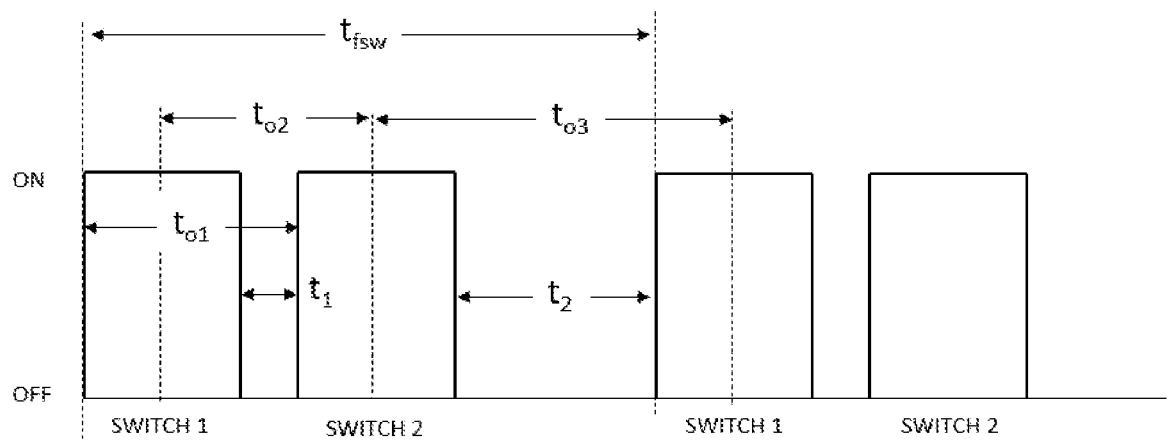
FIG. 6 is an overview of a new sequentially interleaved buck or boost switching pattern with variable phase shift which may be applied or configured to a buck or boost controller

Reference is now made to FIG. 6 of a switching method for SWITCH 1 and SWITCH 2 of a polyphase connected inductance load, where similar features may be denoted by similar reference numerals. In this embodiment of FIG. 6, $t_1$ is not zero, but has some time delay between the turning off of SWITCH 1 and the turning on of SWITCH 2, however $t_1$ remains not equal to $t_2$. In this scenario or version, adding a time delay between SWITCH 1 and SWITCH 2 may provide advantages to; avoid or reduce the magnitude or speed of change in magnetization or fluxes of magnetically coupled inductive loads; allow customisable distribution of current between $L_a$ and $L_b$; reduce current or voltage switching losses, magnetic or iron losses, or other losses; or the like when compared to the embodiment of FIG. 5. In some embodiments, the value of $t_1$ is a set time delay. In another embodiment, $t_1$ is a time delay based on duty cycle, or conversion current, or other conversion parameter. In another embodiment, the length of $t_1$ is determined via a feedback loop, or on some condition being met, for example, switching voltage, current, or otherwise. In this way, controller 200 is able to act to create a static or variable time shift $t_1$ between the switching of SWITCH 1 ON and the switching of SWITCH 2 OFF, and also the time $t_2$ between SWITCH 2 and the end of the switching period. Therefore, the relationship between $t_1$ and $t_2$ may be decoupled and able to be controlled dynamically or statically, either independently or set at a fix ratio. In this embodiment, $t_1$ is set such that the effective phase shift is less than 180 degrees, however, in another embodiment, $t_1$ is set sch that the effective phase shift is greater than 180 degrees. In another embodiment, $t_1$ is set such that the switching of SWITCH 2 is sequentially after the switches of SWITCH 1 in a first period, wherein, in a second period, $t_1$ is set such that SWITCH 1 is set to follow sequentially to SWITCH 2 in the following period thereby alternating the switching pattern.

In one or more applications or modes of the embodiment, an offset time $t_{o1}$ is defined between the start of the switching period (exemplarily illustrated as when SWITCH 1 transitions from OFF to ON) to the start of the second duty cycle D2 (that is, when SWITCH 2 transitions from OFF to ON). In this case, $t_{o1}$ may be represented as $t_{o1}=D_1+t_1$. In some applications or modes of the embodiments, $t_{o1}$ may be representative of the variable phase shift between SWITCH 1 and SWITCH 2.

In one or more applications or modes of the embodiment, a second offset time $t_{o2}$ is defined between the centre of the first duty cycle D1 (that is, the time while SWITCH 1 is on) to the centre of the second duty cycle D2 (that is, while SWITCH 2 is ON). In this case, $t_{o2}$ may be represented as half of the first duty cycle plus half of the second duty cycle plus the dead time in between, that is $t_{o1}=\frac{1}{2}*D_1+\frac{1}{2}*D_1+t_1$ and when $D_1$ is equal to $D_2$, $t_{o2}=D_1+t_1$. Therefore, it can also be seen that $t_{o2}$ is dependent on the duty cycle, and when the duty cycles are the same, $t_{o1}$ has the same value as $t_{o2}$. In some applications or modes of the embodiments, $t_{o2}$ may be representative of the variable phase shift between SWITCH 1 and SWITCH 2.

In one or more applications or modes of the embodiment, a third offset time $t_{o3}$ is defined between the centre of the second duty cycle D2 to the centre of the first duty cycle D1 of the next period. In this case, $t_{o3}$ may be represented as half of the first duty cycle plus half of the second duty cycle plus the dead time $t_2$, that is $t_{o3}=\frac{1}{2}*D_1+\frac{1}{2}*D_1+t_2$ and when $D_1$ is equal to $D_2$, $t_{o3}=D_1+t_2$. Therefore, it can be seen that when $t_1$ is not equal to $t_2$, the phase shift $t_{o1}$ between the first duty cycle and the second duty cycle, is not the same as the phase shift $t_{o3}$ between the second duty cycle and the first duty cycle of the next period. That is, the phase shift is not 180 degrees. In some applications or modes of the embodiments, $t_{o3}$ may be representative of the variable phase shift between SWITCH 2 and SWITCH 1, for example, while in the period of $t_2$.

In another embodiment, more than two phases are able to be interleaved, and more than switches are defined in the switching pattern. In such cases, $t_2$ could represent the time between the end of the second switch ON period, and the start of a third switch ON period, wherein the first, second, and third switches are sequentially operated. In such cases, $t_1$ need not equal $t_2$ or $t_3$, and so on.

In embodiments it can be seen that the relationship or ratio between $t_1$, $t_2$, and/or $t_{o1}$, $t_{o2}$, or $t_{o3}$, may change in respect to the duty cycle of $D_1$ and/or $D_2$.

It will be appreciated by those skilled in the art that alternating the definitions of SWITCH 1 and SWITCH 2 has no effect on the outcome of the conversion. Likewise, sequentially switching D1 after D2 is the same as sequentially switching D2 after D1. That is, in embodiments with t1=0 or t2=0 may deliver the same outcome. Such matters are therefore simply a matter of definition or convention.

Figure 7:
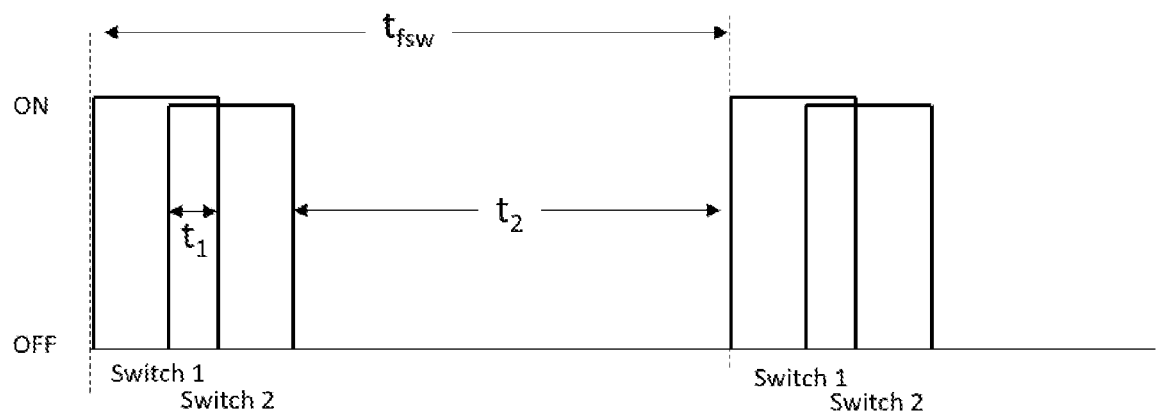
FIG. 7 is an overview of a new sequentially interleaved buck or boost switching pattern with variable overlapping phase shift which may be applied or configured to a buck or boost controller

Reference is now made to FIG. 7 of a switching control method for SWITCH 1 and SWITCH 2 of a polyphase connected inductance load, where similar features may be denoted by similar reference numerals. In this embodiment of FIG. 7, $t_1$ is less than zero (that is, applied in the opposite conventional sense to FIG. 6), but with magnitude less than the corresponding switching time (duty cycle $D_1$) of SWITCH 1. In this way, $t_1$ is representative of the time overlap for when SWITCH 1 and SWITCH 2 are both simultaneously ON. Equally, $t_1$ may be defined as a positive number, but applied negatively (e.g. $-t_1$). When considering boost configuration operation of FIG. 2 from $V_C$ to $V_B$, with SWITCH 1 (that is, switch 204) ON and DIODE 1 (that is diode 203) OFF, and SWITCH 2 (that is, switch 204) and DIODE 2 (that is, diode 205) OFF, the star-point voltage of machine 120 may trend toward half $V_C/2$, however, once SWITCH 1 is turned OFF and DIODE 1 begins to conduct, then if the second phase is not conducting (e.g. $i_b$ of FIG. 2) the star-point voltage of machine 120 may trend toward $(V_B-V_C)/2$, which may be higher than $V_C/2$. Therefore, it may be advantageous to switch ON SWITCH 2 prior to switching OFF SWITCH 1, as can be achieved with applying a negative value of $t_1$.

It may also be advantageous in some applications or modes of any of the embodiments to slow the rate of change of voltage of the star/wye point $V_Y$ (if star/wye winding configuration is used), such as by selectively coupling a star-point capacitor $C_Y$ as illustrated in reference to FIG. 2. Slowing the rate-of-change of $V_Y$ may therefore yield more flexibility in the timing of $t_1$ and/or $t_2$ while still minimising switching or other losses as detailed in this specification.

In embodiments or applications or modes where $t_1<0$, overlapping SWITCH 1 and SWITCH 2 may provide advantages to; avoid rapid magnetization or demagnetization of fluxes of magnetically coupled inductive loads; allow customisable distribution of current between $L_a$ and $L_b$; reduce current or voltage switching losses, magnetic core or iron losses, AC or other losses; or the like.

In some applications or modes of the embodiments, $t_1$ is a set time delay. In others, $t_1$ is a time delay based on duty cycle or conversion current or other conversion parameter. In others, the length of $t_1$ is determined via feedback loop, or on some condition being met, for example, switching voltage, current, or otherwise.

Figure 8:
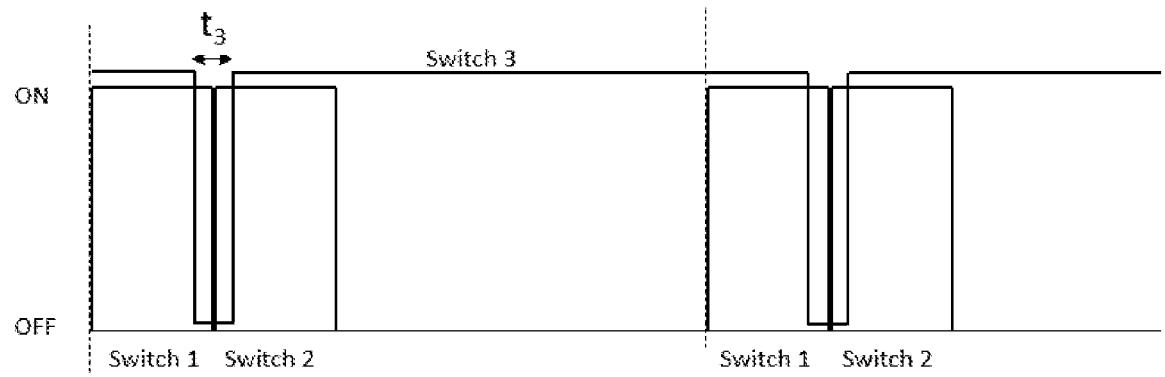
FIG. 8 is an overview of a new sequentially interleaved buck-boost switching pattern which may be applied or configured to a buck or boost controller

Reference is now made to FIG. 8 of a switching control method for SWITCH 1, SWITCH 2 and SWITCH 3 of a polyphase connected inductance load operating in buck-boost mode. In this embodiment, a third switch SWITCH 3 is shown representing a buck switch is shown. For example, SWITCH 3 represents switch 201 in FIG. 1 or FIG. 2 when operating in a boost convert mode from $V_C$ (31) to $V_B$ (32). In some applications or modes of the embodiment, the corresponding switch of the third drive circuit is switched inversely to SWITCH 3. For example, switch 202 may be switched inversely to switch 201 where switch 201 represents SWITCH 3 of the embodiment. In this embodiment $t_1$ can be equal to zero, less than zero, or greater than zero as described in FIG. 4, 5, or 6. In some applications or modes of the embodiment, SWITCH 3 is kept ON, except for during the toggling or transition between SWITCH 1 and/or SWITCH 2. Using FIG. 2 as example performing a buck-boost conversion from $V_C$ to $V_B$, when SWITCH 3 is turned OFF, the voltage of the star point (that is $V_Y$), may start to trend down. Therefore, when SWITCH 2 is turned ON, the switching voltage may be lower and thus reduce switching losses. In some applications or modes of the embodiment, the time $t_3$ begins on the falling edge of SWITCH 1, and turns back ON for the rising edge of SWITCH 2. That is, $t_3$ may define or be defined, at least in part, by $t_1$. In some applications or modes of the embodiment, the period of $t_3$ is longer than $t_1$, and in other instances it is shorter. In some modes of operation, this switching pattern may transfer switching losses from SWITCH 1 or SWITCH 2 to SWITCH 3.

In an alternative embodiment of buck-boost switching pattern, SWITCH 3 is toggled OFF just prior to SWITCH 1 turning on, and maintains ON at all times, including the sequential transition between SWITCH 1 and SWITCH 2.

Figure 9:
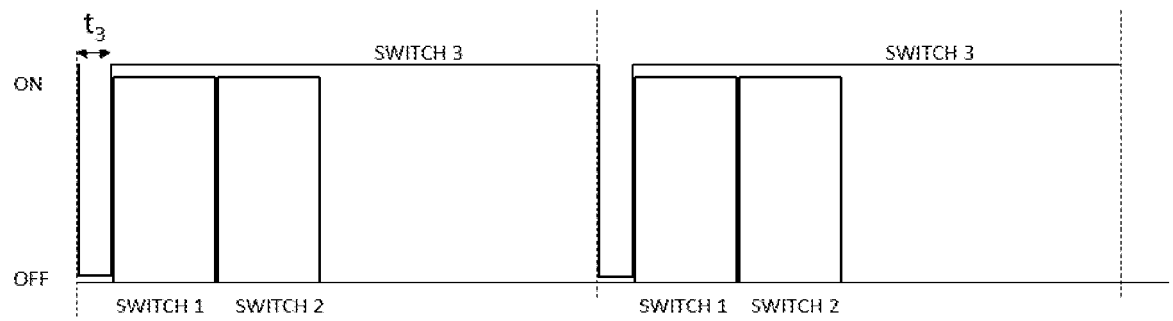
FIG. 9 is an overview of an alternative sequentially interleaved buck-boost switching pattern which may be applied or configured to a buck or boost controller

Reference is now made to FIG. 9 of a switching control method for SWITCH 1, SWITCH 2 and SWITCH 3 of a polyphase connected inductance load operating in buck-boost mode. In this application or mode of the embodiment, the $t_3$ switching period begins at the beginning of each switching period defined by the falling edge of SWITCH 3, and the duty cycle $D_1$ of SWITCH 1 only begins at some delay from the beginning of the switching period, which may be greater, equal to, or less than the time of $t_3$, such that SWITCH 1 turns ON during $t_3$ (e.g. while SWITCH 3 is OFF), or at the same time, or just after SWITCH 3 turns ON. In an alternative representation, $t_3$, or the OFF time of SWITCH 3, is at the end of the switching period, and begins at $t_{fsw}$-$t_3$ until $t_{fsw}$. Turning off SWITCH 3 prior to switching SWITCH 1 may allow for lower voltage switching of SWITCH 1, and thus bring efficiency or other improvements to one or more modes of operation. In some applications of modes of the embodiment, a further time delay is place between the switching ON of SWITCH 3 and the switching ON of SWITCH 1.

Figure 10:
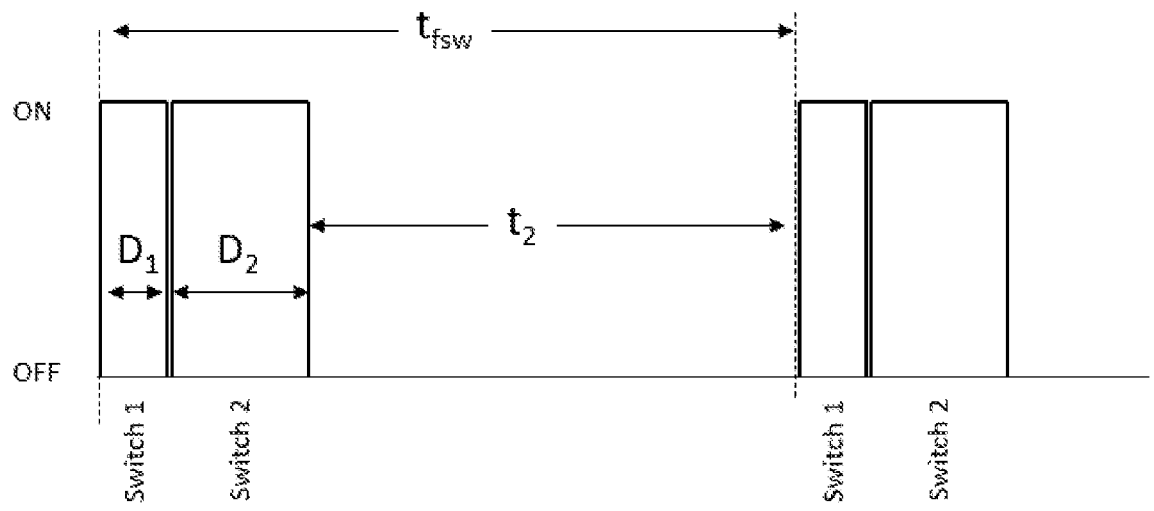
FIG. 10 is an overview of a new sequentially interleaved switching pattern with differing duty cycles which may be applied or configured to a buck or boost controller

Reference is now made to FIG. 10 of a switching control method for SWITCH 1 and SWITCH 2 of a polyphase connected inductance load operating in buck or boost mode. In this embodiment or version as shown by of example in FIG. 10, SWITCH 1 represents a buck or boost switch of one leg of the poly phase load, and SWITCH 2 represents another parallel leg of another buck or boost switch. In this embodiment, the duty cycle of SWITCH 1 is represented by $D_1$, and the duty cycle of SWITCH 2 is represented as $D_2$, where $D_1$ is not equal to $D_2$. Although D1 is illustrated as being smaller than $D_2$, it is equally valid in some applications of the embodiment that D1 is larger than $D_2$. The ratio between the two duty cycles $D_1$ and $D_2$ may be static or dynamic.

In one application of the embodiment, the length of $D_1$ may be determined by voltage, current, or zero crossing sensor feedback and corresponds to when a condition of current or voltage is met for the switch 1 node, or switch 2 node, star point node (if present), or other node.

In one or more applications or modes of the embodiment, $t_1$ (not shown) may be null to employ sequential phase shift operation, or positive to add a delay time between $D_1$ and $D_2$, or applied negatively to overlap the two duty cycles.

As the proposed load is a non-typical asymmetric polyphase interconnected impedance network, the operating characteristics of one branch may be dependent on one another. Therefore, in contrast to prior-art using 180 degree interleaving with equal duty cycles, the power flow between two switched phases using the same duty cycles may yield different characteristics, as they are exposed to different current, and/or voltage conditions imposed by the other interconnected phases, or star-point capacitance voltage (for example, when switch 210 of FIG. 2 is employed and turned ON). Moreover, where one or more of the electrically interconnected phases are magnetically coupled, the flux of one branch also has effect on one or more of the others.

Further, in some load implementations, such as an electric motor, the impedances of each phase may be dependent on further factors such as rotor position. Therefore, if the proposed novel control methods as applied to the novel polyphase load structure wish to balance the current densities and/or power dissipation of each switched phase leg branch, then non-equal duty cycles of the interleaved legs may be required which can be achieved by the proposed embodiment.

In one application or mode of the embodiment, the combined duty cycles of SWITCH 1 and SWITCH 2 are determined by a first PID feedback loop of the current in the common phase, and a second independent PID loop applied to the duty cycle of either SWITCH 1 or SWITCH 2 is applied to manipulate the peak, average, RMS, or integral of the ratio of current in both the first and second switching phase legs (for example, $L_a$ and $L_b$). In one application or mode of operation, the second PID loop acts to match the peak currents of $L_a$ and $L_b$, while the first PID loop acts to determine the average DC offset current in the common phase $L_c$. In this way, the duty cycles are both independently controlled, as the $D_1$ plus $D_2$ must equal the total duty cycle D. Alternatively, the first PID loop may act to control one SWITCH, and the second PID loop may act to control the other SWITCH. In such cases, both may be targeting the same target reference current, and due to discrepancies in impedance (e.g. due to a rotor position, or existing flux within a common magnetic core, etc), may result with different proportions of duty cycles depending on the mode and characteristics of the intended operation. In this way, it cannot be known whether $D_1$ will be more or less than $D_2$, and the ratio may be dynamic based on operating conditions or modes. More PID loops may be included for when there are more than two switching phases, such that the duty of every leg may be independently controlled. Note that "PID" is given as an example of a feedback loop only, and other feedback loops may be employed in its place. For example, a feedback loop may be constituted of any proportional, integral, or derivative values or constants for tracking a target value or error value thereof. In another application or mode of the embodiment, controller 200 implements hysteresis bands to control when a switch turns ON or OFF, which then determine the duty cycle $D_1$ and $D_2$.

In another application of the embodiment, SWITCH 1 is held ON until the current through an alternate phase (for example, $L_2$) is below some threshold, for example, close to zero, and then SWITCH 1 is turned OFF and SWITCH 2 turned ON after some delay $t_1$ (in this case, $t_1$=0). SWITCH 2 is then maintained ON to meet the output requirements of voltage or current, often determined by a feedback loop which may include a PID controller tracking to a target reference, or a hysteresis band, or the like. In this case, the ratio between $D_1$ and $D_2$ is dynamic, and $D_1$ may be larger or smaller than $D_2$ to meet the output requirements.

In another application of the embodiment, SWITCH 1 is held ON for some duty cycle $D_1$, for example as determined by a PID loop or the like, and SWITCH 2 is switched sequentially ON (that is, in variable phase shifted operation related to the first duty cycle D1) and remains ON until the current through at least one monitored phase meets some threshold, and then SWITCH 2 is turned OFF. For example, SWITCH 2 is held ON until the current through the first phase falls to a certain value (e.g. zero amps), or the end of a fixed switching period is reached, and then turned OFF. In this way, so long as the end of the switching period is not exceeded, increasing the duty cycle of $D_1$ necessarily increases the duty cycle of $D_2$ as the magnitude of current in the first phase is increased, and therefore takes longer to reduce back down to the threshold (which may be static or dynamic). The PID controller of $D_1$ will therefore automatically compensate for the corresponding adjustment in both $D_1$ and $D_2$. If the switching period is exceeded for some implementation of $t_1$, $t_1$ can be reduced, including to negative values to overlap the two phases as exemplified in reference to FIG. 7, for example, to ensure t2 is always greater than zero.

It is worth noting that the controller 200 may deploy different switching strategies or thresholds of any of the presented embodiments based on different factors, applications, and/or operational modes. For example, operational modes may be determined by input to output conversion voltage ratio, magnitude of voltages, magnitude of current, magnitude of error in the reference tracker, RMS ripple current imposed on the filter capacitors, heat of the components, position of a rotor, impedance ratio of different phases, or the like.

In some applications of the embodiments, the length of $D_1$ (or $D_2$) may have a maximum, minimum, or exact set length, or set proportionally to $D_2$ (or $D_1$) or the combined duty cycle to achieve a desired outcome. Such duty cycles may be dependent on other criteria, such as power, current, voltage, or buck or boost ratios (that is the ratio of $V_B$ to $V_C$) and the like. For example, in one application or mode, $D_2$ may be set to $\frac{2}{3}^{rd}$s of the value of $D_1$.

In the illustrated embodiment, $t_1$ is equal to 0 s, however in other embodiments $t_1 > 0$ s as described in reference to FIG. 6, or $t_1 < 0$ as described in reference to FIG. 7.

In another embodiment, for each alternating switching period, the duty cycles of $D_1$ and $D_2$ are swapped, for example, that duty cycle $D_1$ is applied to SWITCH 2 and duty cycle $D_2$ is applied to SWITCH 1 every alternative period. In this way, the average ON and OFF times of SWITCH 1 and SWITCH 2 may be equal (or close to) when averaged over multiple periods.

Figure 11:
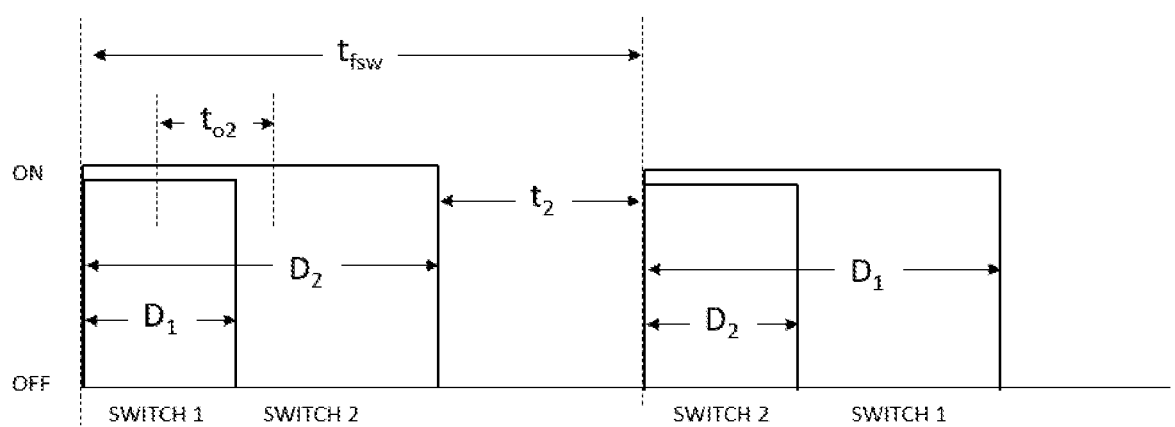
FIG. 11 is an overview of a new sequentially interleaved switching pattern of overlapped differing duty cycles which may be applied or configured to a buck or boost controller

Reference is now made to FIG. 11 of another switching control method for interleaving a first phase and a second phase. In the illustration of the embodiment, both the first duty cycle and the second duty cycle start at the beginning of the period, but with unequal duty cycle values. In this example, negative t1 is equal to the first duty cycle such that the first duty cycle is overlapped entirely by the second duty cycle. However, in other applications or modes of the embodiment another effective of $t_1$ is used. In the illustrated embodiment to1 is equal to zero, however the phase shift may be defined by the centre to centre of each duty cycles as exemplified by to$_2$. In the embodiment illustrated, every alternate switching period switches the duty cycles of the first switch and the second switch, such that the time averaged duty cycle applied to each switch may be identical or similar. In other applications or modes of the embodiments however, the duty cycles of D1 and D2 are not switched, and the duty cycle of one switch is persistently higher than the other across multiple switching periods.

As the non-typical polyphase interconnect load has a common phase in series with both of the interleaved phases, the current flowing through this common phase (for example $i_c$ in $L_c$ of FIG. 2) increases at a faster rate when both SWITCH 1 and SWITCH 2 are on. However, when the current in one phase begins to decrease while the other increases, the current through the common phase tends to stay near constant to satisfy that the sum of all currents in the polyphase load should be null (excluding the effects of any zero-sequence current, for example in or out of star-point capacitance $C_Y$). Further, by alternating the duty cycles applied to each phase, the average current through each phase may have a lower effective frequency. Therefore, the proposed embodiment may be advantageous in some applications or mores of the embodiment to improve one or more characteristics of the conversion.

Figure 12:
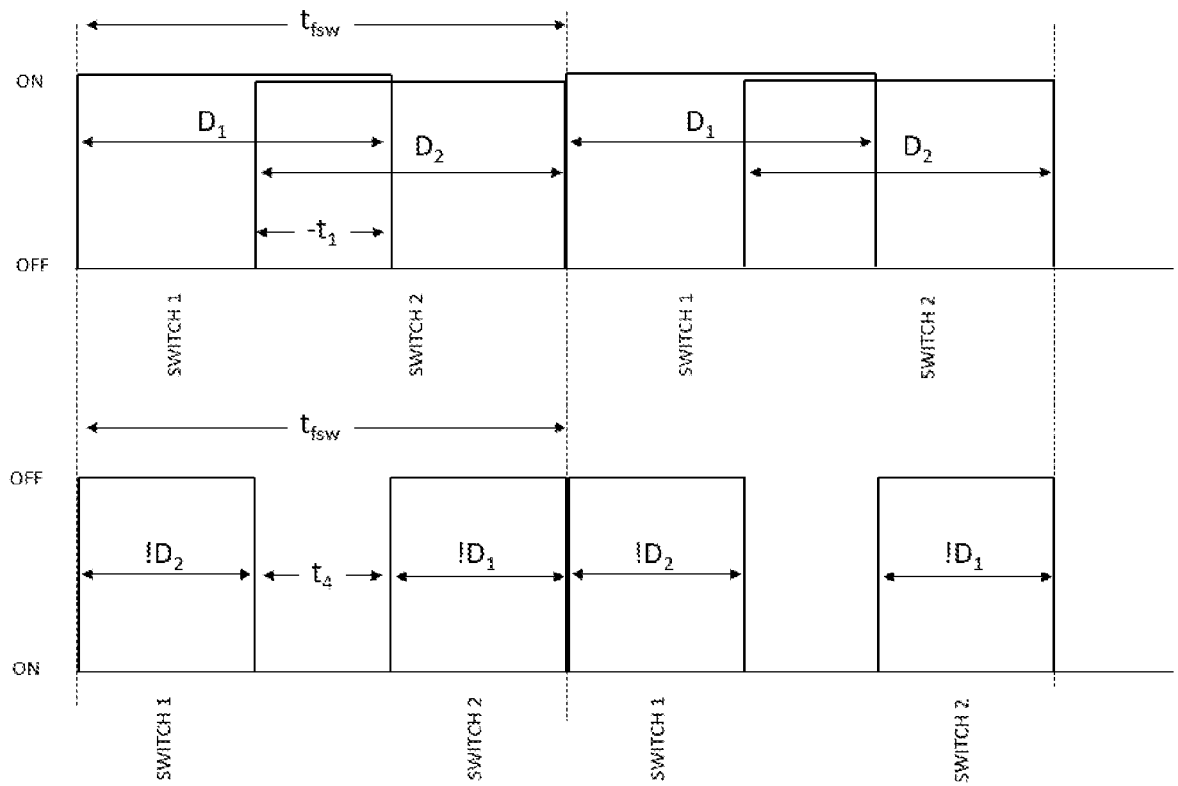
FIG. 12 is an overview of a new sequentially interleaved switching pattern for duty cycles greater than a threshold which may be applied or configured to a buck or boost controller

Reference is now made to FIG. 12 of another switching control method for implementations where the duty cycle $D_1$ of SWITCH 1, and/or the duty cycle $D_2$ of SWITCH 2 are greater than a threshold value (for example, 50% when $D_1=D_2$) of the switching frequency period, such that the combined duty cycle period is greater than total switching frequency period. That is, duty cycle>50% and no deadtime. In this embodiment of FIG. 12, the start time of the duty cycle $D_2$ of SWITCH 2 starts before the end of the duty cycle $D_1$ of SWITCH 1. This is similar to the pattern described in FIG. 6 with $t_1 < 0$ (that is, the magnitude of $t_1$ is used to overlap the duty cycles) and $t_2 = 0$ for duty cycles<50%, however any of the aforementioned strategies can be used for duty cycles<50% before transitioning to the present pattern. The present pattern can be implemented by the aforementioned sawtooth carrier by inserting a delay of the duty cycle $D_2$ of SWITCH 2 by length equal to the maximum period minus the duty cycle $D_2$ of SWITCH 2. In the example of a sawtooth carrier counting to, for example, a maximum of 100 and an example duty cycle $D_2$ of 80%, controller 200 may keep SWITCH 2 in the OFF state until a count of 20 is reached [example formula=(100%−$D_2$) *100], until the end of the switching period. Alternatively, controller may use the inverse of the duty cycle $D_2$ denoted as !$D_2$ (meaning "not $D_2$"), to hold SWITCH 2 in the OFF position until count 20, and then turn SWITCH 2 ON until the end of the period, and independently hold SWITCH 1 in the ON position until counter reaches 80 (that is, 0-80), and then turn SWITCH 1 OFF until the end of the switching period in line with !$D_1$. The time between then end of !$D_2$ and the start of !$D_1$ is illustrated having time $t_4$.

It can be seen, that with the interleaved strategy for duty cycles above 50% proposed in FIG. 12 that the OFF-times of SWITCH 1 and SWITCH 2 (being !D1 and !D2) are sequentially enacted in continuous operation between one period to the next. As described in reference to FIG. 5, at duty cycles below 50% with $t_1=0$, the ON times of SWITCH 1 and SWITCH 2 (that is, the time of $D_1$ and $D_2$ respectively) are sequential enacted in continuous operation.

In contrast, prior-art 180 deg phase shifted interleaved operation (for example as described in FIG. 4), with duty cycles of SWITCH 1 and SWITCH 2 each greater than 50%, the OFF-time of each switch !D (that is, the inverse of the duty cycle D) is seen to be sequentially interleaved, whereas the !D time of 180 deg phase shifted operation are still 180 deg interleaved. This has the advantage for the present invention that the overlapping time when both SWITCH 1 and SWITCH 2 are ON is only once per switching period, versus twice per period for the prior art of 180 degree interleaving, thereby reducing the frequency of the switching ripple imposed on the common phase (e.g. $L_c$ of FIG. 2). Further, at the end of the switching period, the ON time of SWITCH 2 and SWITCH 1 remain sequentially interleaved (e.g. with $t_2=0$), which provides some of the advantages as previously described.

Figure 13:
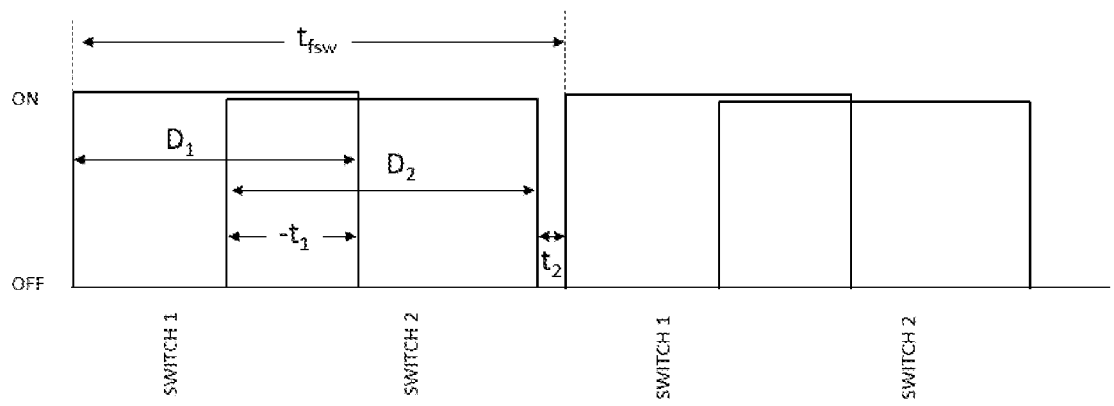
FIG. 13 is an overview of another new sequentially interleaved switching pattern for duty cycles greater than a threshold which may be applied or configured to a buck or boost controller

Reference is now made to FIG. 13 of a further switching method of control for implementations where the duty cycle $D_1$ of SWITCH 1, and/or the duty cycle $D_2$ of SWITCH 2 are greater than 50% of the switching frequency period, such that the combined duty cycle period plus a common deadtime $t_2$ is greater than total switching frequency period. In this embodiment a common dead-time $t_2$ is enacted where both SWITCH 1 and SWITCH 2 are OFF simultaneously. This is illustrated in the present embodiment as time $t_2$ at the end of the switching period. This time t2 is similar to time t2 in FIG. 7, and where time $t_1$<0 meaning the magnitude of time is applied to overlap the two duty cycles. In this case, with a common dead-time $t_2$, may act to reduce switching voltage or current and therefore switching losses. In some applications or modes of the embodiment, D1 and D2 are of equivalent value, whereas in other applications or modes they may be independently controlled.

Figure 14:
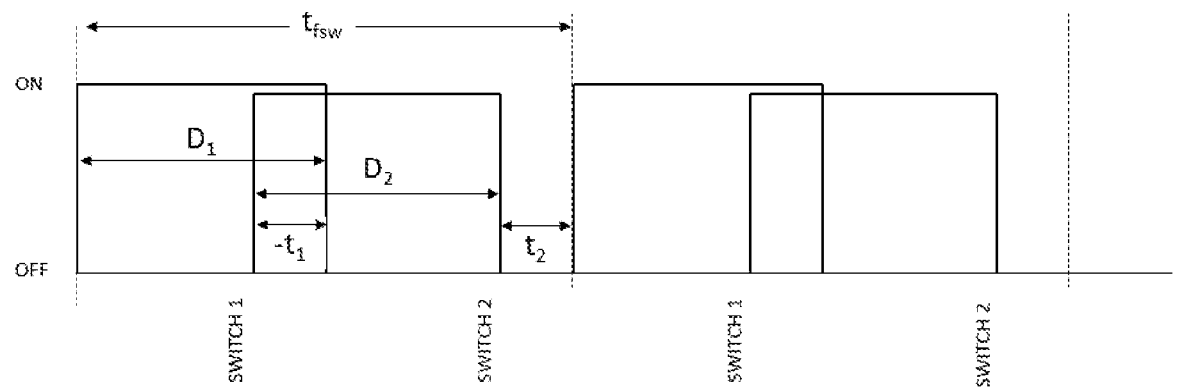
FIG. 14 is an overview of another new sequentially interleaved switching pattern for duty cycles greater than a threshold which may be applied or configured to a buck or boost controller

Reference is now made to FIG. 14 of a further switching control pattern for where each duty cycle $D_1$ and $D_2$ is equal to a maximum threshold value (for example, 50%), and the phase of the duty cycles move in respect to one another to manipulate the conversion characteristics. For some applications or modes of the embodiment, a duty cycle of either switching leg (that is $D_1$, or $D_2$) which is too high may not be preferred, and therefore a duty cycle limit is imposed. For example, in one embodiment, a limit is imposed so that enough time can be given for the flux built up in the inductance of the phase during the ON time to release its energy through the free-wheeling diode in the OFF time. In this case, controller 200 may still increase the output power of the conversion even after the duty cycle of each switch reaches the maximum preferred duty cycle value (in this example defined as 50%) by increasingly overlapping $D_1$ and $D_2$ (i.e. decreasing $t_1$ to negative value, which is the same increasing the magnitude of negative time $t_1$). For example, in applications where $D_1$ is equal to $D_2$, the time between $D_1$ and $D_2$ (that is, $t_1$) can be maintained at 0 s up to 50% duty cycle. When the individual duty cycles reach the maximum defined threshold (e.g. 50%) and output power needs to be increased further, this can be achieved by maintaining duty cycle at the maximum threshold (e.g. 50%), but decreasing $t_1$ such that $D_1$ and $D_2$ increasingly overlap. Controller 200 may decrease $t_1$ (that is, to overlap $D_1$ and $D_2$) until the maximum value is reached where the length of $t_1$ is equivalent to the length of $D_1$, such that $D_1$ and $D_2$ fully overlap.

In one application or mode of the embodiment, controller 200 assigns a terminology of a master duty cycle D determined by a PID feedback loop or other, where both the duty cycle $D_1$ of SWITCH 1 and the duty cycle $D_2$ of SWITCH 2 track the master duty cycle D in sequentially interleaved operation (for example, with $t_1$=0 as described in reference to FIG. 5) until D reaches 50%, and then as D increases beyond 50%, $D_1$ and D2 maintain a 50% duty cycle, but $t_1$ is decreased proportionally to the formula D-50%, such that when D=100%, $t_1$ is equal to 50% of the switching time period $t_{fsw}$, and $D_1$ and $D_2$ fully overlap. In this example therefore, when D<=50%, $D_1$=$D_2$=D, and $t_1$=0, whereas when D>50%, $D_1$=$D_2$=50%, and $t_1$=$t_{fsw}$*(50%–D). In such cases, the increase in power delivery may be non-linear or a step change between value changes of D<=50% when compared to D>50%. Therefore, two separate conditions may be maintained, perhaps with different PID tuning for these two charging conditions. For example, the two charging conditions for D<=50% and D>50% may be handed by a controller flow as described in reference to FIG. 22. Alternatively, the formula $t_1$=tfsw*(50%–D) may be tuned with an additional constant such that the performance is consistent with master duty cycles D less than the individual duty cycle threshold of $D_1$ and $D_2$ (50% in this example).

In another example, the maximum duty cycle of each switch (that is $D_1$ and $D_2$) is 80%, and therefore the master duty cycle D may hit 160% before $t_1$ is decreased to increasingly overlap $D_1$ and $D_2$. In another example application or mode of the embodiment, master duty cycle D is mapped to the same value as the individual duty cycles $D_1$ and $D_2$, and therefore after D hits the example threshold of 80% (and therefore $D_1$ and $D_2$ are also at 80%), any further increase of D until 100% correspond to a progressive decreasing of $t_1$.

In another example, $D_1$ and $D_2$ may increase with D in a sequential manner (e.g. $t_1$=0) until a first threshold value (for example, until D1=D2=50%), whence $t_1$ is decreased between the first threshold until a second threshold value is reached (for example, until $t_1$=50%*$t_{fsw}$, and $D_1$ and $D_2$ are fully overlapped), whence the duty cycles of $D_1$ and $D_2$ are further increased until they reach a second threshold (e.g. maximum of 100%). In this case, the three switching configurations could be set by the flowchart as described in reference to FIG. 22.

Note that in this example, a positive $t_1$ value represents a dead-time between SWITCH 1 turning OFF and SWITCH 2 turning ON (as illustrated in FIG. 6), and a negative $t_1$ value represents an overlap of SWITCH 1 ON and SWITCH 2 ON (as illustrated in FIG. 7).

In other applications or modes of the embodiments, the maximum duty threshold may be variable or dynamically controlled for either or both of $D_1$ and/or $D_2$, due to other conversion types or parameters, or due to unique characteristics of magnetically coupled inductor sets.

In some applications or modes of the embodiments, a duty cycle of less than the maximum threshold is reached before $t_1$ is set to a negative value and the duty cycles of $D_1$ and $D_2$ begin to overlap. For example, this may happen around a duty cycle of 50% such that some dead time $t_2$ is maintained where both SWITCH 1 and SWITCH 2 are turned OFF.

Although one or more variables of $t_1$, $t_2$, $D_1$, $D_2$, $t_{o1}$, $t_{o2}$, and the like are related to one another, and their interdependence may be expressed or calculated via mathematical formulae, it does not mean that Controller 200 must calculate or actively control each of the variables. For example, in some applications or modes of the present embodiment, only D (where D=$D_1$=$D_2$) need be controlled for D<50%, and for when D=50%, only $t_1$ need be actively controlled. Other applications or modes of the embodiments may control one or more other variables instead.

Figure 15:
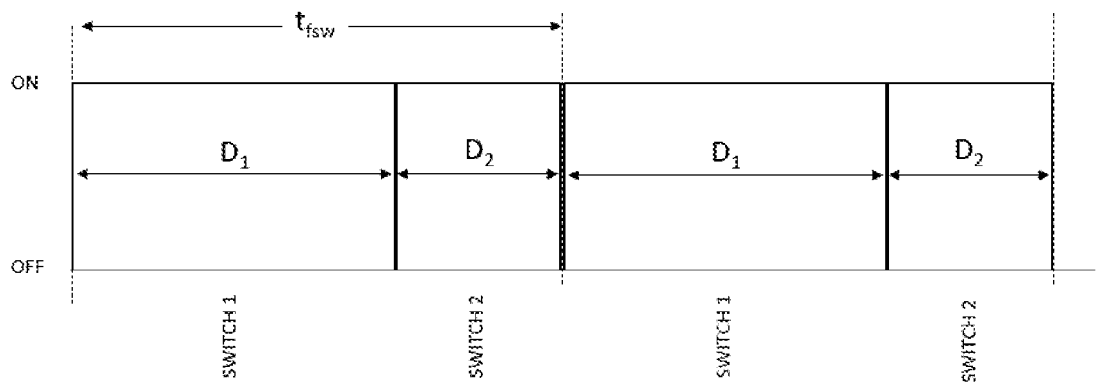
FIG. 15 is an overview of a new sequentially interleaved switching pattern for duty cycles greater than a threshold with unequal duty cycles which may be applied or configured to a buck or boost controller

Reference is now made to FIG. 15 for an alternative switching arrangement for duty cycles of $D_1$ or $D_2$ above some threshold (for example 50%), or for example, as an extension of FIG. 10. In one application or mode of the embodiment illustrated in FIG. 15, as the duty cycle of $D_1$ is increased, the duty cycle of $D_2$ is correspondingly decreased. In one application or mode of the embodiment, $D_1$ and $D_2$ are switched sequentially (that is with $t_1$=0), with equal duty cycles up to 50% duty cycle of $D_1$, wherein any further increase of $D_1$ represents a corresponding reduction in duty cycle of $D_2$. In other applications or modes of the embodiment, $t_1$ may be positive or negative, but the overall strategy prevails of proportionally decreasing $D_2$ to some increase of $D_1$, or vice versa, once above a threshold. In one example applications or modes of the embodiment, the first duty cycle D1 is controlled by a PID loop tracking a current feedback loop (for example, output current), and a maximum duty cycle D threshold is set (for example 50%), such that when D is less than the threshold (e.g. D<50%), then the duty cycles of $D_1$ and $D_2$ are equal to D (e.g. D=$D_1$=$D_2$), but when D exceeds the threshold (e.g. D>50%), then the first duty cycle $D_1$ may continue to track D (e.g. $D_1$=D), and $D_2$ may fill the remaining time period (e.g. D2=100%-D) with a time offset equivalent to D1 for sequential operation (e.g. $t_1$=0, $t_2$=0). In other applications or modes of the embodiment, $t_1$ and/or $t_2$ may be other than zero. In this embodiment, $D_1$ is not equal to $D_2$ for duty cycles above the threshold, but may be equal below such as described in reference to FIG. 5. In another application or mode of the embodiment, the duty cycles of D1 and D2 are not equal below the threshold as detailed in reference to FIG. 10. If the operations above and below the threshold are distinct, the two (or more) control methodologies may be determined by the flow chart described in respect to FIG. 22.

In another application or mode of the embodiment, for each alternating switching period, the duty cycles of $D_1$ and $D_2$ are swapped, for example, that duty cycle $D_1$ is applied to SWITCH 2 and duty cycle $D_2$ is applied to SWITCH 1 every alternative period. In this way, the average ON and OFF times of SWITCH 1 and SWITCH 2 may be equal (or close to) over multiple periods.

It will be appreciated by those skilled in the art that some concepts of each of the embodiments and strategies described herein are not mutually exclusive and may be combined, especially when adjusted based on different conversion modes, feedback loops, input/output characteristics, outcome objectives, etc. Any application or modes of any od the different embodiments may also be combined using the flowchart of FIG. 22 to adjust the strategy based on different conditions.

In all such embodiments, controller 200 may selectively choose which switching pattern to apply and under which circumstances. For example, between buck, boost, and buck-boost modes, voltage ratios of $V_B$ and $V_C$, current and/or power output, discontinuous and continuous conduction mode, pseudo conduction mode, or otherwise.

Figure 16:
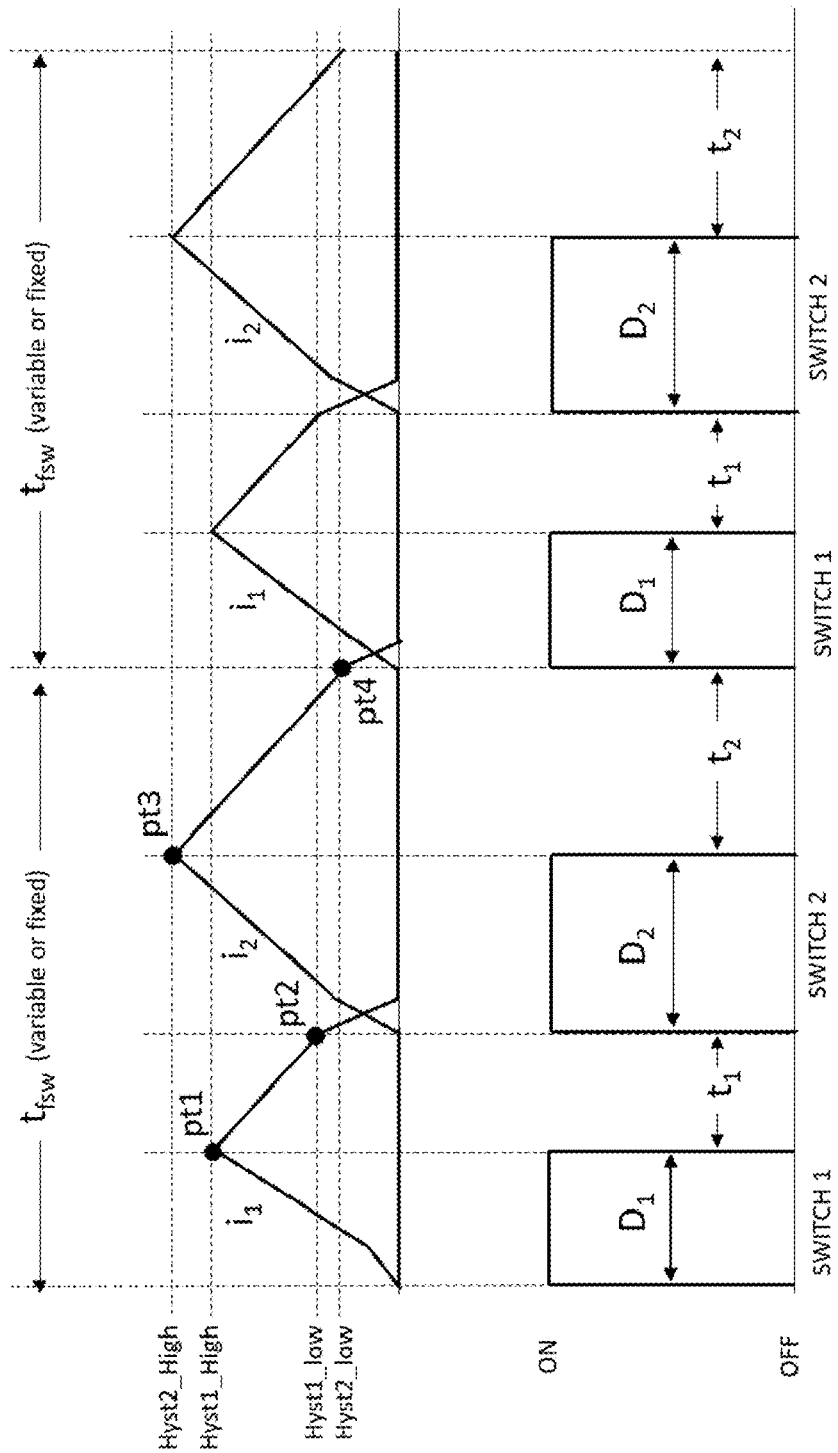
FIG. 16 is an overview of a hysteresis control method for apply a variable phase shift and/or variable duty cycle interleaving pattern which may be applied to a buck or boost controller.

Reference is now made to FIG. 16 presenting switching strategy for a first switch and a second switch for a polyphase interconnect load, for example as applied to the converter structures illustrated in FIG. 1 or FIG. 2 or any other embodiment of this specification, using hysteresis bands. For example, the switching strategy may apply to switches 204 and 206 in a boost convert mode from $V_C$ to $V_B$, or switches 203 and 205 in a buck convert mode from $V_B$ to $V_C$, or any other possible interleaved pair of an inductive load. In such configurations such as exemplified in the converter of FIG. 1 and/or FIG. 2, and others detailed later in this specification, the applied switch and a corresponding diode create a half-bridge circuit for a boost or buck conversion.

In applications of this embodiment, controller 200 sets a static and/or dynamic upper and/or lower hysteresis band for the current flowing through the first switched phase relating to SWITCH 1, and the second switched phase relating to SWITCH 2. The hysteresis bands act as a threshold value for which once reached or exceeded, triggers an event to change states, for example to change the state of one or more switches (e.g. SWITCH 1 or SWITCH 2). The hysteresis bands may trigger an event on a rising signal and/or falling signal depending on the operational mode or application and may be dynamic. The hysteresis bands may be implemented using a simple comparison between a signal and the threshold. For example, the first upper hysteresis band Hyst1_High may be set as an upper limit for the first current $i_1$ flowing through the first phase $L_1$. (e.g., current $i_a$ flowing through $L_a$ of the embodiment of FIG. 2 using switch 204 as SWITCH 1 in a boost convert mode from $V_C$ to $V_B$). In some applications or modes of the embodiment, Hyst1_High may trigger an event when i1 touches or rises above the threshold level (e.g., i1>=Hyst1_High). In another application or mode of the embodiment, Hyst1_High may trigger an event when i1 touches or falls below the threshold level (e.g., i1<=Hyst1_High). In the illustrated embodiment, the trigger point of Hyst1_high on $i_1$ is defined in the illustration as a first point, pt1 at the intersection of Hyst1_high and $i_1$. The other points are defined similarly.

Each point (pt1, pt2, pt3, pt4) for when the sampled signal meets the criteria of the hysteresis threshold (for example triggering on a rising or falling edge, or becoming equal to), may be treated as events which trigger some state change within controller 200 (for example, the state change of a switch).

In the illustrated embodiment, a first point (pt1) represents when the current $i_1$ flowing through the first phase increases to a first hysteresis upper band (Hyst1_High); a second point (pt2) represents when the current $i_1$ flowing through the first phase reduces to a first hysteresis lower band (Hyst1_Low); a third point (pt3) represents when the current $i_2$ flowing through the second phase increases to a second hysteresis upper band (Hyst2_High); and a fourth point (pt4) represents when the current $i_2$ flowing through the second phase reduces to a second hysteresis lower band (Hyst2_Low). In some embodiments, more than two interleaved switches exist, and therefore an extra two points may exist per additional interleaved phase.

In the illustrated embodiment Hyst1_High and Hyst2_High are shown as being of different values as example only, and in another embodiment they are of equivalent values. Likewise, in the illustrated embodiment Hyst1_Low and Hyst2_Low are shown as being of different values as example only, and in another embodiment they are of equivalent values. The embodiment has the advantage of precisely controlling the balance of currents between the two or more phases, independent on their respective impedances and/or conditions under load (e.g. residual or commonly linked flux, rotor position, etc), and one or more hysteresis points may be used to determine one or more aspects of the conversion as previously described. For example, a hysteresis point may be used to determine one or more of the characteristics of $D_1$, $D_2$, $t_1$, $t_2$, $t_{o1}$, $t_{o2}$, $t_{fsw}$, or the like, whereas the other characteristics may be set via a PID loop, or predetermined value or ratio, or other method as described throughout this specification.

In the illustrated embodiment, the switching period is represented by either a fixed or variable switching frequency $t_{fsw}$. Whether $t_{fsw}$ is fixed or variable depends on whether the start of the switching period is determined by when the conditions of point 4 (pt4) is reached, or when a predetermined clock time has transpired. If using a clock, the switching period is constant and usually compared with a carrier frequency timer as previously described. If the switching period is dynamic, the system may be said to operate on a bang-bang hysteresis principal with variable switching frequency.

In the illustrated embodiment, SWITCH 1 is turned on at the start of the switching period determined by a carrier frequency or at the conditions of pt4 depending on the mode or application. Since the drive circuit of SWITCH 1 will draw current through its respective phase and the common phase(s), the current of its phase will increase in amplitude according to the effective inductance. Controller 200 monitors the current of the first phase (for example $i_a$), and when the current reaches an upper hysteresis threshold Hyst1_High, the conditions of point 1 (pt1) are met and controller 200 turns off SWITCH 1. The length of time that SWITCH 1 was turned on as proportion to the switching period determines its duty cycle D1, and therefore control of D1 is able to be achieved with the control of Hyst1_High. After SWITCH 1 is turned off, the current in the first phase and common phase(s), will start to decline proportionally to the effective inductance. In this embodiment, Controller 200 continues to monitor the current in the first phase, and when it reduces to a lower hysteresis band (Hyst1_low), then condition of point 2 (pt2) is met, and controller 200 turns on SWITCH 2 representing the start of the second duty cycle $D_2$. The time between pt1 and pt2 represents the time t1, and therefore control over t1 is able to be achieved with control of Hyst1_low. The resulting $t_1$ is null when pt1 and pt2 converge, that is, when hyst1_high=hyst1_low. After pt2 has been reached, and the drive circuit of SWITCH 2 is turned ON, and will draw current through its respective phase and the common phase(s), and the current of its phase (e.g. $i_b$) will increase in amplitude according to the effective inductance. If hyst1_low is not null, there will be some remaining current flowing through the first phase and the common phase prior to the switching of SWITCH 2. A non-null hyst1_low band may have the advantage of avoiding discontinuous currents in the common phase. After SWITCH 2 is turned on, controller 200 then monitors the current of the second phase, and when the current reaches a second upper hysteresis threshold Hyst2_High, the conditions of point 3 (pt3) are met and controller 200 turns off SWITCH 2. The length of time that SWITCH 2 was turned on as proportion to the switching period determines its duty cycle $D_2$, and therefore control of $D_2$ is able to be achieved with the control of Hyst2_High. After SWITCH 2 is turned off, the current in the second phase and common phase(s), will start to decline proportionally to the inductance. If there is remaining current in the first phase this too will continue to decline. In some embodiments with variable frequency (ie bang-bang control), controller 200 continues to monitor the current in the second phase, and when it reduces to a second lower hysteresis band (Hyst2_low), then condition of point 4 (pt4) is met, and the switching period starts again by controller 200 turning back on SWITCH 1. The time between pt3 and pt4 represents the time $t_2$, and therefore $t_2$ is able to be controlled via controlling Hyst2_low. When pt3 and pt4 converge $t_2=0$, that is when hyst2_high=hyst2_low.

In some applications or modes of the embodiment, controller 200 dynamically adjusts one or both of hyst1_high and hyst2_high based on a PID loop of the common phase current, for example $i_c$ in FIG. 2.

In one application or mode of the embodiment, the upper hysteresis bands of SWITCH 1 and SWITCH 2 are set to the same value to yield the same peak currents for $i_a$ and $i_b$, regardless of any impedance variance of each. That is, the duty cycle of each will adjust and may be non-equal to achieve the same peak current in each phase. That is not to say the RMS or average current through each will be the same though, as the current waveform of each may differ. The advantage of having the same peak current means that the devices of each phase may be run without exceeding their peak values, which may be important for certain switching devices such as Silicone Carbide SiC. This may advantageously mean the drive power may be maximised without applying a safety margin due to phases currents otherwise being inbalanced.

In another application or mode of the embodiment, the high and low hysteresis bands of the first switched phase and the second switched phase are independently dynamically adjusted to achieve an equivalent RMS or average current through each phase leg. This may mean each switching device can operate at its maximum average power, for example, in applications where the switching devices are IGBT based with high short circuit current capability, where the average or RMS current may be more important than peak current.

In another application or mode of the embodiment, controller 200 may operate in a hybrid mode of adjusting one or more of the hysteresis bands or other parameters such as $D_1$, $D_2$, $t_1$, $t_2$, $t_{fsw}$, or the like. For example, when peak currents are low, controller 200 may operate to balance the RMS or average currents, but swap to a mode where the peak currents are capped or balanced once peak currents are above a certain threshold. Such a mode of operation may be implemented, for example, by employing a maximum upper hysteresis band value rated to the peak current acceptable by the device, but where the hysteresis band tracks the average or RMS value, or other value such as determined by one or more PID loops, below this peak value.

In one application or mode of one or more of the embodiments, controller 200 dynamically adjusts the hysteresis bands or other parameters such as $D_1$ or $D_2$ based on feedback data, such as a feedback loop on the temperature of the switching devices or phases to match them. For example, by employing a PID error tracker on the difference of temperature amongst the switching phases of SWITCH 1 versus SWITCH 2. This may present a simpler method of tracking and matching average power dissipation, rather than trying to match the average RMS current of each phase of switch. Such control may be implemented in addition to other feedback loops, such as a master PID loop tracking the error of a reference target output conversion current. In some applications or modes, such control only occurs after a certain error threshold is reached, for example, temperature difference between the two phases. In some applications or modes, such control only occurs after a certain magnitude of threshold is reached, for example, junction temperature of either switch is above 50 degrees Celsius. In some applications or modes of the embodiment, a combination of thresholds are used to determine which is the most relevant to apply at any given time.

In some applications or modes of the embodiment, controller 200 may maintain a constant upper or lower hysteresis band for one of both of the switches, and dynamically manipulate the other band based on a PID feedback loop or the like. For example, in one mode of operation the lower hysteresis band is set to a threshold (for example, near zero amps, but could be dynamically set due to intended operational outcome), and the upper hysteresis band may be manipulated (for example via PID loop) to increase or decrease the duty cycle of one or more of the switches. Likewise in another mode of operation, the upper hysteresis band is set to a threshold, which could be dynamically proportional to the intended operational outcome or safety limit of the components, and the lower hysteresis band manipulated (for example via PID loop) to control the duty cycle of one or more of the switches.

In some applications or modes of the embodiment, the lower band of the hysteresis is adjusted to a value where continuous conduction mode is ensured (where feasible) in one or more of the phases, and the upper band of one or more of the phases is used to control the outcome of the conversion, for example, an output current or voltage. For example, in one application or mode of operation hyst1_low=hyst2_low>0, and hyst1_high is controlled by a PID loop of the error in the target current compared with the current $i_c$ in the common phase $L_c$, and hyst2_high is controlled via a PID loop to match the junction temperatures of SWITCH 2 and SWITCH 1. In cases where the PID cannot be low enough to achieve the desired output, the hyst1_low=hyst2_low is reduced until it is equal to zero. In another application or mode of the embodiments, hyst1_high=hyst2_high to achieve the same peak currents, or hyst2_high is adjusted to achieve the same average or RMS current, or the like. In another application or mode of the embodiments, hyst2_high is statically or dynamically set (e.g. through PID loop) to achieve the lowest resulting switching ripple imposed on one or more of the capacitors, or improve one or more other measures of efficiency of the conversion (for example, the efficiency).

In some applications or modes of operation, bang-bang variable frequency operation (i.e. cycle period determined by event of pt4) may be preferred such that the switching frequency increases for low power output, and/or where the upper and lower hysteresis bands are close together, and the switching frequency decreases as power increases, and/or the upper and lower bands become further apart. A dynamic switching frequency is therefore easily controlled via manipulation of one or more of the hysteresis bands.

In some applications or modes of the embodiment, for low power operation only one phase is switched (that is, no interleaving), until some threshold is met, and then the second phase begins to interleave. In cases with more than two interleaved phases, the controller 200 may incrementally add interleaved phases one by one until the maximum number of phases is reached. In such cases, the hyst1_high band can be manipulated to determine the duty cycle D1 of the first switch, and thus control a conversion. Once a threshold of the conversion is reached, for example a peak or average current of the switched phase, switching frequency (where bang-bang), or RMS ripple limit as imposed on one or more filter capacitors, then the second phase may begin to be interleaved. This second phase may be controlled by eliminating the trigger of point 2 until the threshold is reached, or for example, setting hyst1_low to a negative value which $i_1$ will never reduce beyond, and therefore never triggering the event of pt2 where SWITCH 2 should turn ON. In such cases where pt2 is not triggered, $t_{fsw}$ should be fixed via a carrier frequency, or the trigger to reset the period should be via pt2, which in effect triggers SWITCH 1 to turn ON in lieu of triggering SWITCH 2 until the interleaving threshold is met. Such control structure may be triggered using the flowchart as illustrated and described in reference to FIG. 22.

In the illustrated embodiment, the resulting duty cycle $D_1$ of SWITCH 1 is determined by the position between pt4 (or the start of the period) and pt2. Similarly, the resulting duty cycle $D_2$ of SWITCH 2 is determined by the timing between pt2 and pt3. That is the duty cycle of $D_1$ is able to be controlled by adjusting Hyst1_high, and the duty cycle of D2 is able to be controlled by adjusting Hyst2_high (in cases where a fixed $t_{fsw}$ is not expired before any points are triggered). The dead time between $D_1$ and $D_2$ (ie $t_1$) is determined by the position between pt1 and pt2, and thus may be controlled by adjusting Hyst1_low. The time between $D_2$ and the end of period (ie $t_2$) is determined by the position between pt3 and pt4, and thus may be controlled by adjusting Hyst2_low if the switching period is set to expire at pt4 instead of using a fixed carrier (ie a variable bang-bang period)

Further, controller 200 may change the trigger of any one of the hysteresis bands to capture a rising comparison and/or a falling comparison. For example, if the trigger for the second point (pt2) was changed from capturing a falling value to capturing a rising value, pt2 would trigger before pt1, and thus the start of the second switch duty cycle D2 would start before the end of the first duty cycle D1. In this case, t1 would be negative in value, as per FIGS. 7, 10, 11, and 12. Thus controller 200 may also be used to enable strategies for when the combined $D_1$ plus $D_2$ are greater than 100% of the switching period, and therefore are required to overlap.

Therefore controller 200 is able to employ the hysteresis strategy outlined to achieve variable phase shift characteristics ($t_1$, $t_2$, $t_{o1}$, $t_{o2}$, $t_{o3}$), variable duty cycle proportions of $D_1$ and $D_2$, including single or interleaved operation, and even variable switching frequencies $f_{sw}$ or switching period $t_{fsw}$. Thus the implementation of hysteresis bands is a practical way for controller 200 to achieve the switching patterns detailed in reference to any of the aforementioned FIGS. 3 to 15.

It will be appreciated by those skilled in the art that whether the values of the duty cycles (e.g. $D_1$, $D_2$), phase shift (e.g. relating to $t_1$, $t_2$) and other parameters are directly manipulated in the software control strategy, or indirectly controlled via employing hysteresis bands, all characteristics of the conversion and switching patterns in the proposed methodologies are ultimately controllable by controller 200.

In some applications or modes of any of the embodiments, controller 200 may implements direct control of some parameters of one of the switching devices (for example, the duty cycle of D1), and employ a hysteresis feedback loop to determine the switching of another of the switching devices (for example, upper hysteresis band of SWITCH 2 indirectly controlling $D_2$). In this way, controller 200 may combine multiple strategies as described in reference to one or more embodiments contained herein.

Figure 17:
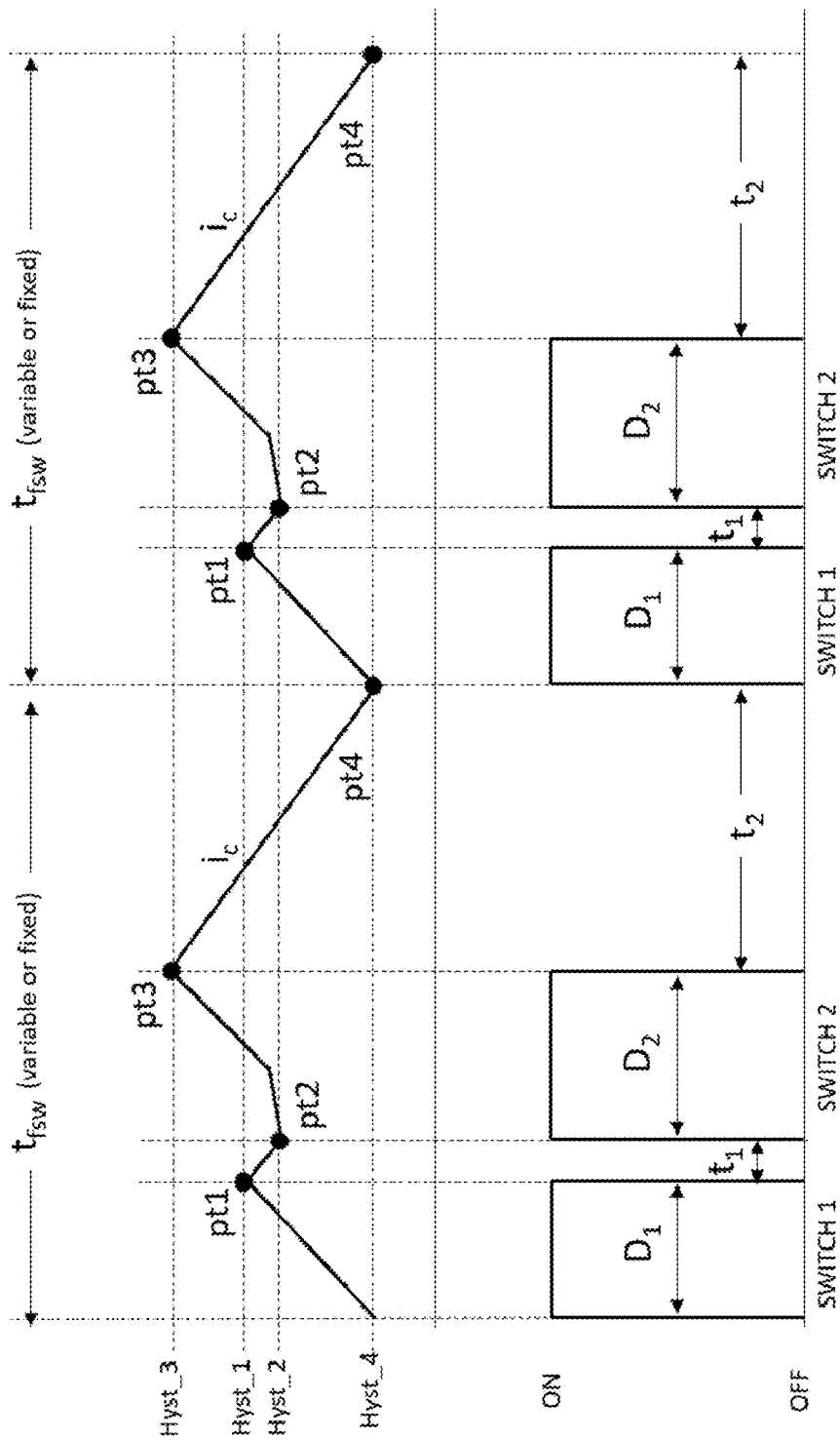
FIG. 17 is another overview of a hysteresis control method for apply a variable phase shift and/or variable duty cycle interleaving pattern which may be applied to a buck or boost controller.

In another application or mode of the embodiment, controller 200 implements at least one of the hysteresis bands on the common phase current feed (for example, current $i_c$ in $L_c$ of FIG. 2) as described in reference to FIG. 17.

In one application or mode of the embodiment, controller 200 may have multiple methods to control one or more of the parameters of the conversion. For example, in one application or mode of the embodiment, controller 200 implements a PID feedback loop on an error in the output current compared with a target reference current and applies the result to manipulate the duty cycle D1 of SWITCH 1. In another application or mode of the embodiment, controller 200 implements a PID feedback loop on an error in the output current compared with a target reference current and applies the result to manipulate the Hyst1_High value and therefore indirectly control the duty cycle D1 of SWITCH 1.

In one or more applications or modes of the embodiments, using a hysteresis threshold to control one or more parameters of the conversion may be advantageous, as the same threshold may simultaneously also maintains the the converter within a safe operating area. For example, Hyst1_high may be maximally set at a threshold that is within the peak current rating of the switching device of inductive phase. Further, the maximum threshold level also be dynamic, for example in order to reduce in line with thermal derating of a phase or switching device. Therefore, each hysteresis band may have a dynamic maximum and minimum limit applied to it, even when the instantaneously threshold level is being dynamically controlled, for example by a PID loop. In this way, the hysteresis model of control may presents a simple control strategy with easily defined protection over each switching phase individually. Therefore, the converter may operate optimally at its maximal limit, and automatically adjust and derate each phase as necessary, to extract the maximum performance from the equipment.

In one application or mode of the embodiment, one or more of the hysteresis bands has an upper threshold limit and/or a lower threshold limit for which provide a maximum and minimum allowable instantaneous value of the hysteresis threshold. In one mode or application of the embodiment, the upper and/or lower threshold limits as applied to the instantaneous hysteresis value may be dynamic, and dependent on one or more feedback parameters, for example, the junction temperature of a switching device or one or more of the inductive phases.

It will be appreciated that the method of control employing hysteresis bands provides an elegant method of regulating a conversion while maintaining ideal characteristics of duty cycle and phase shift. In one or more applications or modes of the embodiment, it may be said that the duty cycles of D1 and D2 are automatically configured to balance one or more of the peak or average current, and/or the junction temperatures of each phase.

In one application or mode of the embodiment, Hyst1_high=Hyst1_low, and therefore pt1 and pt2 converge. In one application or mode of the embodiment, Hyst1_high, Hyst1_low, and Hyst2_high are all equal, and therefore if $t_{fsw}$ is fixed, controller 200 need only control one parameter to enact a controlled sequential switching pattern with equal peak currents of the first and second phases, and where $t_1=0$. In another application or mode of the embodiment where tfsw is not fixed, controller only need control a first hysteresis band to determine the upper current limit (hyst1_low=hyst1_high=hyst2_high), and a lower current band hyst2_low, and controller 200 may enact a timer-less control method. If hyst2_low is greater than zero and pt4 if used as the trigger for restarting the switching period (e.g. variable bang-bang control), then the conversion is ensured to operate in continuous conduction mode which may improve the efficacy. Therefore, the control method of controller 200 may be implemented in a very simple manner, with only current feedback sensors on the each of the interleaved switched phases.

In some applications of modes of the embodiment where trigger point pt4 is intended to represent the end of the switching cycle, controller 200 may also implement a minimum and maximum switching period by use of a timer. That is, if trigger event point4 pt4 is not reached within a certain time, then the switching period is restarted on the trigger of a timer. In this way, controller 200 is able to limit the minimum applied switching frequency, or maximum switching period. This may be advantageous to limit audible switching noise below a certain frequency, limit peak-peak switching ripple, or improve the efficacy of one or more other conversion characteristics. Alternatively, or in addition, in some applications or modes of the embodiment controller 200 may implement a minimum switching period, where even if the event of pt4 is triggered, the switching period will not restart until a minimum timer value is reached. In this way, controller 200 is able to limit the maximum applied switching frequency, thereby, for example, preventing excessive switching or AC losses, or damage to the components.

In some applications or modes of the embodiments, one or more of the hysteresis thresholds are determined by multiple factors. For example, one or more of the thresholds may be determined by feedback loops on the thermal condition of the inductive phase or switching device, the maximum peak current rating, the average current rating, the intended conversion input or output, or the like. In some cases, multiple PID loops are used, or multiple factors feeding a single PID loop, to dynamically determine the threshold level.

In one application or mode of the embodiment, Hyst2_high=Hyst2_low, and therefore pt3 and pt4 converge.

In another application or mode of the embodiment, controller 200 implements at least one hysteresis band on the voltage of the phase, and/or star-point voltage $V_Y$. For example, in one application or mode of the embodiment, controller 200 implements a hysteresis band on the phase voltage of the first phase (e.g. $L_a$ of FIG. 2), representing the drain-source voltage $V_{ds}$ of switch 204 being the first SWITCH 1. In this example, $D_1$ of SWITCH 1 is controlled via a PID loop of a target average output current, and SWITCH 2 is turned ON sequentially after SWITCH 1 is turned OFF (e.g. $t_1=0$), and SWITCH 2 is turned OFF when the phase voltage $V_{ds}$ of the first phase reduces to near the input voltage divided by two (e.g. $V_C/2$ doing a boost conversion from $V_C$ to $V_B$ in FIG. 2). In such operation, it is expected that the first voltage Vds will be close to zero while SWITCH 1 (being switch 204) is ON, then Vds will be close to the output voltage (being $V_B$) immediately after turning SWITCH 1 OFF while $i_a$ is conducting through the upper diode of switch 203. The voltage will then trend toward the star-point voltage $V_Y$ as $i_a$ falls near zero and the diode ceases to conduct. After SWITCH 2 is turned ON, the star point voltage $V_Y$ will be related to the input voltage divided by two. As SWITCH 2 is conducting during this period of the example, the voltage of the second phase and drive circuit ($V_{ds}$ of SWITCH 2) is near zero, and therefore we may assume the voltage is divided equally between the common phase $L_c$ and second phase $L_b$, since the first phase $L_a$ has stopped conducting. The voltage may only become near or close to the expected reference voltages due to voltage drops in the switches or lines, including forward conduction voltage drop of transistors (e.g IGBT) or diodes, capacitance in the system, or any residual flux in the machine. In this regard, the voltages of the drive circuits and/or switching phases and/or star-point may be related to the current flowing through the polyphase load, and therefore applying a hysteresis band to the voltages instead of one or more of the currents may be used to deliver an equivalent outcome. For example, in applications or modes where a star-point capacitor $C_Y$ is employed (for example, $C_Y$ 211 connected via switch 210 in FIG. 2), it may be easier to sense the voltage of the capacitor than the current flowing in and out, and therefore a voltage hysteresis band may be preferred in addition to, or instead of one or more current hysteresis bands.

In some applications or modes of the embodiment, the impedance of each phase or associated switching path may differ significantly due to one or more factors of; temperature of the switches, coils or core; flux in the core including mutually imposed via the interconnected windings or via a permanent field (e.g. permanent magnet in a rotor); rotor position including saliency effects; proximity effect in individual windings and/or hysteresis other AC effects; manufacturing inaccuracies or defects, and the like. Considering that each phase may be subject to a different impedance, means that even if Controller 200 enacts the same upper and lower hysteresis band for each phase, the resulting duty cycles and/or phase shift ($t_1$, $t_2$, $t_{o1}$, $t_{o2}$, $t_{o3}$, etc) are unlikely to be equivalent.

Controller 200 may control any number of variables to achieve the desired outcome. For example, it may control factors such as D1, D2, t1, t2, to1, to2, either directly or indirectly as previously described using hysteresis bands. Further, as the rise and fall time of one or more of the currents may be predictable based on the effective inductance of the polyphase load, controller 200 may be said to set one or more of the parameters directly via the hysteresis bands. For example, if the rise and/or fall time of the i1 can be predicted, controller 200 may set a desired $D_1$ and $t_1$ via manipulating the hyst1_high and hyst1_low bands respectively.

In some applications or modes of the embodiment, controller 200 applies one or both of the first hysteresis bands to SWITCH 1 in a first period, and to the SWITCH 2 in a second period. Likewise, controller 200 may applies one or both of the second hysteresis bands to SWITCH 2 in a first period, and to SWITCH 1 in a second period. In this way, controller 200 may alternative the two duty cycles of the two switches each period.

It will be appreciated therefore that the phase shift between SWITCH 1 and SWITCH 2 is controllable and directly related to one or more of the; first duty cycle D1, the second duty cycle D2, the first upper hysteresis band limit Hyst1_high, the second upper hysteresis band limit Hyst2_high, the first lower hysteresis band hyst1_low, the second lower hysteresis band hyst2_low, and/or the voltage of the star point $V_y$. Any of the proposed characteristics may be statically or dynamically controlled by controller 200.

Reference is now made to FIG. 17 presenting a switching strategy for a first switch and a second switch for a polyphase interconnect load, for example as applied to the converter structures illustrated in FIG. 1 or FIG. 2 or any other embodiment of this specification. The presented embodiment operates similarly to FIG. 16 except that the hysteresis bands are applied to the common phase of the polyphase load, as exemplified by $i_c$ in $L_c$ of FIG. 1 and FIG. 2.

In some applications or modes of the embodiment, SWITCH 1 is turned on at the start of the defined switching period, which may be defined by the previous fourth point pt4, or by a switching timer or carrier frequency. With SWITCH 1 turned ON the current through the common phase will begin to rise. The first point pt1 represents an event when the common phase current ic reaches a first threshold of Hyst_1, whereby SWITCH 1 is turned OFF. After SWITCH 1 is turned OFF the current in the common phase will begin to reduce in accordance with the effective inductance, until it reaches a second point pt2 defined by a second threshold Hyst_2, whereby the second switch SWITCH 2 will be turned ON. Therefore, the fall time between pt2 and pt1 is representative of the dead time $t_1$. With SWITCH 2 turned on, the current in the common phase will start to rapidly rise again (once the first phase $i_a$ stops conducting), until it reaches a third threshold at point 3 pt3 defined by Hyst_3. Therefore Hyst_3 can be said to control the second duty cycle D2. With all switches OFF, the current in the common phase will reduce once again until reaching a fourth threshold Hyst_4 at pt4, or the end of a predetermined switching period $t_{fsw}$. Therefore, Hyst_4 or tfsw can be said to control the second dead time $t_2$.

As in reference to FIG. 16, any of the hysteresis thresholds may be configured to trigger their respective event points on the current meeting the threshold on the rising and/or falling edge. For example, if Hyst_2 threshold was set to rising edge, then pt2 would trigger before pt1, and therefore SWITCH 2 would turn ON prior to SWITCH 1 turning OFF, and $t_1$ would be negative. Likewise, if Hyst_1 had the same value as Hyst_2 (ie Hyst_1=Hyst_2), then $t_1$ would be null (ie $t_1$=0) and there would be no intended deadtime between the two switches.

In some applications or modes of the embodiment, one or more of the points may be determined by a timer or other signal other than the hysteresis band or threshold. For example, pt2 may be determined by a timer controlling $t_1$, rather than the threshold of Hyst_2. Or rather, the value of Hyst_2 is determined by $t_1$, rather than the other way around.

In some applications or modes of the embodiment, Hyst_1 and Hyst_2 have the same value, and therefore pt1 and pt2 are coincident resulting in $t_1$=0. In embodiments where hyst_3 is related to hyst_1, for example double (hyst_3=2*hyst_1), and the switching period is fixed and defined by a timer, controller 200 need only control one variable (for example Hyst_1) to regulate the output.

In some applications or modes of the embodiment, one or more of the variables are controlled via a timer or hysteresis band, depending on which is trigger first. For example, t1 may be a set value, but may be trigger earlier if either $i_c$ or $i_a$ drops below their respective minimum thresholds, for example as defined by Hyst_2 and/or Hyst1_low of FIG. 16.

In some applications or modes of the embodiment, Hyst_2 and Hyst_4 are advantageously set above OA to ensure continuous conduction mode of $i_a$. In some applications or modes of the embodiment, one or more hysteresis bands are advantageously set such that the diode of one or more of the drive circuit will not conducting when the corresponding switch is turned ON to lower switching voltage and/or losses. For example, when operating in boost mode from VC to VB in FIG. 2, that DIODE 2 is not conducting, and therefore reducing the switching voltage $V_{ds}$ applied prior to turning SWITCH 2 ON.

In some applications or modes of the embodiment, Hyst_3 may be set at roughly double the value of hyst_1, such that the peak-to-peak of phase current in $i_a$ and $i_b$ may be the similar. However, this may not mean the resulting duty cycle of D1 and D2 are equal, for example, as due to the period while $i_a$ is reducing whilst SWITCH 2 is on when $t_1$ is small or null. Alternatively, controller 200 may set Hyst_3 lower than 2× Hyst_1 to more evenly match the energy or heat dissipated in each switching leg.

In some applications or modes of the embodiments, at the trigger event point pt1 only the first phase is conducting (e.g. La of FIG. 2), and therefore at this point, the first phase current (e.g. ia) may be representative of the common phase current (e.g. ic). In some applications or modes of the embodiments, at the trigger event point pt3 only the second phase is conducting (e.g. Lb of FIG. 2), and therefore at this point, the second phase current (e.g. ib) may be representative of the common phase current (e.g. ic). Therefore, in some applications or modes of the embodiment, the feedback loop on phase current ic may be replaced by the phase current ia and/or ib.

In some application or modes of the embodiment, controller 200 implements some hysteresis band event points based on the common phase current (for example, Ic), and others based on the individual phase currents (for example $i_a$ and $i_b$). For example, in one application or mode of the embodiments, controller 200 implements upper hysteresis bands Hyst1_high and Hyst2_high on currents $i_a$ and $i_b$ for pt1 and pt3 respectively, while implementing lower hysteresis bands Hyst_2 and Hyst_4 on ic for pt2 and pt4 respectively. In this way, it can be said that controller 200 is controlling the duty cycles of SWITCH 1 and SWITCH 2 (D and/or D1 and/or D2) via the hysteresis bands described in reference to FIG. 16, and the dead time $t_1$ and $t_2$ via the hysteresis bands described in reference to FIG. 17. In this way, controller 200 may advantageously directly control the maximum or average characteristics (e.g. current, temperature, etc) of each of the switching legs via pt1 and/or pt3, while ensuring continuous conduction mode of the conversion or overall switching ripple via controlling $t_1$ and/or $t_2$ via pt2 and/or pt4.

In some applications or modes of the example, controller 200 employs a control methodology with trade off between efficiency of the conversion and switching ripple in one or more of the capacitors (for example, 207 or 208 or FIG. 1 or FIG. 2). It is known that in some operational modes, employing a single switching method such as described in reference to prior-art FIG. 3 will yield the highest conversion efficiency. However, this conversion may also yield the highest switching ripple for example. Therefore, in one or more applications of modes of the embodiments, controller 200 may employ a strategy, for example, to control the duty cycle $D_1$ of SWITCH 1 (either directly, or indirectly through hysteresis bands) to track a reference target output current, while maintaining $D_2=0\%$ while the conversion operates below some threshold. Once a certain threshold is reached (for example, magnitude of current, or switching ripple component), controller 200 may begin to increase the duty cycle $D_2$ of SWITCH 2 to control or limit some other parameter of the conversion. In this way, controller may be able to maintain the converter within specified limitation, whilst limiting the use of the second switched phase and SWITCH 2. In most cases, D1 will not be equal to D2, and therefore may employ the strategy as described in reference to FIGS. 10, 11, 15, 16, 17 or any of the other embodiments allowing unequal duty cycles, with implementation depending on the magnitude of $D_1$, and the time offset $t_1$. Such a threshold may be implemented using the flowchart described in reference to FIG. 22.

In all embodiments it will be appreciated that common features may be denoted by common reference numerals, and control methodologies of the parameters may be interchangeable.

Figure 18:
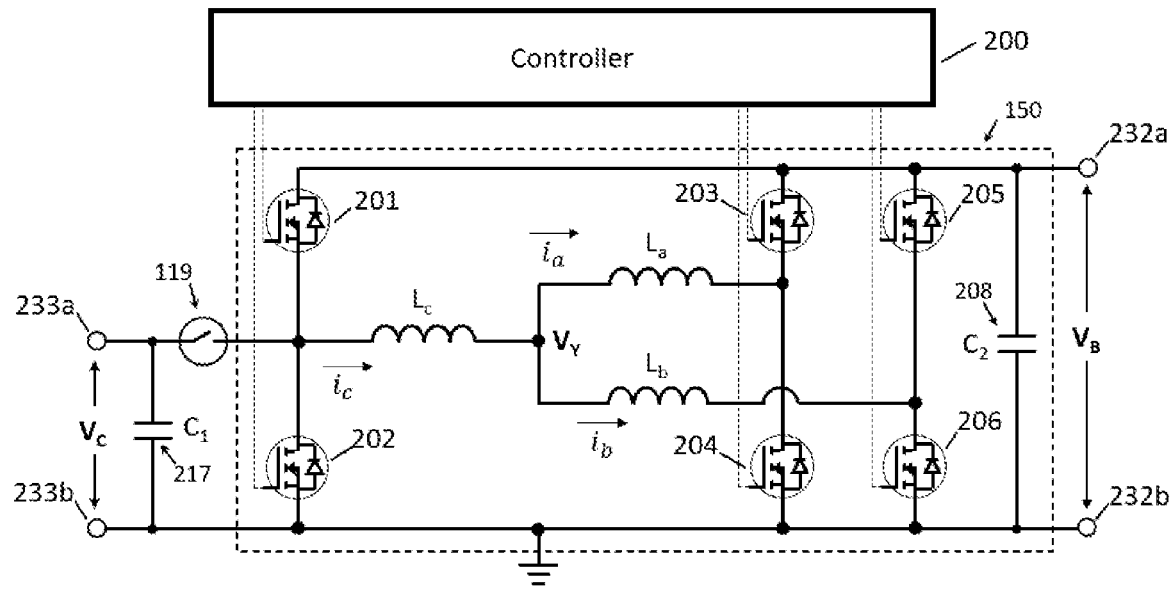
FIG. 18 is an electrical schematic of another controller for a wye connected poly-phase inductive load for either boost or buck conversions between two DC sources which may apply any of the switching patterns of FIG. 3 to FIG. 13.

Reference is now made to FIG. 18 of another schematic of a polyphase connected load with controller 200 for application of the invention. In this embodiment, a further on-board or off-board DC source of voltage $V_C$, is interfaced to inverter 150 at DC input 233 which connects to the mid-point of the half-bridge consisting of MOSFETs 201 and 202 via input disconnect switch 119. In this embodiment inverter 150 is a three-phase drive inverter for a traction motor 120 consisting of three inductive phases La, Lb, and Lc fitted to an electric vehicle. In a first mode of operation, controller 200 modulates MOSFETs 201, 202, 203, 204, 205, and 206 with switch 119 open, to draw current from traction battery accumulator interfaced at DC input 232 of voltage $V_B$. In this mode, controller 200 imposes a rotating 3-phase current to machine 120 to create propulsive torque for the electric vehicle. In a second mode of operation where $V_C<V_B$, controller 200 closes switch 119 and draws current from the further onboard or off-board DC source at DC input 233 of voltage $V_C$, and modulates switches 204 and 206 to perform a regulated boost conversion to provide at least one of a regulated charging current or a regulated charging voltage to the traction battery at voltage $V_B$. In a third mode of operation, with switch 119 closed, controller 200 modulates switches 203 and 205 to perform a buck conversion from $V_B$ to $V_C$ (where $V_B>V_C$) to provide at least one of a regulated current or regulated voltage output to the source of $V_C$. In this way, controller 200 may apply any of the novel interleaving strategies described herein by controlling switch 204 and switch 205 as SWITCH 1 and SWITCH 2 respectively when controlling a boost charging current or voltage from $V_C$ to $V_B$, or by controlling switch 203 and 205 as SWITCH 1 and SWITCH 2 respectively when controlling a buck charging current or voltage from $V_B$ to $V_C$.

In another embodiment, $L_A$, $L_B$, and $L_C$ are three phases of an electric motor for a cordless power tool In another embodiment, $L_A$, $L_B$, and $L_C$ are three phases of a transformer winding.

In another embodiment, $L_A$, $L_B$, and $L_C$ are three discrete inductive phases which are not magnetically coupled.

Figure 19:
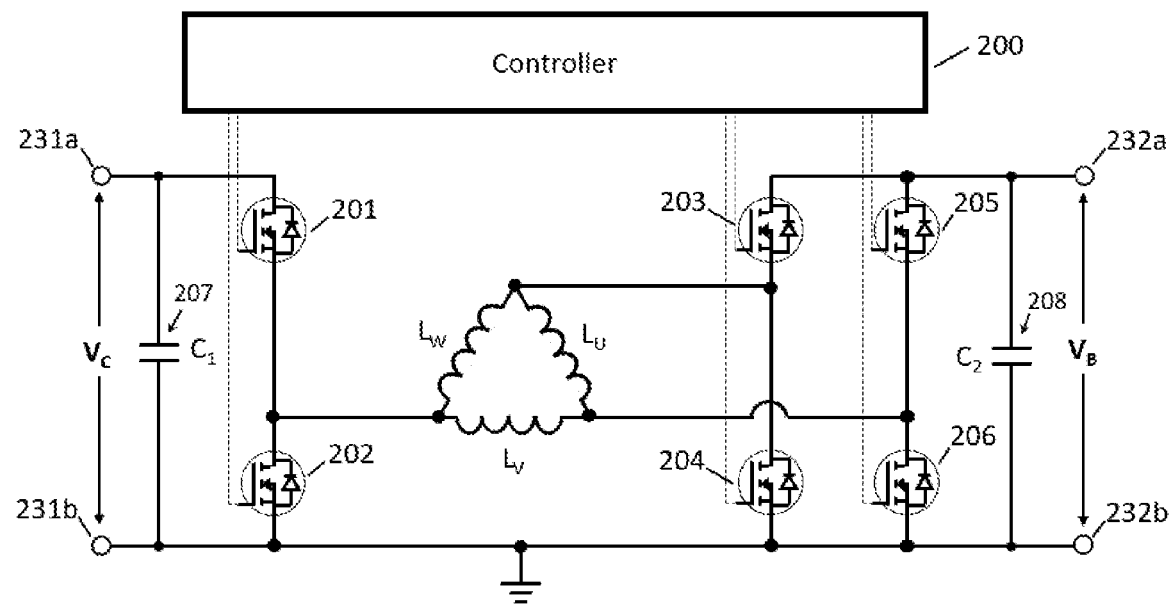
FIG. 19 is an electrical schematic of another controller for a delta connected poly-phase inductive load for either boost or buck conversions between two DC sources which may apply any of the switching patterns of FIG. 3 to FIG. 13.

Reference is now made to FIG. 19 of a further schematic of a polyphase interconnected inductive load where similar features are denoted by similar numerals. In this embodiment, the poly-phase inductive load comprising of Lu, Lv, and Lw are connected in delta configuration. Similar to previous embodiments, controller 200 may operate to perform a DC to DC boost conversion from $V_C$ to $V_B$ by modulating boost switches 204 and 206 as SWITCH 1 and SWITCH 2 respectively, or perform a buck conversion from $V_B$ to $V_C$ by modulating buck switches 203 and 205 as SWITCH 1 and SWITCH 2 respectively. Controller 200 may also operate buck switch 201 as SWITCH 3 in buck-boost mode from $V_C$ to $V_B$, or switch 202 as boost switch in a buck-boost or boost conversion mode from $V_B$ to $V_C$.

In this embodiment, controller 200 may act to operate $L_v$ in parallel with $L_u$ and $L_w$ in series; $L_w$ in parallel with $L_u$ and $L_v$ in series; or $L_v$ and $L_w$ in parallel, or any combination thereof.

If Lu, Lv and Lw are magnetically coupled, the induced flux may manipulate effective impedances in each phase to influence the balance of currents such that the sum of the three current are nullified.

Controller 200 may employee the aforementioned control methods to determine interleaving strategy between Lw and Lv, including their respective phase shift, peak or average current loading, power dissipated, thermal properties, or the like. Controller 200 may also implement controls around the common phase leg Lu, and its current Iu, using the methodologies presented throughout. For example, controller 200 may use hysteresis bands on the magnitude of current $i_u$ instead of $i_c$ as applied in reference to FIG. 17.

Figure 20:
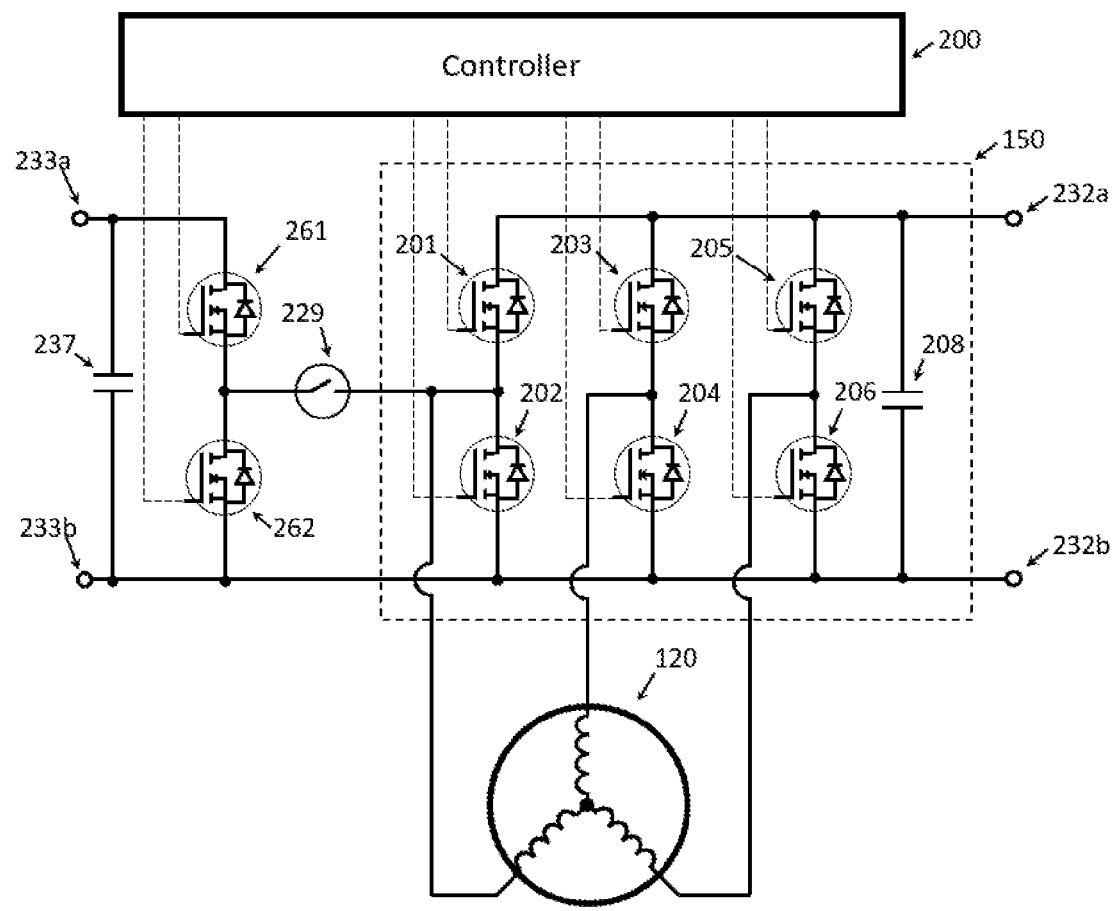
FIG. 20 is an electrical schematic of another controller for a wye connected poly-phase inductive load for either boost or buck conversions between two DC sources with an extra switching leg which may apply any of the switching patterns of FIG. 3 to FIG. 13.

Reference is now made to FIG. 20 of a further schematic of a polyphase inductive load where similar features are denoted by similar reference numerals. In this embodiment, a further half-bridge comprising of switches 261 and 262 are employed in addition to the 6-switches of the 3-phase inverter 101-106. The mid-point of this further half-bridge inverter is connectable to the half-bridge of one of the inverter drive circuits via switch 229, and therefore is directly connectable to one of the phase of the polyphase connected load similarly to FIG. 18. In this embodiment, switch 261 may act as a series buck switch, for example controlled as SWITCH 3 of FIG. 8 or FIG. 9, when performing a conversion from $V_C$ to $V_B$.

Figure 21:
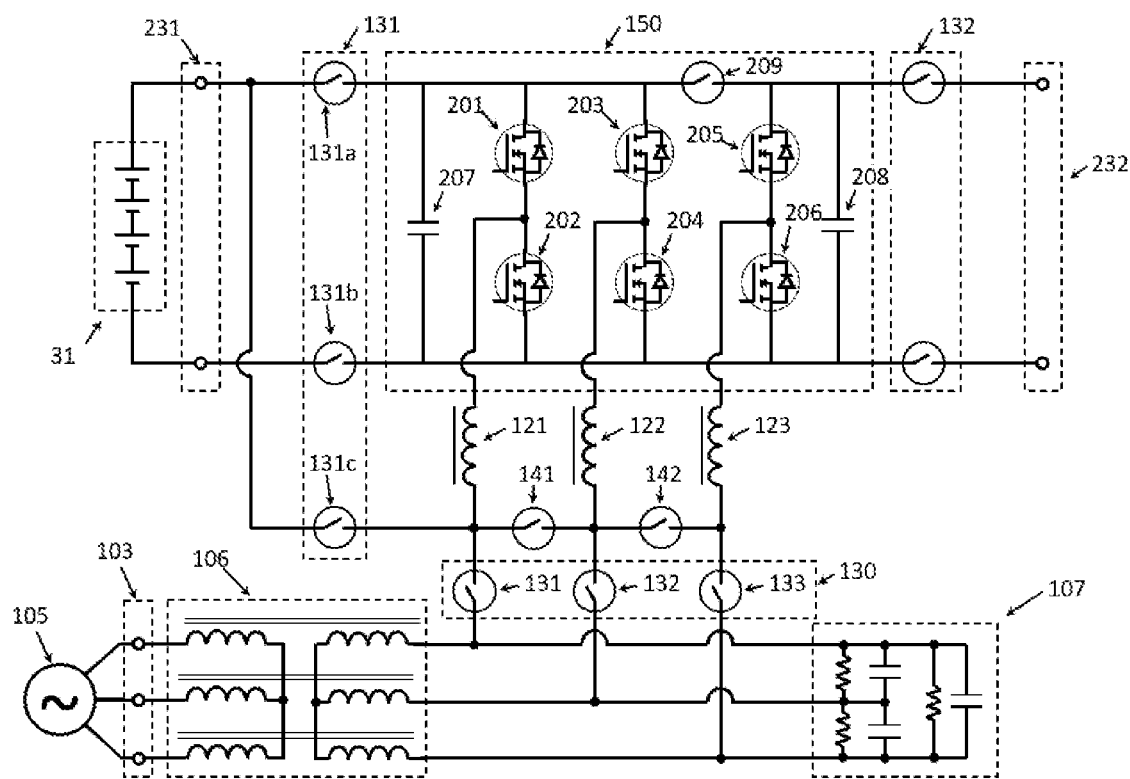
FIG. 21 is an electrical schematic of another controller for a selectively connected wye poly-phase inductive load for either boost or buck conversions between two DC sources which may apply any of the switching patterns of FIG. 3 to FIG. 13.

Reference is now made to FIG. 21 of a further schematic of a polyphase inductive load where similar features may be denoted by similar numerals. In this embodiment of FIG. 21, inductors 121, 122, and 123 constitute a magnetically coupled 3-phase sine filter 120 or other polyphase load. In the example application shown and described herein, the embodiment represents an electric vehicle charging station for charging an electric vehicle at DC input 232. The electric vehicle can be charged using energy derived from a battery 31 at DC input 231 in DC to DC mode, or from the AC grid 105 operating in AC to DC mode. When operating in DC to DC mode from battery 31 at DC input 231, the switching mechanism 130 opens along with switch 209, and switching mechanisms 131 (131a and 131b) and 132 closed. The inductor set 120 is further bridged into a star point by use of switches 141 and 142. In this case, controller 200 [not shown] may operate switches 201 and 203 as SWITCH 1 and SWITCH 2 respectively when performing a buck conversion from ESS 31 to the EV at DC input 232. Alternatively, controller 200 may operate boost switches 202 and 204 as SWITCH 1 and SWITCH 2 when performing a boost conversion from DC input 232 to ESS 31. Further controller 200 may operate switch 205 as SWITCH 3 in a buck-boost mode.

For the various illustrated embodiments with the aforementioned capacitor design considerations, it is assumed that the ripple current imposed on capacitors 207 and/or 208 (or other illustrated capacitors) are within the RMS ripple current allowed by the manufacturer when operating in certain modes. For example, the controller 200 may be able to operate converter 200 in the known operational mode of a four-switch converter during low power operation. However, during high power, the ripple current imposed by the discontinuous currents of the buck, boost, or buck-boost modes may exceed the ripple current rating of capacitors 207 and/or 208 when operating in four-switch mode. Therefore, the power of the conversion in this mode may be limited, and controller 200 may chose to implement any one or combination of the interleaving strategies presented throughout this specification.

Figure 22:
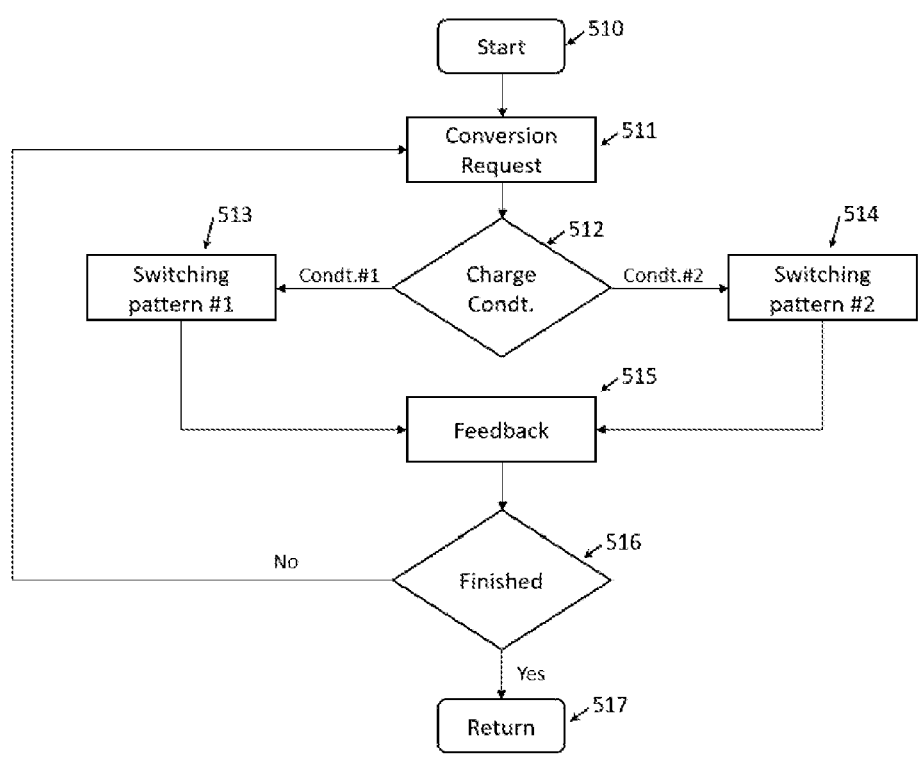
FIG. 22 is control process flowchart which may be applied to any of the buck, boost, or buck-boost, controllers

Reference is now made to FIG. 22 of a flowchart control method for controller 200 able to operate in different switching pattern modes. In one example application or mode of the embodiment, controller 200 is a charge controller for a battery, and is responsible for modulating the switches to achieve the desired charging current or voltage output of battery $V_B$. In this example embodiment, controller 200 begins at 510 when a DC to DC charging request is initiated for battery of voltage $V_B$ from voltage source $V_C$. Therefore step 510 may include communication with external and internal controllers and feedback mechanisms to determine that the systems are compatible. Controller may also determine it is in a condition able to start a conversion. Controller 200 may also manipulate any one of its components to prepare for the intended conversion, for example by manipulating switching any one or more fitted switches of 131, 132, 209, 309, 210, 119, 229, 130, and the like. Controller 200 may determine the conversion request parameters at step 511, and may determine whether the mode will be buck mode, boost mode, buck-boost mode. Controller 200 may also instantiate a PID controller or the like for regulating the conversion to track a target parameter. Controller 200 may read feedback from voltage, current, zero crossing, and temperature sensors and the like to determine the maximum and/or minimum bounds of the parameters of the conversion. Controller 200 may also engage in communication with the input or output source; communication with a central command centre, internet resource, energy and weather forecasts, or the like; or any other information source deemed relevant to the application. Controller 200 may use any gathered information to adjust its feedback loops, including PID controller, set new boundary conditions, determine charging efficacy, and the like. Any communication of controller 200 with external source may be bidirectional, and controller 200 may act to update external sources of the conversion progress.

If controller 200 is intended to provide a regulated charging current or charging voltage to a battery system, controller 200 may also receive a charging current or voltage request from any associated battery management system (BMS). Controller 200 may use the identified bounds, and cross referenced with default parameters, to identify the conversion request, with respect to a derating schedule or the like for the conversion process.

Controller may also enter a specific state by actuating switches or other mechanisms at its disposal. Controller 200 may also check feedback (for example, auxiliary contacts of switching mechanisms) to determine the controller and apparatus is in a safe and correct condition to proceed. Further, controller 200 may act to pre-charge one or more capacitors before allowing connection between the drive circuits and/or capacitors and one or more DC source(s).

Controller 200 may then use the determined or requested characteristics of the conversion to determine the mode or charge condition at 512. If controller 200 determines the conditions are met for condition 1 (or not met for condition 2), then switching pattern 1 is entered at 513. Alternatively, if conditions are met for condition 2 (or not met for condition 1), then controller 200 implements switching pattern 2 at 514. If conditions are met for both condition 1 and condition 2, then converter 200 may selectively choose to the mode based on a secondary conditional set, or preprogramed preferential selection, or logic order.

For example, in one embodiment or application, condition 1 is the condition that the expected ripple current or voltage of the conversion request will not exceed (or is not currently exceeding) the limitations of the input or output capacitors, and therefore a switching pattern 1 is allowed which may translate to higher ripple currents. In one such example, switching pattern 1 could therefore be using a single switch modulation (no interleaving) to regulate the buck or boost conversion, as described for example in reference to FIG. 3. Whereas, switching pattern 2 may consist of one of the interleaved strategy's described in the specification is implemented when ripple current and/or voltage of switching pattern 1 is expected to (or has) exceeded the set limit (or warning limit). In this way, for example, conversion losses may be reduced by employing switching strategy 1 when conditions allow (for example at lower power charging), and power may be increased beyond the limitations of switching strategy 1 by employing interleaving in switching strategy 2. In another embodiment, both switching pattern 1 and switching pattern 2 are interleaved strategies, but provide different characteristic outputs. For example, either switching pattern 1 or 2 may include prior-art 180 deg phase shifted interleaving for example as described in FIG. 4, whereas the other switching pattern may employ one or combination of the other interleaving strategies described herein with different characteristics.

In another embodiment or application, charge condition 512 determines whether the duty cycle of either switch 1 and/or switch 2 is requested to be greater or less than some threshold. For example, in one embodiment, charge condition 1 is met when requested duty cycles of switch 1 and/or switch 2 are less than (or equal to) 50%, and/or the combined requested duty cycle D is less than (or equal to) 100%, or some other threshold, and controller 200 employs switching pattern 1 at 513 embodying at least one of the interleaved strategies described in FIG. 3 to FIG. 10. Whereas condition 2 is met when requested duty cycles of switch 1 and/or switch 2 are greater than (or equal to) 50%, and/or the combined requested duty cycle D is greater than (or equal to) 100%, or some other threshold, and controller 200 employs switching pattern 2 at 514 embodying at least one of the interleaved strategies described in FIG. 12 to FIG. 15. In some embodiments the requested combined duty cycle D is not represented by the sum of the duty cycles of $D_1$ and $D2$, but rather attributed to a maximum power value between 0% and 100% as described in reference to FIG. 14.

In another embodiment or application, condition 1 relates to some minimum or maximum hysteresis limit as described in relation to FIG. 16 and/or FIG. 17, whereas condition 2 relates to an alternative hysteresis limit. For example, in one embodiment condition 1 relates to one or more hysteresis bands limiting the average current of the phase, and whereas condition 2 relates to one or more hysteresis bands limiting the peak current of the phase. In another example of the embodiment, condition 1 relates to a bang-bang variable frequency strategy, up until a limitation where condition 2 relates to a fixed switching strategy, or vice versa. In another example of the embodiment, condition 1 relates to point 2 (pt2) as described in reference to FIG. 16 and/or FIG. 17 being the restart of the switching period $t_{fsw}$ in bang-bang operation (that is when SWITCH 1 turns ON), wherein condition 2 relates to pt2 being the start of the second duty cycle D2 (that is when SWITCH 2 turns ON). In this way, condition 1 represents a bang-bang control with no interleaving applied, and whereas condition 2 represents a bang-bang or fixed frequency control with interleaving of at least two switches.

In another embodiment, multiple criteria are used to determine the switching patterns, for example, criteria determined by both duty cycle and charging ripple to determine the switching pattern state. Other criteria may be based on conversion mode requirements such as buck, boost or buck-boost requirements, and which direction the conversion is to translate power (for example $V_C$ to $V_B$, or from $V_B$ to $V_C$). In some operational modes, multiple switching leg paths are not available which limits the criteria options, for example, in buck conversion mode of the embodiment in FIG. 2 form $V_C$ to $V_B$. In some embodiments, feedback such as temperature of devices such as capacitors, switches (IGBT/MOSFET/SiC/GaN/etc) and/or inductive load may be used to further influence the criteria selection of 512.

In another embodiment, more than two switching conditions exist, and controller determines which switching condition is employed based on criteria set in 512. For example, this may include any two or more of the aforementioned described conditions, with expanded selection criteria based on any one or combination of aforementioned criteria.

The time spent in 513 or 514 by controller 200 may be one or more switching periods. These states may include an inner feedback loop for readjusting conversion parameters within the switching pattern, such as duty cycle, without having to leave the control block. In other embodiments, just one switching cycle performed before the conversion is reassessed at 515. In 515, controller 200 may gather feedback or information from a range of sources including; voltage, current, zero sequence, and temperature sensors and the like; communication with the input or output source; communication with a central command centre, internet resource, energy and weather forecasts, or the like; or any other information source deemed relevant to the application. Controller 200 can use the gathered information to adjust its feedback loops, including PID controller, set new boundary conditions, select control method strategy or modes, determine charging efficacy, and the like. Communication of controller 200 with external source may be bidirectional, and controller 200 may act to update external sources of the conversion progress.

In one or more low-level or high-level switching pattern cycles, controller 200 may adjust one or more duty cycles (for example, $D_1$, $D_2$, and/or $D_3$), time periods $t_{fsw}$, $t_1$, $t_2$, $t_3$, and $t_4$, PID value, hysteresis bands, or any other variable which may effect the characteristics of the conversion.

If controller 200 determines that the conversion process is not finished at 516, for example, if the BMS determines more charge is required, then it will return to conversion request 511 and use the newly obtained information gathered at 515, and 513 or 514, to redetermine the conversion request parameters.

If controller 200 determines that the conversion process is finished at 516, then the process will end. This is likely after some soft-shutdown or idle period undertaken by controller 200, where conversion current is ramped down to OA for example. Controller 200 may also determine to put the system into a safe state through one or more means, for example, by opening contactors, discharging internal capacitors, and/or turning off its power.

In another embodiment, once the charge condition at 512 is initially set, it remains unchanged for the duration of the conversion. In some cases where charging conditions are well defined with few variables, the unfinished condition of 516 (that is, 'no') may point directly back to the chosen switching pattern (that is, either 513 or 514) without returning through 511 and/or 512.

In some embodiments, feedback 515 or finished condition 516 is checked periodically, whereas in other embodiments they are checked after every switching cycle of 513 and/or 514 switching patterns. In some embodiments, switching patterns 513 and 514 include low-level feedback loops internally, and checked on a faster timescale than a higher-level feedback loop implemented in 515.

In some embodiments, some code, safety measures, initialisation procedures, conditional sets, or checks are only performed once, and are skipped in subsequent rerunning of the same process block or function.

In one application example, controller 200 is for an apparatus for a traction drive of an electric vehicle with integrated DC converter with topology as illustrated in FIG. 18. In this embodiment, La, Lb, and Lc embody a 3-phase electric traction machine. In a first mode of operation, controller 200 uses the switches 201-206 of inverter 150 to create torque in the electric motor to provide tractive effort to the vehicle. The electric vehicle has a traction battery of voltage VB around 800 VDC, which it uses to power the vehicle in the propulsion mode of operation. In another mode of operation, controller 200 receives feedback that a plug from an electric vehicle supply equipment (EVSE) has been plugged in to the stationary vehicle, and controller 200 initiates communication to determine compatibility. Upon communication, the controller 200 determines that the EVSE is able to provide an unregulated DC voltage VC of 400 VDC. Controller 200 then closes switch 119, and enters the process defined in FIG. 22 as to regulate a DC to DC charging current or voltage for traction battery VB from EVSE DC source VC.

In many embodiments, the switches may be illustrated as MOSFETs, however in other applications such switches are implemented as other types of switching which may include one or more; transistor, Darlington pair, IGBT, SiC, GaN, relay, diode, or the like as would be appreciated by those skilled in the art.

In some schematic embodiments of a polyphase load, further switching mechanisms may be implemented to selectively configure the two or more conductions paths to be applied for interleaving in either direction from $V_C$ to $V_B$, or from $V_B$ to $V_C$, for example, switches 209 and 309 of FIG. 1. However once configuration is set, the operation of SWITCH 1 and SWITCH 2 and/or SWITCH 3 is as described herein. That is, the polyphase load connection and conduction paths do not need to be static or remain interconnected in the same way in other modes of operations.

The switch patterns described herein apply to other polyphase load connections of three or more phases. For example, in one embodiment a 6-phase star point connected load exists with each phase connected to the mid-point of one of six half-bridge circuit connections. The mid-point of one of the half bridges is further connected to an external DC source $V_C$. Therefore when performing a boost conversion from $V_C$ to $V_B$, the next two half-bridges can be considered as being SWITCH 1 and SWITCH 2, and the further three half bridge represented as SWITCH 4, SWITCH 5 and SWITCH 6 (SWITCH 3 reserved for series buck switch as described in FIG. 8). In this way, SWITCHES 1,2,4,5,6 can be switched sequentially or as per any of the aforementioned strategies. In some embodiments, the sequential switching will be followed by a deadtime $t_2$ assuming that the sum of the duty cycle of each of the five phases is less than the switch frequency time period.

In another embodiment, the controller consists of a 6-phase motor of two 3-phase star or delta connections, or two separate motors each with a 3-phase star or delta connection, where each 3-phase sub-set can work as detailed in this specification. These two 3-phase sub-sets can work in series or parallel. Furthermore, one 3-phase can be operated in boost mode (for example, as illustrated in FIG. 18), with the subsequent sub-set operating in series in buck mode (for example, as described in FIG. 18 bidirectional mode) to deliver a boost-buck conversion in series. In some applications or modes of the embodiments, controller 200 combines feedback from each inductive load set to control each conversion individually or in unison with consideration for one another. In some configurations, one set of polyphase windings may be in series with another, and therefore feedback of the first winding may be used the 'common' phase for feedback to the control of the later winding set.

In another embodiment of two or more sets of windings (described herein as sub-sets of the total configuration), the two or more conversions may operate in parallel configuration of either buck or boost, and SWITCH 1 and SWITCH 2 of the first sub-set may be switched concurrently, or interleaved, with SWITCH 1 and SWITCH 2 of the second sub-set, as per any of the switching or interleaving strategies described herein. For example, in one application, each configuration is switched by controller 200 as per the switching method detailed in FIG. 5, and wherein controller 200 further switches the first sub-set and the second sub-set sequentially such that no deadtime exists between SWITCH 2 of the first sub-set, and SWITCH 1 of the second sub-set. In another embodiment, 180 deg phase shifting is employed between two (or more) sets of sequentially operated interleaved pairs, or some dead time or overlapping (negative deadtime) of sequential interleaving is employed, of the first and second sub-sets as may be selectively applied by controller 200. In some embodiments, the first sub-set can be viewed as SWITCH 1, and the second sub-set as SWITCH 2, where interleaving of the first sub-set and the second sub-set may be applied as per the interleaving strategies described herein, regardless of the individual switching pattern applied to each of the sub-sets. That is, the interleaving strategy of SWITCH 1 and SWITCH 2 may be selected and controlled independently to the interleaving strategy applied to the two or more sub-sets of switches. Furthermore, controller 200 may employ one or more tiers of a control structure, for example as described in FIG. 22, to select the mode or modes of operation.

One or more of the interleaved switching methods for one or more sets of windings described herein are able to lower system conversion losses when compared with standard interleaved switching strategy (e.g. 180 deg apart) with equal dead time. In one embodiment or operational mode, one factor is due to lower switching losses of the drive switches, due to reduced or zero current and/or voltage switching. For example, the second switched phase (SWITCH 2) may have a switching voltage equal to the star point voltage (e.g. roughly Vin/2 for boost mode) which when switching zero current (discontinuous conduction mode) depending on the state of SWITCH 1 and corresponding DIODE 1. This may be lower than prior-art switching strategies where switching voltage may be (Vout-Vin/2) in a comparison conversion mode.

Furthermore, some of the proposed interleaving strategies may impose a lower ripple frequency on the common inductive phase of a polyphase winding (For example, phase $L_c$ as illustrated in FIG. 2) than prior art interleaving methods. For example, when SWITCH 1 and SWITCH 2 are interleaved 180 deg apart (for example as described in reference to FIG. 4), SWITCH 1 and SWITCH 2 and thus $L_a$ and $L_b$ are subjected to the switching frequency $f_{sw}$, however $L_c$ may be subjected to 2× the switching ripple of $2*f_{sw}$. However, for example, the proposed method of control as described in FIG. 5 may subject $L_a$, $L_b$, and $L_c$ to the same fundamental switching ripple frequency $f_{sw}$, as the switching of SWITCH 1 and SWITCH 2 and thus $L_a$ and $L_b$ may present a continuous single switching load to $L_c$. A reducing switching frequency may improve the conversion efficiency by reducing the magnitude of power loss of the inductive load, for example in phenomena such as AC losses including core losses, eddy currents, and skin and proximity effect of the winding $L_c$.

In some embodiments, with some characteristics of electrical and magnetic coupling between the inductive phases, flux and therefore current in the first switched inductor (e.g. $L_a$ using SWITCH 1) phase changes rapidly due to magnetically coupling effects when the second phase switch (e.g. SWITCH 2) is switched whilst free-wheeling current still exists in the first switched inductor (e.g. $L_a$). In some embodiments, inductance of, and/or flux or current in the common inductor (e.g. $L_c$) is not linear, and/or may increase or decrease during the transition period.

Controller 200 may be programmed with multiple switching strategies which are employed based on different characteristics which are variable. For example, the ratio between $V_B$ and $V_C$, the conversion current, voltage, or power, conversion direction, and the like, which may differ throughout time. Controller 200 may employ a strategy such as described in reference to FIG. 22 to determine the correct mode of operation and switching strategy to employ to achieve the most desirable outcome in some respect.

In some operational modes, the switching is determined by hysteresis, or other method, and may have a variable switching frequency. In some embodiments, space vector modulation, and/or other vector control method are used, whereas in other embodiments of modes of operation scalar methods are used.

In some operational modes, zero voltage or current switching may be enabled via use of the buck switch. In this case, the buck switch can be turned off while maintaining a lower switch on to cause the star point, and thus the other switching leg (if not conducting) to fall to a lower voltage, including zero or near zero voltage in some conduction modes. In this case, when switching the adjacent leg may have lower or zero voltage when switching, and then the buck switch can be resumed. This may further have the advantage of transferring some switching losses to a third switch.

In some operational modes, and under some application specific conditions, different switching strategies (including traditional standard interleaving, or no interleaving) may be more efficient or provide a more desirable result, and therefore controller 200 is able to selectively employ the strategy based on a range of factors, including but not limited to; input voltage, output voltage, duty cycle, conversion current, temperatures of modules, temperature of capacitors, or the like.

In other embodiments, the wye connected load is other than a three-phase motor, where the phases may or may not be magnetically coupled.

Figure 23:
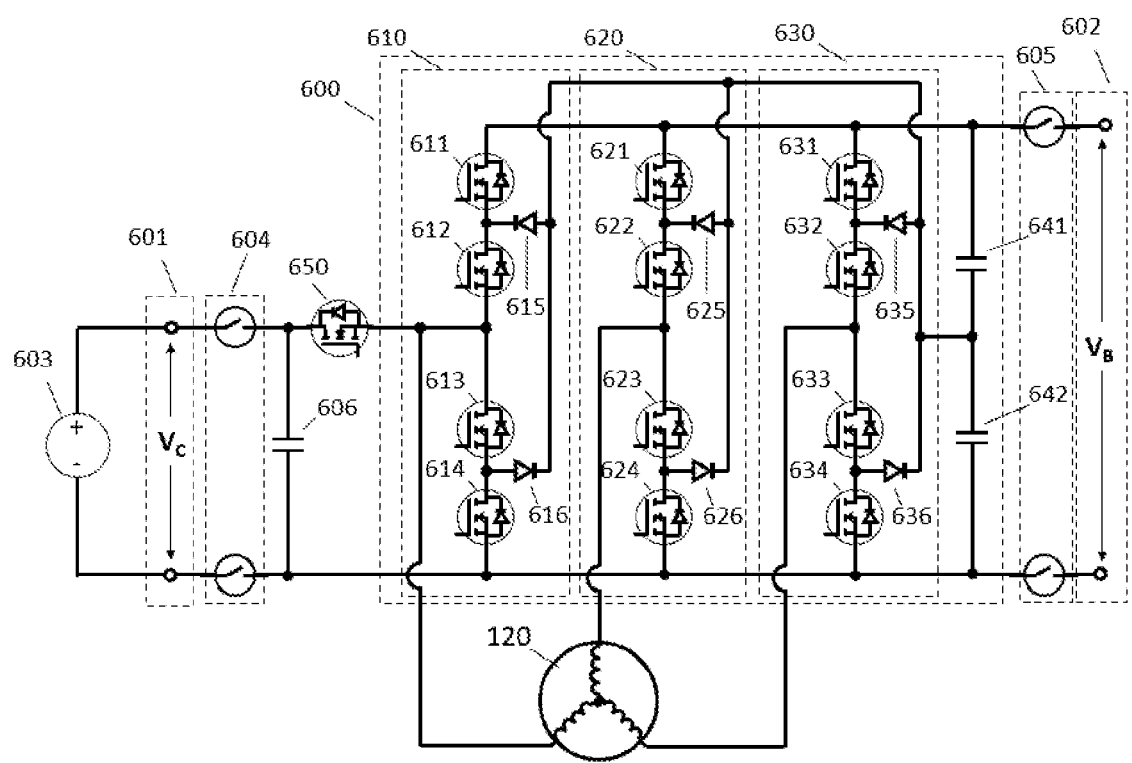
FIG. 23 is an electrical schematic of a 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 23 of a schematic embodiment of a 3-level neutral point clamp (NPC) converter for a polyphase load. In this application, the polyphase load is an electric motor 120, and the 3-level converter consists of a 3-level NPC inverter 600. The positive and negative power rails of inverter 600 are selectively fed by DC source $V_B$ at DC input 602 via switch 605. A further DC input 601 is connected to the mid-point of at least one of the half-bridge drive circuits, exemplified as half-bridge 610 (611, 612, 613, 614), where controller 200 [not shown] is able to connect input 601 to the mid-point of half-bridge circuit 610 via switches 604 and optional switch 650. In one mode of operation, controller 200 may operate a 3-level AC control of the polyphase load 120 with switches 650 and 604 open and switches 605 closed, and using the half-bridge circuits 610, 620, and 630. In this embodiment, optional switch 650 is illustrated as a MOSFET with anti-parallel diode, however in another embodiment it is a relay or contactor. In another mode of operation, controller 200 may facilitate a 3-level DC to DC buck conversion from $V_B$ to $V_C$, for example, by switching specific MOSFETs in a predetermined sequence.

In some multi-level embodiments, fewer voltage level switching configurations are preferred, so long as switching losses are reduced, or other measures of efficacy improved.

For example, one switching sequence of the present embodiment may be switching MOSFETs 631 and 632, followed by 632, followed by 631 and 632, followed by 613, 631 and 632.

Figure 24:
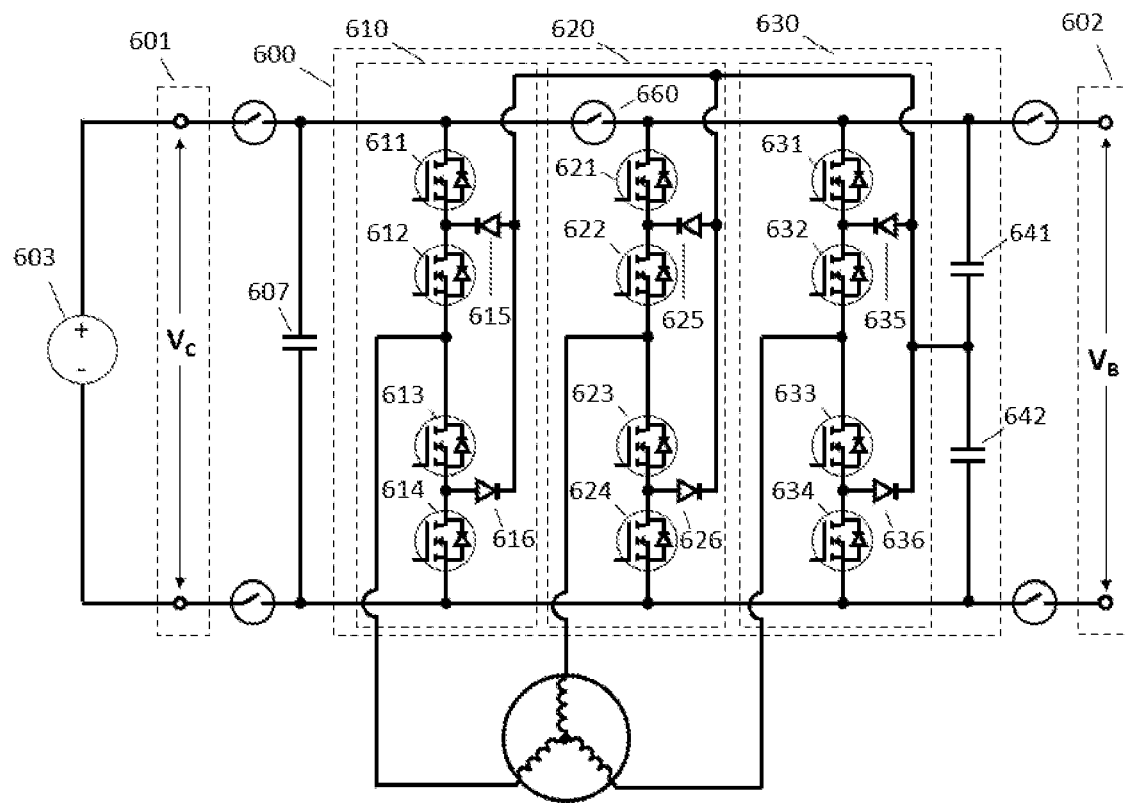
FIG. 24 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 24 to another 3-level NPC inverter configuration where similar components and/or features may be denoted by similar reference numerals. In this embodiment, DC input 601 and DC input 602 connect across the positive and negative DC power rails of one of more of the drive circuits 610, 620, and/or 630, where at least one of the DC terminals of each DC input, and therefore the DC power rails of at least two drive circuits, are able to be selectively disconnected or connected by a mode select switch 660. In one mode of operation, controller 200 may operate a 3-level AC control of the polyphase load 120 with switch 660 closed, and using the half-bridge circuits 610, 620, and 630 to draw DC current from $V_B$ or $V_C$. In another mode of operation of this embodiment, controller 200 may operate a DC to DC three-level boost conversion from $V_B$ to $V_C$, by switching specific MOSFETs in a predetermined sequence.

For example, one switching sequence of the present embodiment may be switching MOSFET 612, followed by 612 and 634, followed by 611, 612 633, and 634, followed by 611, 612, and 633.

In another embodiment or version, a further switch (e.g. 660*b* [not shown]) is placed on the neutral point clamp in between two of the drive circuits 610, 620 and/or 630, in addition to a switch (e.g. 660) on the main DC bus bar between drive circuits 610, 620, and/or 630.

Figure 25:
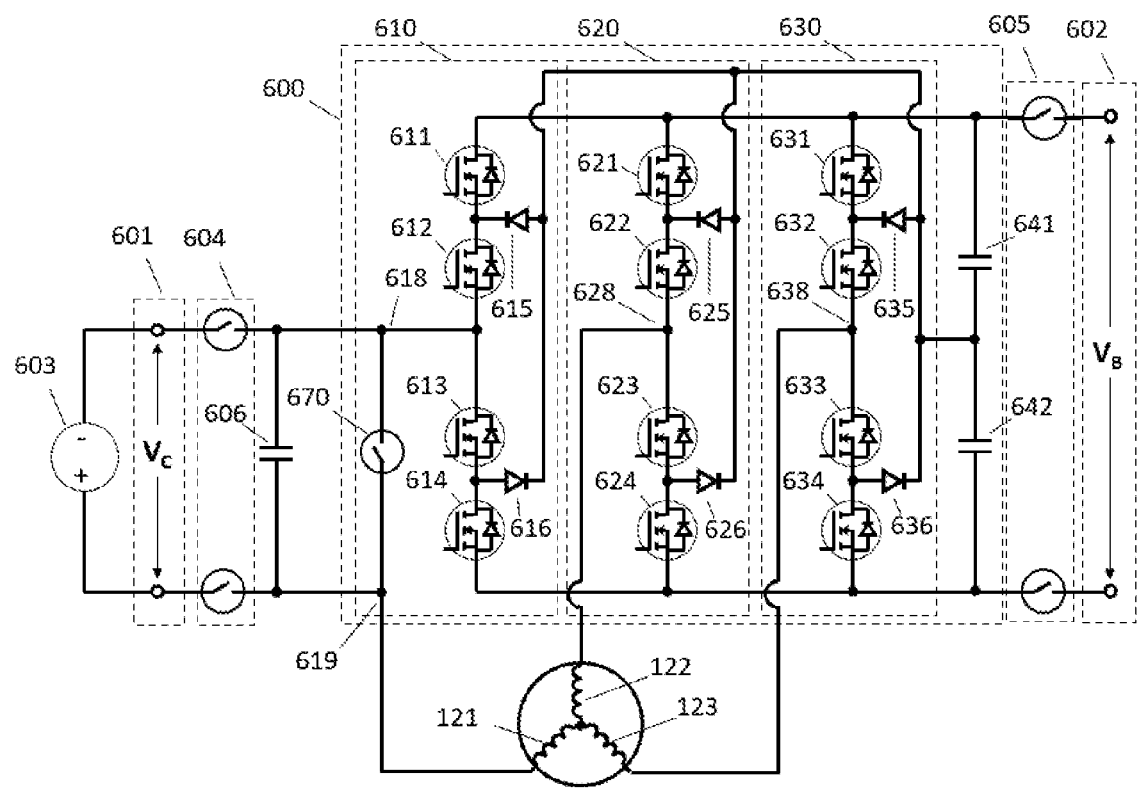
FIG. 25 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 25 to another 3-level NPC inverter configuration where similar components and/or features may be denoted by similar reference numerals. The positive and negative power rails of inverter 600 are selectively fed by DC source $V_B$ at DC input 602 via switch 605. A further DC input 601 is selectively able to be connected across the mid-point of at least one of the half-bridge drive circuits, exemplified as half-bridge 610 mid-point connection 618, and the corresponding phase tail of the inductive load, exemplified as connection 619, via switching mechanism 604. In this illustration of the embodiment of FIG. 25, the positive DC input of DC source 63 is connected to point 619, and the negative DC input connects to point 618, via switching mechanism 604. Further, switch 670 is able to operate to selectively disconnect point 619 of phase tail 121 from point 618 of the half-bridge circuit 610. When switch 670 is open, capacitor 606 is applied across points 618 and 619, and input 601 with switches 604 closed. When switch 670 is closed, capacitor 606 is shunted and has no effect on the operation of converter 600. However, in other embodiments, at least one terminal of capacitor 606 is disposed on the other side of at least of the switches of DC input switches 604. In some cases, controller 200 may act to pre-charge and/or discharge capacitor 606 before actuating switch 670 and/or switching mechanism 604. In this embodiment, the positive DC terminal of DC source 603 at DC input 60 is connected to the phase tail 121 of machine 120 at point 619, and the negative DC terminal is connected to point 618, via DC input switching mechanism 604. In one mode of operation, controller 200 may operate a 3-level AC control of the polyphase load 120 with switches 604 open and switches 605 and 670 closed, and using the half-bridge circuits 610, 620, and 630. In another mode of operation, controller 200 may facilitate a 3-level DC to DC boost conversion from $V_C$ to $V_B$, for example, by switching specific MOSFETs in a predetermined sequence. Controller 200 may enable bidirectional power flows between $V_C$ and $V_B$ in buck or boost mode. Controller 200 may select and/or change the switching pattern depending on the required boost ratio or duty cycle, and conversion type.

For example, in one application or mode of the embodiment, one switching sequence of the present embodiment may be switching MOSFETs 612, followed by 623, followed by 623 and 624, followed by 611 and 612, followed by 612 and 623, followed by a null cycle.

For example, in one application or mode of the embodiment, one switching sequence of the present embodiment may be a null switching event (all off), followed by switching MOSFETs 623, followed by 623 and 624, followed by 623, followed by a null cycle, followed by 612, followed by 611 and 612, followed by 612, and then repeating with the first null cycle.

For example, in one application or mode of the embodiment for duty cycles less than 50%, one switching sequence of the present embodiment may be switching MOSFETs 621, 622, and 613, followed by 622 and 612, followed by 622, 613, and 614, followed by 622 and 613.

For example, in one application or mode of the embodiment for duty cycles less than 50%, one switching sequence of the present embodiment may be a null cycle followed by switching MOSFETs 612, followed by a null cycle, followed by switching switch 623.

For example, in one application or mode of the embodiment for duty cycles greater than 50%, one switching sequence of the present embodiment may be switching MOSFETs 621, 622, 613, and 614, followed by 621, 622 and 613, followed by 621, 622, 613, and 614, followed by 622, 613, and 614.

For example, in one application or mode of the embodiment for duty cycles greater than 50%, one switching sequence of the present embodiment may be switching MOSFETs 623 and 612, followed 612, followed by 623 and 612, followed by 623.

The same switching patterns may be applied to other switching legs, for example, to the switching leg of drive circuit 620 in an interleaved or simultaneous manner, or by any of the switching patterns described herein.

In one application or mode of the embodiment, controller 200 is a controller for a two or 3-level voltage stage inverter 600 for an electric motor 120 of an electric vehicle. The electric vehicle having a traction battery of voltage $V_B$, and a DC input 601 for connecting with an external DC charging station or regulated or unregulated DC voltage $V_C$. In some applications, for controller 200 to charge $V_B$ from $V_C$ requires controller 200 to operate in buck mode conversion, and in other applications requires a boost mode conversion.

Figure 26:
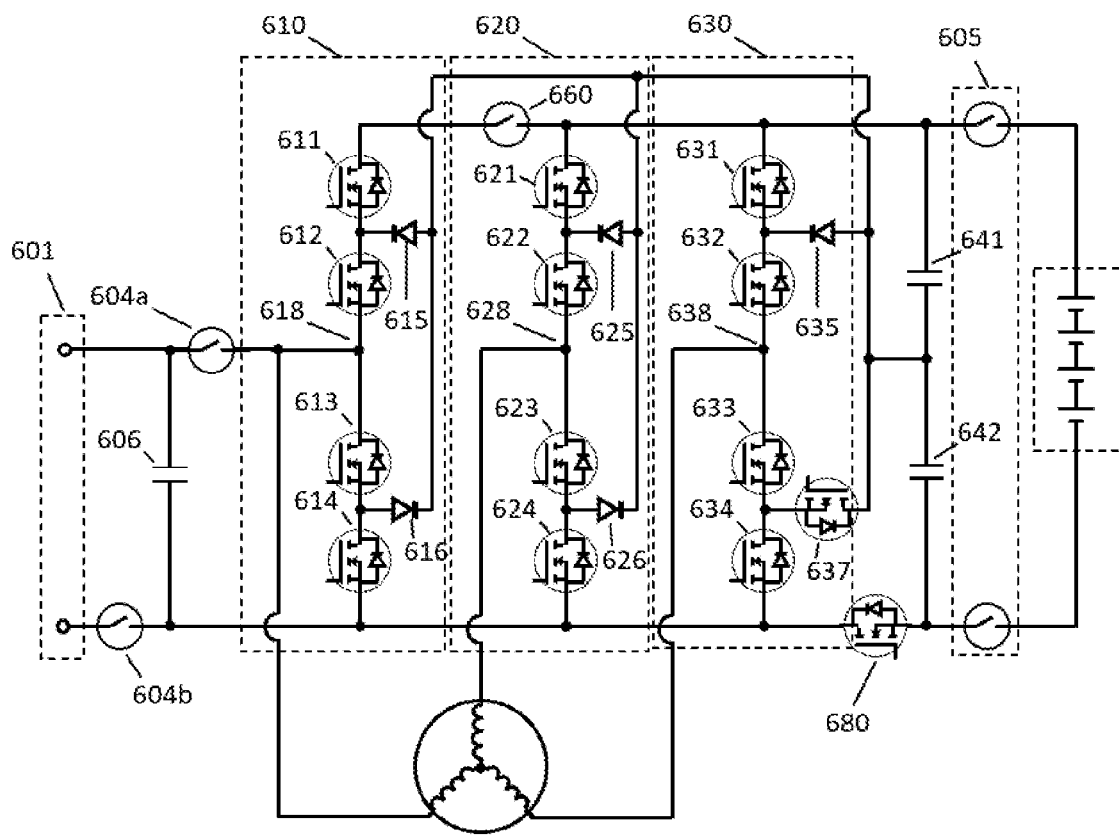
FIG. 26 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 26 to another 3-level NPC inverter configuration where similar components and/or features may be denoted by similar reference numerals. In this embodiment, one of the diodes of the neutral point clamp is replaced by a MOSFET or other switching device with a diode. In the illustrated embodiment diode 636 is replaced by MOSFET 637 with integrated body diode in the same direction as diode 636. In another embodiment, the existing diode 636 is maintained and a switch 637 is placed in parallel. Further, a switch and diode are implemented, exemplified as MOSFET 680 with integrated body diode, on the negative DC bus between the capacitor bank of 641 and 642 and the switching leg 630. The positive and negative power rails of inverter 600 are selectively fed by DC source $V_B$ at DC input 602 via switching mechanism 605. A further DC input 601 is selectively able to be connected across the mid-point of at least one of the half-bridge drive circuits (exemplified as half-bridge 610 mid-point connection 618) via switch 604a, and the negative DC power rail of the half-bridge 610 or DC source $V_B$ via switch 604b. In the illustrated embodiment, capacitor 606 is selectively able to be connected to the DC input 601 and/or the phase mid-point 618 via switching mechanism 604. When switch 604b is closed, capacitor 606 is applied across the DC input 601. When switch 604a is closed, capacitor 606 is connected across the mid-point 618 and the main DC negative power rail. In some cases, controller 200 may act to pre-charge and/or discharge capacitor 606 before actuating switch 604a and/or 604b. For example, controller 200 may close switch 604a and pre-charge capacitor 606 to the voltage $V_C$, from source $V_B$ via operating half bridges 610, 620, and/or 630, before closing switch 604b. In one mode of operation, controller 200 may operate a 3-level AC control of the polyphase load 120 with switches 604 and 637 open and switches 605, 680, and 660 closed, and using the half-bridge circuits 610, 620, and 630. In another mode of operation, controller 200 may facilitate a 3-level DC to DC boost conversion from $V_C$ to $V_B$, for example, by opening switch 660 and closing switches 605, 637 and 604, and switching specific MOSFETs in a sequence or pattern. Controller 200 may enable bidirectional power flows between $V_C$ and $V_B$ in buck or boost mode. Controller 200 may select and/or change the switching pattern depending on the required boost ratio or duty cycle, and conversion type.

For example, one DC to DC switching pattern may be implemented by controller 200 switching MOSFETs 633 and 634, followed by 633, followed by 634, followed by a null sequence, and repeated.

For example, for duty cycles less than 50%, one repeating DC/DC switching sequence may be switching MOSFETs 633, followed by a null sequence, followed by 634, followed by a null sequence.

For example, for duty cycles greater than 50%, one repeating DC/DC switching sequence may be switching MOSFETs 633, followed by 633 and 634, followed by 634, followed by 633 and 634.

In another embodiment, diode 626 may also be replaced by a MOSFET 627 (similar to 637) such that switching leg 620 may be operated for DC to DC conversion in a similar manner to, or interleaved with, switching leg 630.

In another embodiment, DC input 601 or switch 604a (or 650 if fitted) connect to a half-bridge other than drive circuit 610. For example, in another embodiment DC input 601 (or switch 604a or 650) is selectively connectable to point 628 of drive circuit 620.

In another embodiment, $V_B$ is interface to DC input 601, and $V_C$ at DC input 602. In another embodiment, DC input 602 is selectively connected (via a switch 704a) to point 638 of drive circuit 630.

Figure 27:
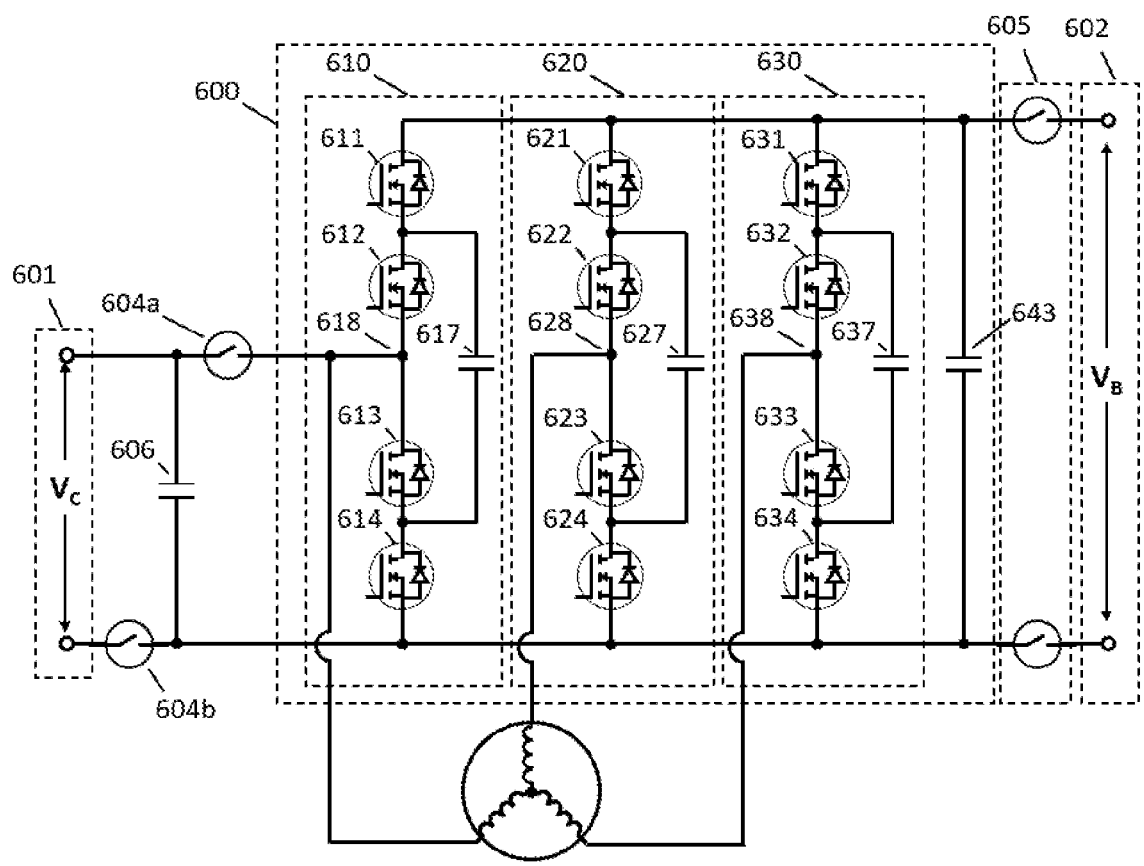
FIG. 27 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 27 to a 3-level flying capacitor inverter configuration where similar components and/or features may be denoted by similar reference numerals. The positive and negative power rails of inverter 600 are selectively fed by DC source $V_B$ at DC input 602 via switching mechanism 605. A further DC input 601 is selectively able to be connected across the mid-point of at least one of the half-bridge drive circuits (exemplified as half-bridge 610 mid-point connection 618) via switch 604a, and the negative DC power rail of the half-bridge 610 or DC source $V_B$ via switch 604b. In the illustrated embodiment, capacitor 606 is selectively able to be connected to the DC input 601 and/or the phase mid-point 618 via switching mechanism 604. When switch 604b is closed, capacitor 606 is applied across the DC input 601. When switch 604a is closed, capacitor 606 is connected across the mid-point 618 and the main DC negative power rail. In some cases, controller 200 may act to pre-charge and/or discharge capacitor 606 before actuating switch 604a and/or 604b. For example, controller 200 may close switch 604a and pre-charge capacitor 606 to the voltage $V_C$, from source $V_B$ via operating half bridges 610, 620, and/or 630, before closing switch 604b. In one mode of operation, controller 200 may operate a 3-level AC control of the polyphase load 120 with switches 604 open and switches 605 closed, and using the half-bridge circuits 610, 620, and 630. In another mode of operation, controller 200 may facilitate a 3-level DC to DC buck conversion from $V_B$ to $V_C$, for example, by closing switches 605 and 604, and switching specific MOSFETs in a sequence. Controller 200 may enable bidirectional power flows between $V_C$ and $V_B$ in buck or boost mode. Controller 200 may select and/or change the switching pattern depending on the required boost ratio or duty cycle, and conversion type.

For example, for duty cycles less than 50%, one repeating DC/DC switching sequence may be switching MOSFETs 633 and 634, followed by 631 and 633, followed by 633 and 634, followed by 632 and 634.

For example, for duty cycles greater than 50%, one repeating DC/DC switching sequence may be switching MOSFETs 631 and 632, followed by 631 and 633, followed by 631 and 632, followed by 632 and 634.

The same switching patterns may be applied to other switching legs, for example, to the switching leg of drive circuit 620 in an interleaved or simultaneous manner, or by any of the switching patterns described herein.

Figure 28:
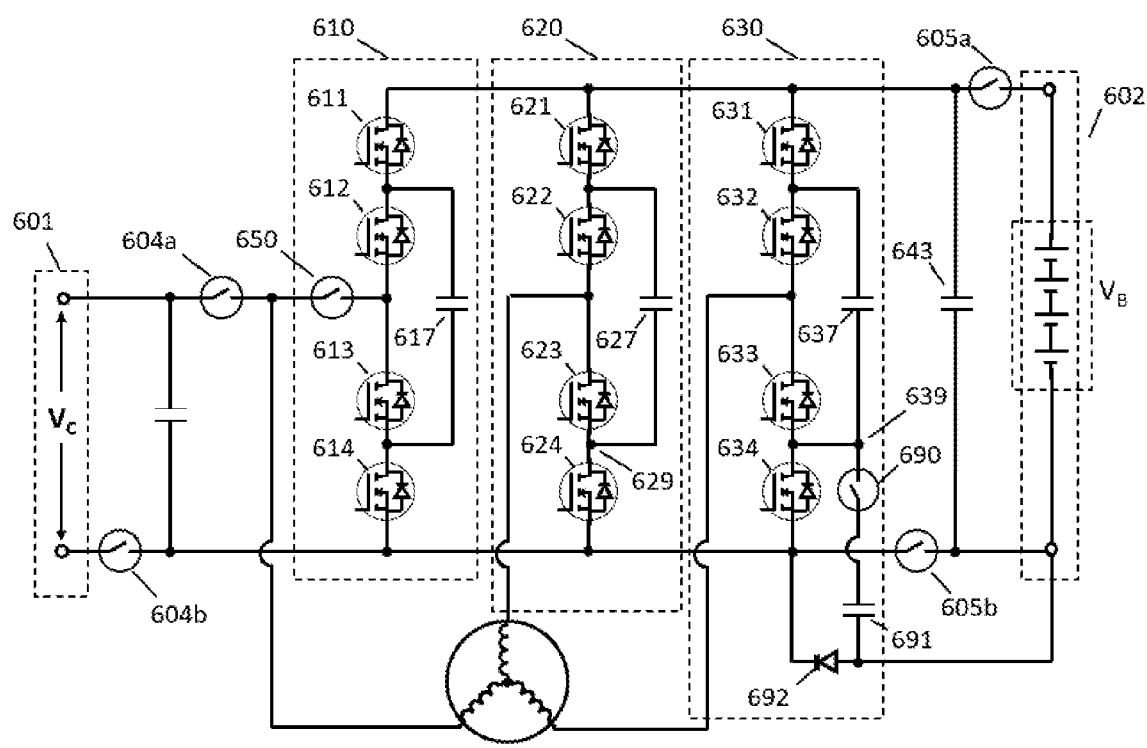
FIG. 28 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 28 to another 3-level flying capacitor inverter configuration where similar components and/or features and/or modes of operation may be denoted by similar reference numerals. In this embodiment, a further capacitor exemplified by capacitor 691 is attached to one or more of the switching legs, able to be selectively connected in series with existing flying capacitor to the negative DC pole of DC input 602 by a further switch exemplified by switch 690. Furthermore, a diode 692 is employed to connect the negative DC pole of DC input 602 to the negative DC bus of the DC input 601 when switch 605b is open. Switch 690 is used to disconnect the effect of capacitor 691 during AC/DC or DC/AC 3-level operation, and used to connect capacitor 691 during one or more DC/DC modes between $V_C$ and $V_B$. In one DC/DC mode of operation, controller 200 may facilitate a 3-level DC to DC boost conversion from $V_C$ to $V_B$, for example, by closing switches 605a, 604 and 690, opening switch 605b, and switching specific MOSFETs in a sequence.

For example, for duty cycles less than 50%, one repeating DC/DC switching sequence may be switching MOSFETs in a null sequence, followed by 633, followed by a null sequence, followed by 634.

For example, for duty cycles greater than 50%, one repeating DC/DC switching sequence may be switching MOSFETs 633 and 634, followed by 634, followed by 633 and 634, followed by 633.

For example, in one DC/DC switching pattern may be implemented by controller 200 switching MOSFETs 633 and 634, followed by 633, followed by 634, followed by a null sequence, and repeated.

In another embodiment, a further switching mechanism 690b and capacitor 691b are implemented on the half-bridge drive circuit 620 in a similar fashion to 690 and 691 on drive circuit 630, such that similar operation is able to occur by controller 200 switching MOSFETs 623 and 624. In another aspect of the invention, a further switch with integrated diode is employed to block current from flowing between the negative power rail of phase 620 to/from the negative power rail of 630 in one direction during DC to DC interleaving mode, but allow bidirectional current transfer during AC to DC and DC to AC modes.

In some embodiments, the same switching patterns may be applied to other switching legs, for example, to the switching leg of drive circuit 620 in an interleaved or simultaneous manner, or by any of the switching patterns described herein. Controller 200 of FIG. 28 may also selectively operate similarly to FIG. 26 in DC to DC modes with switch 605b closed and switch 690 open.

Figure 29:
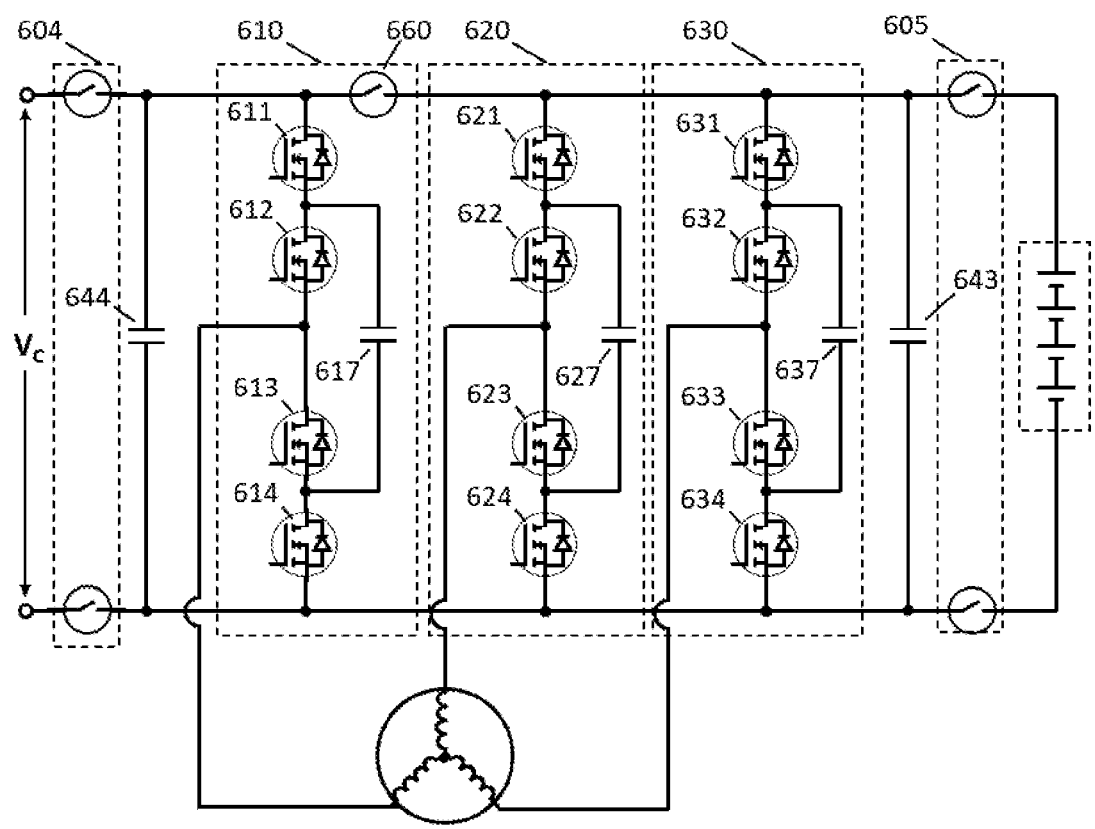
FIG. 29 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 29 to another 3-level flying capacitor inverter configuration with DC power rail break switch 660, where similar components and/or features and/or modes of operation to previous embodiments may be denoted by similar reference numerals. Controller 200 may operate the drive circuits 610, 620 and 630 to apply AC currents through inductive load 120 in a 3-level manner using current derived from either DC source $V_B$ or $V_C$ by closing switches 605 or 604 respectively. Further, controller 200 may operate in DC to DC mode between $V_C$ and $V_B$ by closing switches 604 and 605 and opening switch 660. In some modes of DC to DC operation, controller 200 may selectively interleave switches or switching patterns of drive circuits 620 and 630. Controller may electric to pre-charge either capacitor 643 or 644 from the alternate source before closing the DC input switches 605 or 604. For example, before closing switch 604, controller 200 may pre-charge capacitor 644 to the value of $V_C$ by opening switch 660, and closing switches 605, and performing a buck and/or boost conversion from voltage source $V_B$. In one mode of operation, controller 200 may facilitate a 3-level DC to DC buck and/or boost conversion from $V_C$ to $V_B$, or vice versa, for example, by opening switch 660 and closing switches 605 and 604, and switching specific MOSFETs in a sequence. Controller 200 may enable bidirectional power flows between $V_C$ and $V_B$ in buck or boost mode. Controller 200 may select and/or change the switching pattern depending on the required boost ratio or duty cycle, and conversion type.

In some embodiments, switch 660 is placed between the positive power rail of drive circuit 610 and 620, whereas in other embodiments it may be placed between drive circuit 620 and 630. In other embodiments, there may be two switches deployed as 660a and 660b in both positions which may enable interleaving in all modes of operations of buck or boost from $V_C$ to $V_B$ or from $V_B$ to $V_C$. In another embodiment, switch 660 is disposed on the negative power rail between two or more drive circuits.

In some embodiments, controller 200 may enable bidirectional power flows between $V_C$ and $V_B$ in buck or boost mode when acting in different modes of operation. Controller 200 may select and/or change the switching pattern depending on the required boost ratio or duty cycle, and conversion type.

Figure 30:
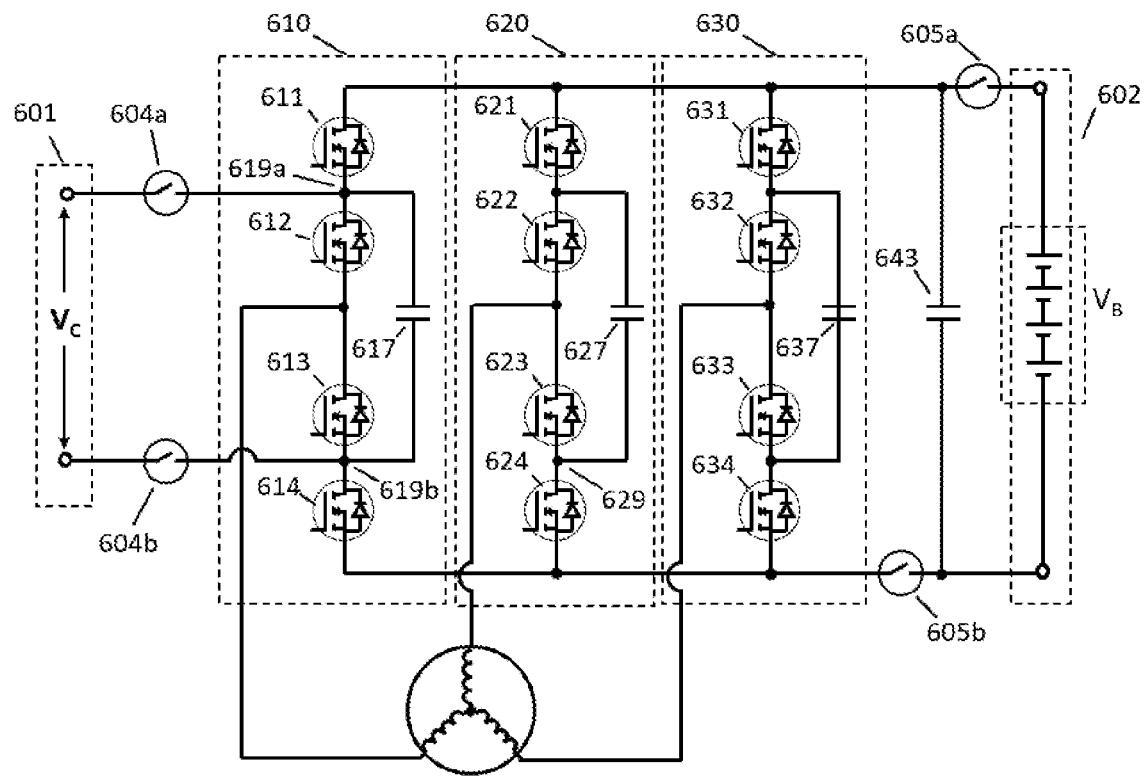
FIG. 30 is an electrical schematic of another 3-level multi-modal controller for a poly-phase inductive load for enabling either boost or buck DC to DC conversions between two DC sources, and at least one of a DC to AC or AC to DC conversion between at least one of the DC sources and the poly-phase inductive load.

Reference is now made to FIG. 30 to another 3-level flying capacitor inverter configuration where similar components and/or features may be denoted by similar reference numerals. The positive and negative power rails of inverter 600 are selectively fed by DC source $V_B$ at DC input 602 via switching mechanism 605. A further DC input 601 is selectively able to be connected across the flying capacitor of at least one of the half-bridge drive circuits (exemplified as half-bridge 610 mid-point connection 619a and 619b) via switch 604a and 604b. In the illustrated embodiment, the flying capacitor 617 takes the place of dedicated DC input capacitor 606 is selectively able to be connected to the DC input 601 via switching mechanism 604. In some cases, controller 200 may act to pre-charge and/or discharge capacitor 617 before actuating switch 604a and/or 604b. For example, controller 200 may pre-charge capacitor 617 to the voltage $V_C$, from source $V_B$ via operating half bridges 610, 620, and/or 630 in a buck and/or boost mode, before closing switch 604. In one mode of operation, controller 200 may operate a 3-level AC control of the polyphase load 120 with switches 604 open and switches 605 closed, and using the half-bridge circuits 610, 620, and 630. In another mode of operation, controller 200 may facilitate a 3-level DC to DC buck conversion from $V_B$ to $V_C$, for example, by closing switches 605 and 604, and switching specific MOSFETs in a sequence. Controller 200 may enable bidirectional power flows between $V_C$ and $V_B$ in buck or boost mode. Controller 200 may select and/or change the switching pattern depending on the required boost ratio or duty cycle, and conversion type.

In another embodiment, instead of interfacing at point 619b, the negative DC terminal of $V_C$ may connect directly to the negative DC terminal of $V_B$, or the negative terminals of the 3-level half-bridge drive circuits 610, 620, 630, via switch 604b.

In other embodiments, the inverter 600 may include further elements, such as previously defined switch 660, and/or 690, 691, and/or 692 to achieve similar modes of operations and switching configurations.

In some embodiments or application modes, controller 200 operates to pre-charge capacitor 643 (and/or 641, and 642) from source $V_C$ in a buck and/or boost convert mode before closing switches 605.

In some embodiments, a pre-charge resistor circuit [not shown] may be employed to pre-charge capacitor 643 from $V_B$, for example, in parallel to and operating prior to switching switch 605a.

It will be appreciated that switching sequences applied to one phase may be applied to similarly to another phase simultaneously, or in a phase shifted (including sequential) manner.

Figure 31:
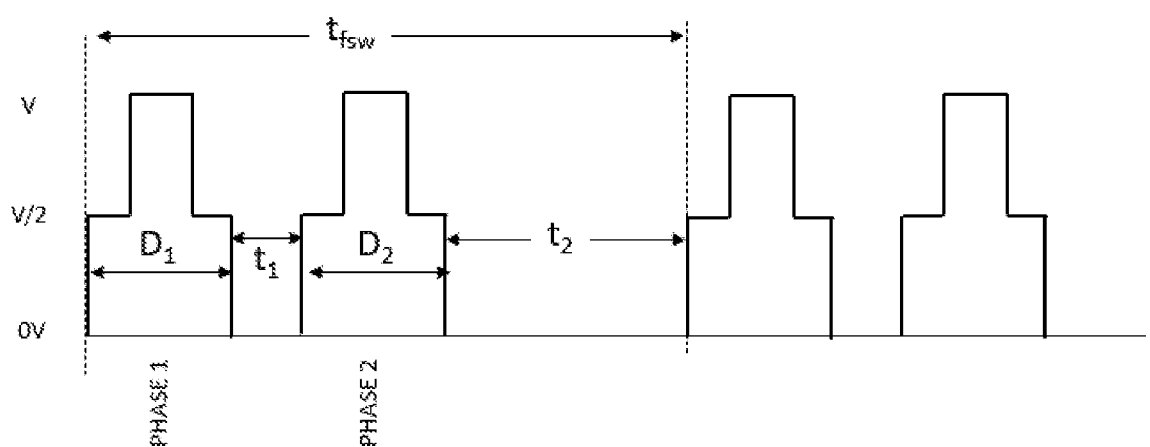
FIG. 31 is an overview of a new sequentially interleaved buck-boost switching pattern which may be applied or configured to a multi-level buck or boost controller.

Reference is now made to FIG. 31 of an interleaving switching pattern for a multi-level converter of at least two interleaved phases. The PHASE 1 and PHASE 2 may correspond, for example, to the multi-level switching patterns of phases employed in FIG. 23 to FIG. 30. For example, PHASE 1 may be the switching pattern employed to drive circuit 620 and PHASE 2 may be the switching pattern employed to drive circuit 630. In this embodiment, one or more drive circuit phases (for example, 610, 620 and 630) may be interleaved, where at least one circuit is performing a multi-level conversion. In the illustration of FIG. 31, both PHASE 1 and PHASE 2 switching voltage is drawn as being applied with a 3-level switching pattern, but in other embodiments one of the phases is performing a two-level conversion leveraging the mid-point voltage to reduce switching voltage and ripple. Similarly, to the FIGURES relating to a two-level switching arrangement, and/or interleaving of a single switch of each phase, a time $t_1$ exists between the end of the first switched PHASE 1 and the start of the second switched PHASE 2, and a time $t_2$ between the end of the second switched PHASE 2 and the end of the switching period $t_{fsw}$. In this embodiment, $t_1$ may be functionally equal to zero (or near zero), and the switching patterns would be sequential similarly to the description of FIG. 5. In other applications of the embodiment, or modes of operation, $t_1$ may be greater than zero as similar to the description of FIG. 6. In other applications of the embodiment, or modes of operation, $t_1$ may be less than zero as similar to the descriptions of FIG. 7 and/or FIG. 12 and/or FIG. 13 and/or FIG. 14. In some embodiments or modes of operation, $t_1$ may be dynamic to achieve a set point, such that some aspect of the PHASE 1 waveform corresponds with some aspect of the PHASE 2 waveform. For example, $t_1$ could be set such that when PHASE 1 voltage falls from V to V/2, then PHASE 2 is set to increase from V/2 to V. That is, the upper level of the phase waveforms could be seen to be sequential. In other applications of the embodiment, or modes of operation, the duty cycle of the first PHASE 1 waveform may be unequal to the waveform of the second PHASE 2 as similar to the description of FIG. 10 and/or FIG. 15.

Similarly, as for two-level converters, controller 200 may be able to increase the number of voltages switching levels, or reduce the switching voltage, applied to one phase due to the switching condition and/or conduction of another phase. For example, in some embodiments, if PHASE 1 correlates to switching leg 620, and PHASE 2 correlates to switching leg 630, in an embodiment and mode of operation where PHASE 1 and PHASE 2 can be interleaved; If a voltage level of $V_B/2$ is applied at point 628 due to the switching state and/or conduction state of 620, then, in some conditions of operation of some embodiments, point 638 may be at voltage $V_B/4$, or $(V_B-V_C)/2$, thereby increasing the number of switching voltage levels available to drive circuit 630.

In another application of the embodiment, PHASE 1 is a two-level conversion, and PHASE 2 is a three-level conversion created in a two-level topology by the switching mode of PHASE 1. For example, PHASE 2 may be able to switch at a third voltage level (e.g. V/2) by exploiting the star point voltage influenced by PHASE 1 of a wye connected load.

In some applications or modes of 3-level embodiments, a capacitor may be selected added to the star-point of a polyphase load, for example $C_Y$ 211 using switch 210 as exemplified in FIG. 2.

In some applications or modes of 3-level embodiments, pairs of two or more switches may be used to define SWITCH 1 and/or SWITCH 2 as described in reference to switching strategies throughout the specification.

In some embodiments, a further connection with one or more switches [not illustrated] selectively connects $V_C$ and $V_B$ directly together in parallel, for modes of operation where either $V_C$ or $V_B$ is a regulated source, or the voltages are [close to] equal.

In one or more of the embodiments or operational modes, controller 200 may interleave two or more phases in the switching pattern, or interleave individually operated or mutually beneficial switching patterns as described in reference to FIG. 31. In some modes of embodiments, when controlling or switching one phase, another phase's switching voltage may be impacted, for example, through the interconnections, such that controller 200 may exploit this to further reduce switching losses (voltage or current). In one or more embodiments, controller 200 may therefore interleave phases to achieve multi-level switching characteristics across one or more phases.

In one or more applications of 3-level embodiments, or modes of interleaved DC to DC operation, one of the phases may be operating in two-level, whereas the other may be operated in 3-level.

In other embodiments, more than 3-level operation may be possible in one or more modes of operation.

In another embodiment, each drive circuit may consist of more switches or devices in series to provide higher levels of multi-level conversions In another embodiment, more than three drive circuits and/or three inductive phases are implemented, and more than two phases are interleaved in the switching pattern(s).

In other embodiments, voltage stage inverters of more than 3-level as implemented under the same spirit of the invention.

The duty cycles, offsets, phase shift, etc in any of the applications or modes of the embodiments do not need to be static from period to period, and may be dynamic based on the chosen strategy employed.

It will be understood by those skilled in the art that the phase shift or offset between the duty cycles of SWITCH 1 and SWITCH 2 being $D_1$ and $D_2$, or even the inverse "not-$D_1$", !$D_1$, and "not-$D_2$" !$D_2$, or any other switches, are directly or indirectly controlled via the control methods detailed herein. Further, it will be appreciated that the phase shift or time offset of the second SWITCH 2, including any dead time delay $t_1$, is dependant at least in part by the duty cycle of the first SWITCH 1. In such cases, the phase shift is variable, and it will be appreciated the pulses are not intended to be evenly distributed.

One or more embodiments may have the advantage of operating as a multimodal converter providing ACDC, DCAC and/or DCDC operation, which may include 3-level operation, in one or more modes.

One or more embodiments may have the advantage of providing a high step-up boost ratio, or be optimised around a specific boost ratio.

One or more embodiments or modes of operation may have the advantage of reducing switching ripple in the phase(s) or connected load(s), and/or input and/or output. Further, one or more embodiments or modes of operation may reduce induced currents or losses in further electrically or magnetically connected loads, for example, the rotor of an electric machine.

In one or more embodiments, diode paths which consist of free-wheeling or anti-parallel diodes within a MOSFET or other semiconductor package, may be switched asynchronously to the switched switch of the switching patterns. For example, where fitted, the switch of anti-parallel DIODE 2 corresponding to the same switching leg of SWITCH 2, may be switching inversely to SWITCH 2.

It will be appreciated by anyone in the art that multiple sub-sets of phases could be connected in delta-delta, delta-wye, wye-delta or other configurations.

It will be appreciated to anyone skilled in the art that the MOSFETs shown can instead be implemented by other switch types including IGBT, SiC, GaN, FET, or other. The switches may be actively controlled by controller 200, including through any sub circuits such as gate drivers, voltage sources, switches, or the like.

It will be appreciated by those skilled in the art that the switching mechanisms shown can be implemented using contactors, relays, mechanical switches, solid state switches, or the like.

It will be appreciated by those skilled in the art that the concepts presented can be expanded to voltage stage converters with higher levels of possible switching voltages. For example, a four-level converter with six or more switches in series per switching phase leg.

It will be appreciated to those skilled in the art that the embodiments may include current and/or voltage sensors, zero crossing detection, or the like on one or more of the inductive load phases and/or DC inputs and outputs or other reference points. Further the controller(s) may consist of one or more levels of micro-processors, programmable logic devices or controllers, feedback loops, communication with external controllers and sensors, and other input and output signals.

For example, in one application of one or more of the embodiments the controller relates to an electric vehicle traction inverter and polyphase traction machine, with one or more switching mechanisms, fitted to an electric vehicle with traction battery $V_B$, and DC inlet for interfacing with an external DC power source $V_C$. In one mode of operation, controller 200 is able to operate the drive and switching mechanisms to draw energy from the traction battery $V_B$ and generate propulsive torque in the traction machine and provide traction effort to the vehicle. In another mode of operation, controller 200 operates the drive and switching mechanisms to draw current from $V_C$ and supply at least one of a regulated voltage or regulated current to $V_B$, using the drive circuits of the drive and the machine inductance in either a buck or boost DC to DC convert mode.

It will be appreciated to those skilled in the art that descriptions in reference to a particular embodiment or figure may be able to be combined and applied to other embodiments. Further, strategies may be combined or interchanged within one or more embodiments based on different applications or operating modes. It will be appreciated that in the interest of simplicity, not every possible combination or permutation of control method needs to be explicitly described while fitting within the overall spirit of the innovation.

In one or more embodiments of the invention, the switching patterns may be used to advantageously control or optimise one or more of; the current or voltage characteristics of a conversion; the efficiency of the conversion; change the current or power or loss distribution between interleaved phases or switches; smooth the current waveform of one or more phases; reduce switching ripple imposed on one or more filter capacitors, for example 207 and/or 208; optimise the flux patterns; reduce magnitude of leakage current paths; and/or reduce conversion losses such as switching losses, AC losses, core losses (including stator and/or rotor of an electric machine), eddy currents, proximity effect, skin effect, and the like.

The embodiments and versions described herein have one or more of the following advantages:

Improves efficiency
Reduces conversion ripple
Allows higher power conversion to take place
Minimises stress on components such as capacitor bank
Reduces switching voltage
Reduces switching losses
Softer switching loads
Reduces inductive load losses
Reduces magnetic saturation
Reduces eddy current losses, hysteresis losses, proximity effect, and/or skin effect losses of the inductive load
Reduces imposed switching frequency on one or more phases
Reduces losses in the inductive load (including further coupled loads, including induced losses)
Imposes lower switching frequency on at least one of the phases
Balance currents between phases of different impedances or flux conditions
Provides multi-level switching.
Increases the number of possible switching voltage levels for at least one phase
Provides faster charging of batteries.
Improves battery life through reduction of voltage and/or current ripple and other phenomena.
Simplify control overhead
Provides voltage translation between one or more voltage sources
Able to interface multiple interconnected phases to create multi-level voltage switching.

Reference in the above embodiments to control signals is to all signals that are generated by a first component and to which a second component is responsive to undertake a predetermined operation, to change to a predetermined state, or to otherwise be controlled. The control signals are typically electrical signals although in some embodiments they include other signals such as optical signals, thermal signals, audible signals and the like. The control signals are in some instances digital signals, and in others analogue signals. The control signals need not all be of the same nature, and the first component is able to issue different control signals in different formats to different second components, or to the same second components. Moreover, a control signal can be sent to the second component indirectly, or to progress through a variety of transformations before being received by the second component.

The terms "controller", "converter", "module" and the like are used in this specification in a generic sense, unless the context clearly requires otherwise. When used in a generic sense, these terms are typically interchangeable.

It will be appreciated that the disclosure above provides various significant improvements in a multimodal converter.

Reference throughout this specification to "one embodiment", "some embodiments" "an embodiment", "an arrangement", "one arrangement" means that a particular feature, structure or characteristic described in connection with the embodiment or arrangement is included in at least one embodiment or arrangement of the present invention. Thus, appearances of the phrases "in one embodiment", "in some embodiments", "in an embodiment", "in one arrangement", or "in and arrangement" in various places throughout this specification are not necessarily all referring to the same embodiment or arrangement, but may. Furthermore, the particular features, structures or characteristics may be combined in any suitable manner, as would be apparent to one of ordinary skill in the art from this disclosure, in one or more embodiments or arrangements.

As used herein, and unless otherwise specified, the use of the ordinal adjectives "first", "second", "third", etc., to describe a common object, may merely indicate that different instances of objects in a given class of objects are being referred to, and are not intended to imply by their mere use that the objects so described must be in a given sequence, either temporally, spatially, in ranking, in importance or in any other manner.

Unless defined otherwise, all technical and scientific terms used herein have the same meaning as commonly understood by those of ordinary skill in the art to which the invention belongs. The articles "a" and "an" are used herein to refer to one or to more than one (that is, to at least one) of the grammatical object of the article unless the context requires otherwise. By way of example, "an element" normally refers to one element or more than one element. As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term "coupled" or "connected", when used in the description and claims, should not be interpreted as being limited to direct connections only. The terms "coupled" and "connected," along with their derivatives, may be used. It should be understood, for example, that the terms "coupled" and "directly coupled" are not intended as synonyms for each other. Thus, the scope of the expression "a device A connected to a device B" should not be limited to devices or systems wherein an output of device A is directly connected to an input of device B. Rather, it means that there exists a path between an output of A and an input of B which may be a path including other devices or means. "Connected" may mean that two or more elements are either in direct physical or electrical contact, or that two or more elements are not in direct contact with each other but yet still co-operate or interact with each other. Similar terms are also interpreted similarly. By way of example, the terms "mounted to" or "fixed to" should not be limited to devices wherein a first element is mounted directly to or fixed directly to a second element. Rather, it means that there exists a mounting of fixing between the two that is able to, but does not have to, include intermediate elements.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas or flowcharts provided are merely representative of procedures that may be used. Functionality may be added or deleted from the block diagrams and operations may be interchanged among functional blocks. Steps may be added or deleted to methods described within the scope of the present invention.

The invention claimed is:

1. An interleaved switching controller for a polyphase connected inductive load, the controller comprising:
   at least a first drive circuit and a second drive circuit in parallel, each connected to one or more phases of the polyphase connected inductive load;
   wherein the controller includes:
   a switching period ($t_{fsw}$);
   a first duty cycle ($D_1$) period of switching the first drive circuit determined as a proportion of the switching period;
   a second duty cycle ($D_2$) period of switching the second drive circuit determined as a proportion of the switching period;
   a last duty cycle of switching the last switched drive circuit which may be the same as the second drive circuit determined as a proportion of the switching period; and
   wherein the controller includes a first period ($t_1$) between the end of the first duty cycle and the beginning of the second duty cycle, and a second period ($t_2$) between the end of the duty cycle of the last switched drive circuit and the end of the switching period; and wherein the first period ($t_1$) is not equal to the second period ($t_2$).

2. The controller according to claim 1, wherein the ratio of the first period ($t_1$) to the second period ($t_2$) changes with duty cycle.

3. The controller according to claim 1, wherein the first period ($t_1$) is equal to zero when the first or second duty cycle is less than 50%.

4. The controller according to claim 1, wherein the first period is greater than zero when the first or second duty cycle is less than 50%.

5. The controller according to claim 1, wherein the first period is less than zero when the first or second duty cycle is less than 50%.

6. The controller according to claim 1, wherein the first duty cycle is not equal to the second duty cycle.

7. The controller according to claim 1, wherein the first period is less than zero when the first or second duty cycle is greater than 50%.

8. The controller according to claim 1, wherein the first duty cycle is equal to the second duty cycle.

9. The controller according to claim 1, wherein the polyphase connected inductive load includes at least three phases, and wherein the third phase is in series with at least one of the first phase or the second phase when switched by the corresponding drive circuit.

10. The controller according to claim 9, wherein a third drive circuit is part of a third phase in series with at least one of the first phase or the second phase, wherein the third drive circuit includes a buck switch.

11. The controller according to claim 1, wherein multiple interleaving strategies are employed, and the current interleaving strategy is selectively based on expected power or current of conversion.

12. The controller according to claim 1, where the controller further comprises a selection method based on parameters, whether to employ a first switching strategy or a second switching strategy.

13. The controller according to claim 12, wherein the selective switching strategy depends on whether either or both of the first duty cycle or the second duty cycle is <50% or >50%.

14. The controller according to claim 12, wherein the selective interleaving strategy is dependent on output power or ripple current and wherein controller determines whether to switch one switch individually, or two switches in an interleaved pattern.

* * * * *